United States Patent [19]
Nakayama

[11] Patent Number: 5,914,954
[45] Date of Patent: *Jun. 22, 1999

[54] BUFFER CONTROL SYSTEM

[75] Inventor: Mikio Nakayama, Kanagawa, Japan

[73] Assignee: Fujitsu Limited, Kanagawa, Japan

[ * ] Notice: This patent is subject to a terminal disclaimer.

[21] Appl. No.: 08/715,010

[22] Filed: Aug. 17, 1996

[30] Foreign Application Priority Data

Dec. 6, 1995 [JP] Japan ................................. 7-318005

[51] Int. Cl.⁶ ..................................................... H04J 3/24
[52] U.S. Cl. .......................... 370/394; 370/252; 370/395; 370/411
[58] Field of Search ..................... 370/252, 253, 370/389, 349, 394, 395, 412, 391, 411, 470

[56] References Cited

U.S. PATENT DOCUMENTS

| | | | |
|---|---|---|---|
| 5,450,410 | 9/1995 | Hluchyj et al. | 370/394 |
| 5,596,581 | 1/1997 | Saeijs et al. | 370/394 |
| 5,657,316 | 8/1997 | Nakagaki et al. | 370/394 |

FOREIGN PATENT DOCUMENTS

| | | | |
|---|---|---|---|
| 1-256246 | 10/1989 | Japan | H04L 11/20 |
| 3235448 | 10/1991 | Japan | H04L 12/48 |
| 5268251 | 10/1993 | Japan | H04L 12/48 |
| 66372 | 1/1994 | Japan | H04L 12/48 |
| 6338909 | 12/1994 | Japan | H04L 12/56 |

*Primary Examiner*—Douglas W. Olms
*Assistant Examiner*—Shick Hom
*Attorney, Agent, or Firm*—Helfgott & Karas, P.C.

[57] ABSTRACT

In cell transfer in which cells are sent at uniform intervals, in a case in which 18 cells have been lost between cell A (SN=2) and cell B (SN=5), every time 8 times the expectation value T of the cell arrival interval elapses after the arrival of cell A a dummy cell having the same sequence number as cell A (SN=2) is written into the cell FIFO section. Cells or dummy cells are stored in the cell FIFO section in the order SN=2, 2, 2, 5. When cells or dummy cells are read out of the cell FIFO section in order, if the sequence number SN=2 appears twice in a row, dummy data are created corresponding to the cells SN=3, 4, 5, 6, 7, 0, 1; if the sequence number SN=2 is followed by SN=5, then dummy data are created corresponding to SN=3 and 4.

36 Claims, 50 Drawing Sheets

5,914,954

BUFFER CONTROL SYSTEM

BACKGROUND OF THE INVENTION

1. Field of the Invention

This relates to a control system for a buffer that absorbs fluctuations in the transfer rate of fixed-length packets. In particular, it relates to a control system that holds the number of cells stored in the receiving buffer fixed using an ATM AAL1 sequence number.

2. Description of the Related Art

In recent years, services that perform unified handling of communications in a variety of forms including audio data, text data and image data have become indispensable; the core technology of these services is ATM (asynchronous transfer mode).

ATM stores information in cells and then transfers it. A cell is a fixed-length packet, consisting of a payload which contains the information to be transferred and a header which contains control information such as routing information.

In ATM, a variety of communication services are handled; the service quality (delay time, error rate, etc.) required by each service is different. The ATM adaptation layer (referred to below as the AAL) performs the function of absorbing these differences in quality. At present there are AALs of type 1 to type 5; investigations of the details are still in progress.

Services that transfer data at a Constant Bit Rate (CBR) include audio data, motion picture data transfer and circuit emulation. Circuit emulation handles data transferred at a CBR synchronized to a network clock; data are transferred as if they were on synchronized digital lines, so this method is called synchronous line transfer. This kind of CBR service is provided by AAL1.

FIG. 1 is an overall system configuration diagram. Here, the function that processes CBR data will be explained.

The ATM exchange device 11 has an ATM switch section 12. The ATM switch section 12 outputs each cell to the specified line in accordance with the routing information specified in the cell header. The ATM sending device 13 converts CBR data such as motion picture data and audio data into cells, then transfers each cell to the ATM exchange device 11 via a User Network Interface (UNI). The ATM receiving device 14 receives cells output from the ATM exchange device 11, reproduces data from these cells and transfers them to the transfer destination terminal as CBR data. The ATM sending device 13 and the ATM receiving device 14 can, for example, be installed within a terminal device such as a server machine or a personal computer. The CE sending section 15 and the CE receiving section 16 are installed within the ATM exchange device 11, and perform circuit emulation.

The CE sending section 15 receives CBR data directly, converts those data into cells and inputs them to the ATM switching section 12. The CE receiving section 16 outputs cells exchanged by the ATM switching section 12 to the specified transfer destination as CBR data without going through the UNI.

This invention is technology provided in a circuit that receives cells; it applies to, for example, the ATM receiving device 14 and the CE receiving device 16 in FIG. 1.

FIG. 2A shows the ATM cell configuration. An ATM cell consists of a 5-byte ATM header and a 48-byte Segmentation and Reassembly Protocol Data Unit (SAR-PDU). The ATM header includes routing information (VPI/VCI: Virtual Path Identifier/Virtual Channel Identifier). The HEC (Header Error Control) is used to detect and correct errors in the first 4 bytes of the ATM header. The SAR-PDU is an area in which the information to be transferred is stored; it is also called the payload.

FIG. 2B shows the configuration of the SAR-PDU in AAL1. In AAL1, SAR-PDU consists of a 1-byte SAR header and a 47-byte SAR-SDU (SAR Service Data Unit). The SAR header is used to indicate the cell sending sequence; this SAR header can be used to detect cell loss. The SAR-SDU is used as an information field. That is to say, CBR data such as audio data and motion picture data are split up into 47-byte segments for storage. When cells are transferred serially, they are sent in order from right to left and from top to bottom.

FIG. 2C shows the configuration of the SAR header. The SAR header consists of a 4-bit SNF (Sequence Number Field) and a 4-bit SNPF (Sequence Number Protection Field). The SNF consists of a CS bit that indicates the convergence sublayer and an SN (Sequence Number) that indicates binary numbers from 0 to 7. The SN is a number that indicates the order of sending; it is incremented cyclically. The SNPF consists of a CRC (Cyclic Reduction Check) that indicates the CRC operation value for the purpose of detecting and correcting SN errors, and an EP (Even Parity) bit that indicates the even parity.

Thus, in a CBR service which is regulated by AAL1, data which are required to be transferred at a fixed bit rate, such as motion picture data and audio data, are split up into 47-byte segments and stored in an SAR-SDU, then an ATM header that includes routing information is added to that SAR-SDU to make a cell. Then that cell is sent to the ATM network. On the receiving side, the data stored in the 47-byte SAR-SDU are fetched from the received cell, then the image data, audio data, etc. are reproduced at a fixed bit rate.

FIG. 3 explains the method of detecting cell loss using the Sequence Number (SN). FIG. 3A shows the case in which transfer takes place normally without cell loss. On the sending side, SN=0, 1, 2, 3, . . . , is assigned to each cell in the order in which it is sent. The ATM exchange device transfers those cells to the receiving side while keeping them in the same order. On the receiving side, the Sequence Numbers (SNs) of the received cells are detected; if each SN is 1 more than the preceding SN, it is considered that no cells have been lost.

FIG. 3B shows a case in which a cell has been lost. Here we assume that the cell SN=2 was discarded the ATM exchange device. In this case, the SNs detected on the receiving side are SN=0, 1, 3, . . . , so it is recognized that the cell SN=2 has been lost. In this way, the loss of cells is detected on the receiving side, and it is known which cells have been lost.

When CBR data are stored in a cell and transferred, the cells are sent at uniform intervals. On the receiving side, if the necessary information is extracted from the received cells which arrive at uniform intervals and reproduced, those reproduced data become CBR data.

However, the delay of cell transfer inside the ATM exchange device depends on, for example, the state of congestion of the path. For this reason, even if cells are sent from the sending side at uniform intervals, it sometimes happens that the cells do not arrive at the receiving side at uniform intervals. This phenomenon is called "fluctuation". When the arrival intervals of cells fluctuate, even if CBR data are stored in cells and sent at uniform intervals, the data reproduced on the receiving side do not become CBR data.

To prevent this problem from occurring, a buffer is provided to store cells on the receiving side. That is to say, the received cells are temporarily stored in the buffer, and fluctuations are absorbed by reading those cells out of the buffer at uniform intervals.

FIG. 4 is a diagram of an existing device that absorbs fluctuations in cell intervals. This fluctuation-absorbing device is incorporated into the device that receives cells output from the ATM exchange device. The fluctuation-absorbing device shown in FIG. 4 is described in detail in Japan Patent Application No. 07-005748, so its configuration and action will only be described briefly here. It is assumed here that the fluctuation-absorbing device shown in FIG. 4 is for AAL1, and handles cells of the format shown in FIG. 2.

The ATM disassembly section 21 removes the 47-byte information field (SAR-SDU) from an arrived cell and writes it into the cell FIFO section 22. In addition the Sequence Number (SN) is extracted from that cell and posted to the read clock generation section 26.

The cell FIFO section 22 stores the 47-byte information field (SAR-SDU) extracted by the ATM cell disassembly section 21.

The user clock frequency division section 23 generates the User Clock (UC) by frequency division of the network clock (NC) (for example, taking ⅛ of 155.52 MHz). The User Clock (UC) is a clock that is required by each of the services.

When the first cell to be written into the cell FIFO section 22 arrives, the first cell detection section 24 posts notice of this arrival to the cell counter section 25. When this notice arrives from the first cell detection section 24, the cell counter section 25 counts the amount of data written into the cell FIFO section 22 in cell units (47-byte units). Then, when the count reaches N, a readout start signal RDST is posted to the read clock generation section 26. Here N is the amount of fluctuation absorbed.

After the readout start signal RDST is received, the read clock generation section 26 outputs a Readout Clock (RC) of the same frequency as the User Clock (UC) to the selector section 28. In addition, the Sequence Number (SN) posted from the ATM cell disassembly section 21 is monitored; if the Sequence Number (SN) of a certain cell is not 1 more than the Sequence Number (SN) of the immediately preceding cell, then it is considered that a cell has been lost, and a readout stop signal XRDSTP is output to the selector section 28.

When the cell FIFO section 22 is empty, or when the cell FIFO section 22 is full, the FIFO reset generation section 27 resets the cell FIFO section 22 and the cell counter section 25.

The selector section 28 uses the Readout Clock (RC) to read data out of the cell FIFO section 22 and output them as User Information (UI). However, during an interval when a readout stop signal XRDSTP is received, dummy data are output as User Information (UI) instead of data read out of the cell FIFO section 22.

Thus, received cell information field data are temporarily stored in the cell FIFO section 22, and the fluctuations are absorbed by reading those data out in accordance with the fixed frequency User Clock (UC).

The amount of fluctuation that can be absorbed is determined by how many cells of data are stored in the cell FIFO section 22. For example, if 20 cells of data are stored in the cell FIFO section 22, fluctuation corresponding to 20 cell intervals can be absorbed. In this case, the amount of fluctuation that can be absorbed is defined to be 20.

However, when the cell FIFO section 22 is empty, data cannot be read out of the cell FIFO section 22, and so CBR data cannot be generated. Similarly, when the cell FIFO section 22 is full, additional data cannot be written in, so data are discarded. Consequently, it is required to keep the number of cells stored in the cell FIFO section 22 approximately constant.

When the ATM exchange device becomes congested, cells of low priority are discarded. When a cell is discarded, the data stored in that discarded cell are not written into the cell FIFO section 22, but in the case of CBR data transfer, data readout from the cell FIFO section 22 is continued at a fixed bit rate, so the number of cells in the cell FIFO section 22 decreases. Even when this kind of cell loss occurs, the fluctuation absorption device shown in FIG. 4 can keep the number of cells in the cell FIFO section 22 fixed.

FIG. 5 explains the action of the fluctuation absorption device when cell loss occurs. Here it is assumed the amount of fluctuation to be absorbed is 20.

As shown in FIG. 5, a Sequence Number (SN) is assigned to each cell in the order in which it is sent. Here we assume that the cells SN=5 and SN=6 are discarded in the ATM exchange device. That is to say, we are explaining the case in which the cell SN=7 arrives immediately after the cell SN=4 on the receiving side.

Every time a cell arrives, that cell is written into the cell FIFO section 22, and the number of cells (amount of data) in the cell FIFO section 22 increases. When the number of cells in the cell FIFO section 22 reaches 20, cells are read out of the cell FIFO section 22 in accordance with the User Clock (UC). If there is no fluctuation of the cell interval (when the fluctuations are averaged, they can be considered to be 0), then the rate of writing in of cells to the cell FIFO section 22 equals the rate of readout of cells from the cell FIFO section 22, so the number of cells in the cell FIFO section 22 is maintained at 20.

When the cells SN=5 and SN=6 are lost, compared to the case in which those 2 cells are not lost the number of cells written into the cell FIFO section 22 decreases by 2, but readout of cells from the cell FIFO section 22 continues at a fixed rate. Consequently, the number of cells in the cell FIFO section 22 decreases (in FIG. 5, it decreases from 20 to 19 and then to 18).

When the cell SN=7 arrives, the Sequence Number of the immediately preceding arrived cell was SN=4, so it is recognized that 2 cells have been lost. When this happens, the readout of cells from the cell FIFO section 22 is halted for the time required to read 2 cells out, and, at the same time, an amount of dummy data equivalent to the 2 cells is created and output as User Information (UI). During the time that the cell readout is halted, 2 more cells arrive and are written into the cell FIFO section 22, so the number of cells in the cell FIFO 22 increases and returns to 20.

Thus, even when cells are lost, the number of cells in the cell FIFO section 22 is held fixed.

As explained above, in an existing type of fluctuation absorption device, by using the Sequence Number (SN) to control the cell FIFO buffer 22, the system is protected against cell loss. However, as shown in FIG. 2C, the Sequence Number (SN) is a 3-bit number, and its value is incremented cyclically. Consequently, the Sequence Number (SN) cannot have a value greater than 8, which causes the following problem.

FIG. 6 explains a problem that occurs in an existing type of fluctuation absorption device. Here the amount of fluctuation that is absorbed is 20. Suppose that in an ATM exchange device, 18 cells (SN=5, 6, 7, 0, 1, 2, 3, 4, then again SN=5 to 4, and SN=5 and 6) in a row are lost. Call the cell immediately before the 18 lost cells cell A (SN=4) and the cell immediately after them cell B (SN=7). Further, suppose that at the time at which cell A arrives, the number of cells in the cell FIFO section 22 is 20.

After cell A arrives, during the interval until cell B arrives no cells arrive, so the write-in of cells into the cell FIFO section 22 is halted, but readout of cells from the cell FIFO section 22 continues at a fixed bit rate. Consequently, the number of cells in the cell FIFO section 22 continues to decrease until cell B arrives. That is to say, since 18 cells are lost, the number of cells in the cell FIFO section 22 decreases from 20 to 2.

When cell B arrives, the Sequence Number of cell B is 7, while the Sequence Number (SN) of the immediately preceding arrived cell A was 4, so it is estimated that 2 cells were lost between cell A and cell B. This means that the readout of cells from the cell FIFO section 22 is only halted for the time it takes 2 cells to be read out; during this time dummy data are created to replace the lost cells SN=5 and 6 and output as User Information (UI). During the time that cell readout is halted from the cell FIFO section 22, 2 cells are received and written in the cell FIFO section 22, so the number of cells in the cell FIFO section 22 increases by 2 to 4.

After that, if cells arrive without further loss, the rates of read-in of cells into the cell FIFO section 22 and read-out of cells from the cell FIFO section 22 are equal, so the number of cells in the cell FIFO section 22 remains at 4.

Thus, in an existing type of fluctuation absorption device, if cells are lost in bursts, the number of cells in the cell FIFO section 22 will decrease. When the number of cells in the cell FIFO section 22 is at a low level, only a small delay of cells can cause the cell FIFO section 22 to become empty, making CBR data reproduction impossible. For example, in a service that transfers motion picture data if data are no longer reproduced at a constant bit rate, the motion picture will be disrupted and/or go out of synchronization with the audio data being transferred at the same time.

When motion picture data and audio data are routed inside the ATM exchange device in cell format, in general they have low priority, with a high probability of being discarded when congestion occurs. For this reason, it is possible for continuous loss of cells in which motion picture data and audio data are stored, in other words loss of cells in bursts, to occur.

SUMMARY OF THE INVENTION

The purpose of this invention is to provide a system for holding the number of packets stored in a buffer, which is provided for the purpose of absorbing fluctuations in the packet arrival interval, fixed, even when continuous loss (loss in bursts) of transferred packets occurs.

The buffer control system of this invention is configured so that received fixed-length packets are temporarily stored in a buffer and then read out of that buffer at a fixed bit rate. The arrival interval of the fixed-length packets and the Sequence Numbers which are assigned to each of the fixed-length packets and indicate the order in which the fixed-length packets were sent are used to compute the number of fixed-length packets that were lost; the number of packets stored in the buffer is increased by the number of packets that were lost. In another form of this invention is a system for controlling a buffer for storing fixed-length packets, each being assigned a Sequence Number indicating an order in which the fixed-length packets are sent incremented cyclically, and includes following means. A buffer storing arrived fixed-length packets. Sequence Number computing means for extracting Sequence Numbers form the fixed-length packets, and computing the difference between each sequence number and the Sequence Number of the immediately preceding arrived fixed-length packet. Arrival interval detecting means for detecting a time interval from the time when the immediately preceding fixed-length packet arrived until the time when the present fixed-length packet arrives. Control means for computing the number of fixed-length packets that have been lost according to the difference of Sequence Number and the time interval, and controlling the number of fixed-length packets stored in said buffer to compensate for the computed number of fixed-length packets that were lost.

DETAILED DESCRIPTION OF THE INVENTION

Figure 7:
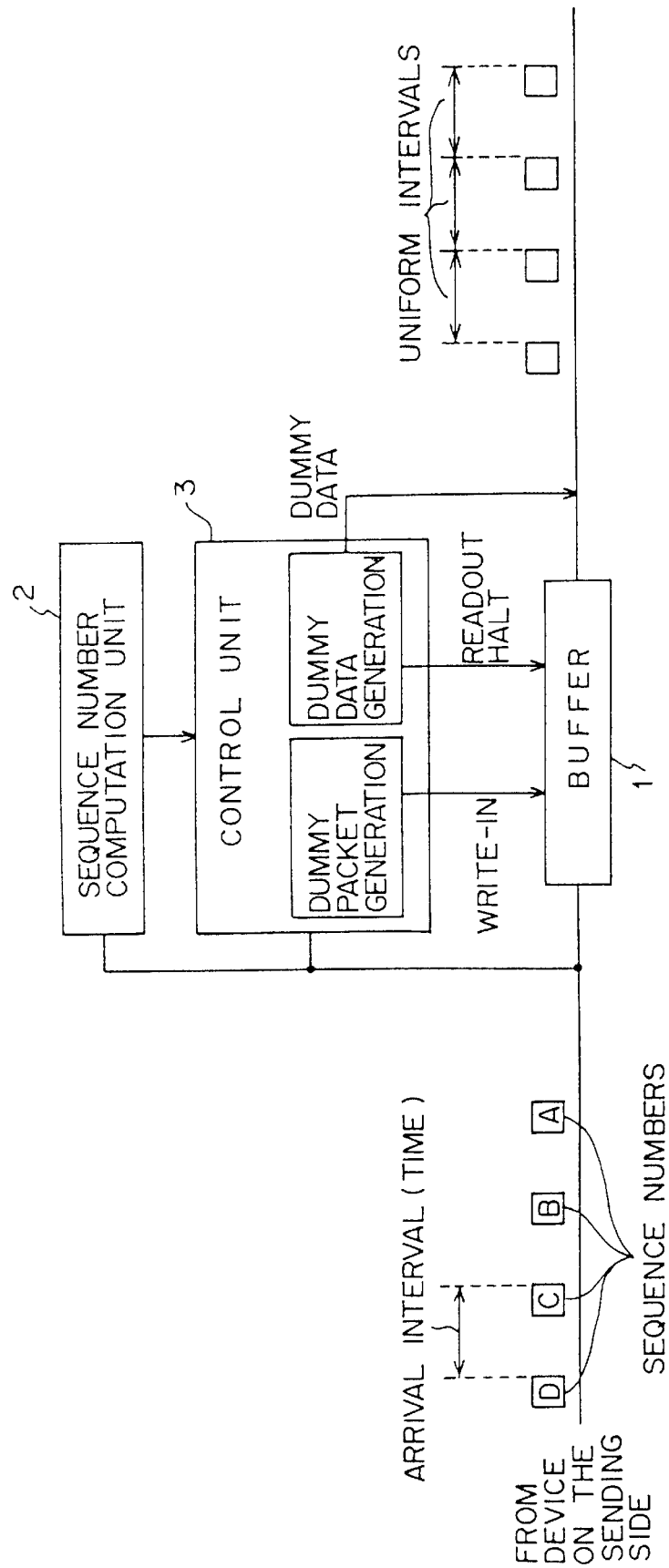
FIG. 7 is a diagram which explains the principle of this invention.

FIG. 7 is a diagram that explains the principle of this invention. The buffer control system of this invention temporarily stores received fixed-length packets in the buffer 1, then reads the fixed-length packets out of that buffer at a constant bit rate.

Each of the fixed-length packets is assigned Sequence Number (A, B, C, D, . . . ) that indicates the order in which it was sent by the device on the sending side. The Sequence Numbers are numbers that are incremented 1 at a time to indicate the order in which the fixed-length packets are sent; S integers are used to count cyclically.

If fixed-length packets are lost while fixed-length packets are being transferred, compared to the case in which fixed-length packets are transferred without being lost, the intervals between arrivals of fixed-length packets become longer. Here, if we assume that the device on the sending side sends fixed-length packets at uniform intervals, the number of cells that are lost can be roughly estimated by measuring the intervals between arrivals of fixed-length packets. In addition, when fixed-length packets are lost, the Sequence Numbers extracted from the fixed-length packets as they arrive are no longer incremented 1 at a time. That is to say, if we use Sequence Numbers, the loss of up to S cells can be accurately detected. Consequently, the number of fixed-length packets that are lost can be accurately computed by using the arrival intervals between fixed-length packets and the Sequence Numbers assigned to the fixed-length packets.

The Sequence Number computation unit 2 detects the Sequence Numbers assigned to each fixed-length packet; the information needed to compute how many fixed-length packets were lost is posted to the control unit 3. The control unit 3 computes the number of fixed-length packets that were lost based on the information posted from the Sequence Number computation unit 2 and the fixed-length packet arrival intervals.

When fixed-length packets are lost, the number of fixed-length packets stored in the buffer 1 increases by the number of fixed-length packets that were lost. This makes it possible for the number of fixed-length packets stored in the buffer 1 to be held fixed even when fixed-length packets are lost.

In order for the number of fixed-length packets stored in the buffer 1 to increase by the number of fixed-length packets that were lost, for example, a number of dummy packets equal to the computed number of fixed-length packets that were lost are created and written into the buffer 1. Or, alternatively, readout from buffer 1 can be halted for the time required to read out the number of fixed-length packets equal to the computed number of fixed-length packets that were lost, and dummy data is created to replace the fixed-length packets that would have been read out of the buffer 1 during that time. Or, alternatively, both write-in of dummy packets and creation of dummy data can be used in combination.

In the buffer control system described above, if the waiting time from the arrival of one fixed-length packet until the arrival of the next fixed-length packet exceeds a certain threshold value, the write-in of dummy packets to buffer 1 is halted. If, for example, the device on the sending side breaks down, so that fixed-length packets do not arrive, buffer 1 will become empty, providing a means of detecting the breakdown.

DETAILED DESCRIPTION OF THE PREFERRED EMBODIMENT

Now we will explain embodiments of this invention referring to the drawings. The following explanation presupposes that we have an ATM network which provides service in accordance with an ATM Adaptation Layer (referred to below as an AAL) type 1. That is to say, we envision a CBR service in which data are transferred at a constant bit rate. On the sending side, data to be transferred at a constant bit rate are stored in cells and those cells are sent at uniform intervals; on the receiving side, data are reproduced at a constant bit rate from the cells that arrive. In this system, it is expected that cells will arrive at the receiving side at uniform intervals if cells are not, for example, lost in the ATM exchange device. In the following explanation, this uniform arrival interval will be referred to as the expectation value of the cell arrival interval.

In the system described above, the actual cell arrival intervals on the receiving side fluctuate with respect to that expectation value, so the received cells are temporarily stored in a buffer and then read out of that buffer at a constant bit rate to absorb the fluctuations. The buffer control system explained for this embodiment controls the number of cells stored in this fluctuation-absorbing buffer.

Figure 1:
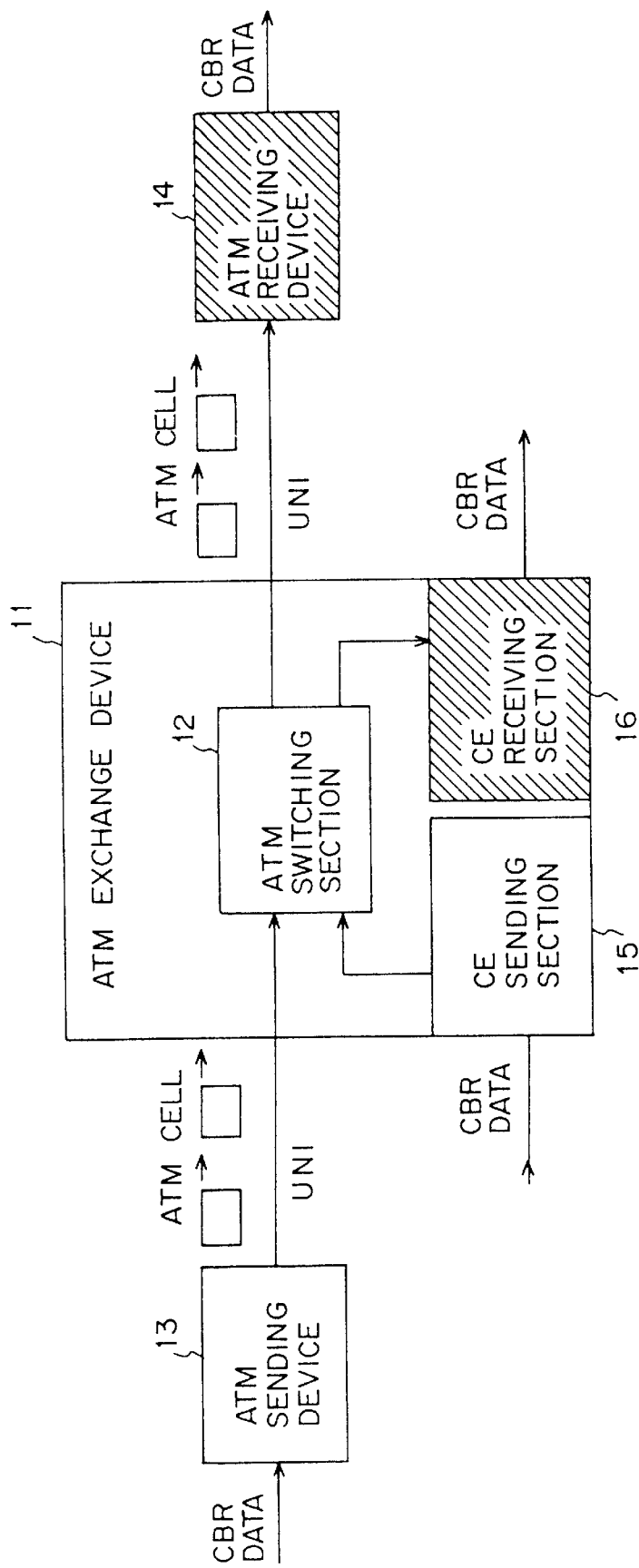
FIG. 1 is an overall system configuration diagram.
Figure 2A:
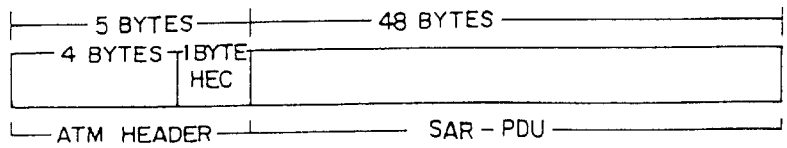
FIG. 2A is a configuration of an ATM cell.
Figure 2B:
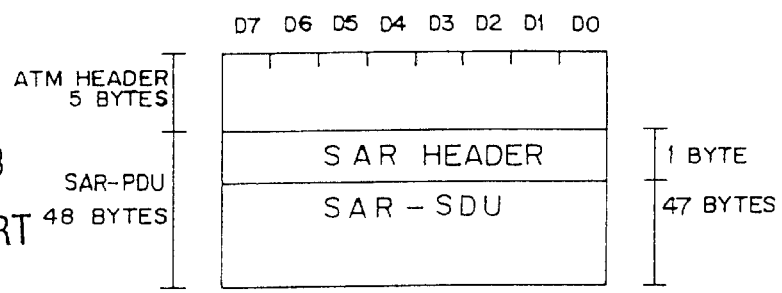
FIG. 2B is a configuration of SAR-PDU in AAL1.
Figure 2C:
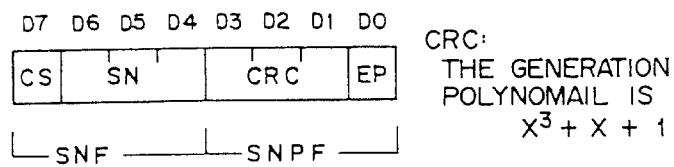
FIG. 2C is a configuration of an SAR header.
Figure 3A:
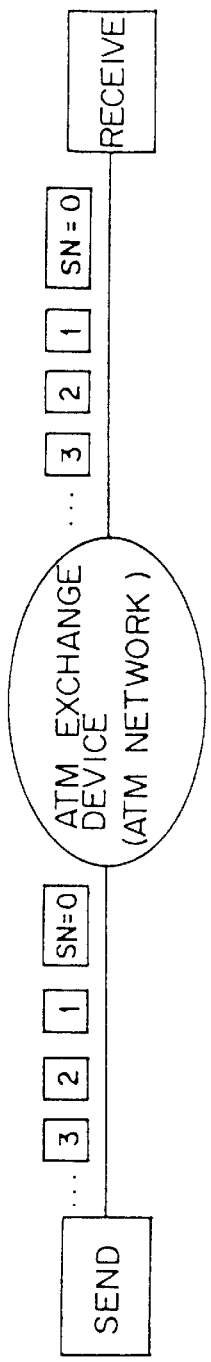
FIG. 3A is a diagram which explains a method of detecting cell loss using Sequence Numbers; this shows the case in which a cell is not lost.
Figure 3B:
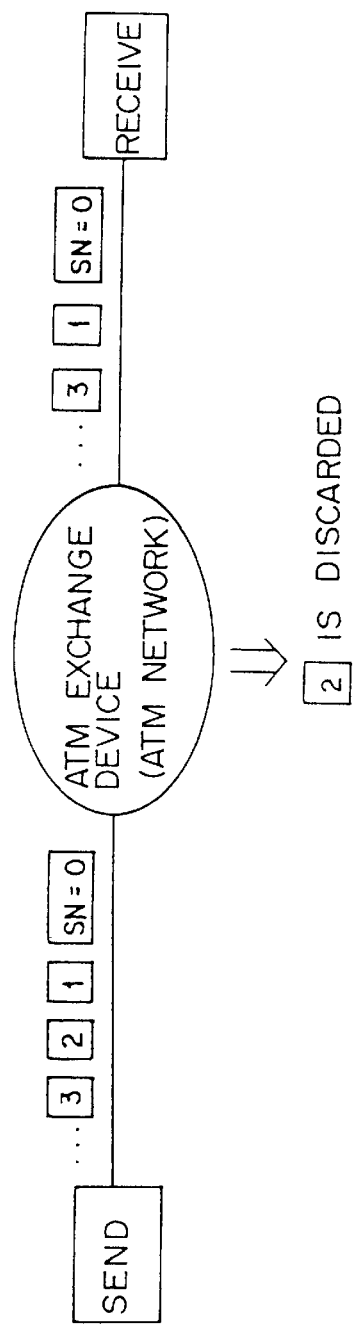
FIG. 3B is a diagram which explains a method of detecting cell loss using Sequence Numbers; this shows the case in which a cell is lost.

The buffer control system of this embodiment is, for example, incorporated into the ATM receiving device 14 or the CE receiving device 16 in the system shown in FIG. 1. Further, the format of an ATM cell which is the unit of data transfer is shown in FIG. 2A; the configurations of the SAR-SDU and the SAR header in AAL1 are shown in FIGS. 2B and 2C, respectively. In the following explanation, we will show a buffer that stores cells transferred via a UNI, but this invention can also be applied to a buffer that stores cells transferred via an NNI (Network-Network Interface).

Figure 8:
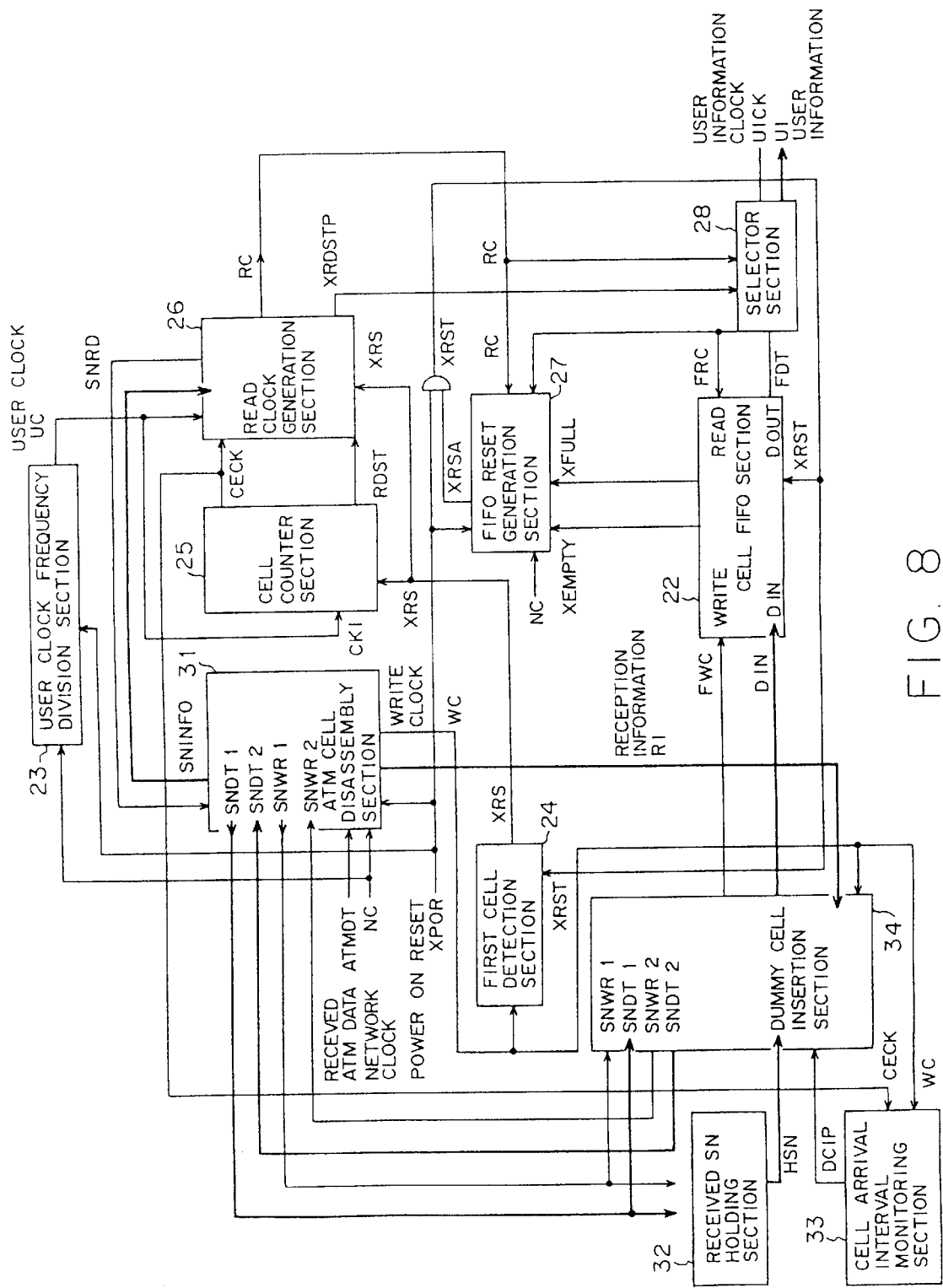
FIG. 8 is a diagram showing the configuration of the buffer control system in this embodiment.

FIG. 8 is a configuration diagram of the buffer control system of this embodiment. The buffer control system shown in FIG. 8 is based on the fluctuation absorption device in FIG. 4; the same symbols indicate the same functional blocks. That is to say, the cell FIFO section 22, the User Clock frequency division section 23, the first cell detection section 24, the cell counter section 25, the Read Clock generation section 26, the FIFO Reset generation section 27 and the selector section 28 are as was explained with reference to FIG. 4.

The ATM cell disassembly section 31 is the ATM cell disassembly section 21 with several functions added.

The ATM cell disassembly section 31 extracts the 47-byte information field (SAR-SDU) from the arrived cells and transfers them to the dummy cell insertion section 34. In addition, the ATM cell disassembly section 31 posts the Sequence Numbers extracted from the arrived cells or the Sequence Numbers held in the received SN holding section 32 to the Read Clock generation section 26.

The received SN holding section 32, the cell arrival interval monitoring section 33 and the dummy cell insertion section 34 form a circuit block that is new in this embodiment. The received SN holding section 32 holds the Sequence Number extracted from the immediately preceding arrived cell, that is to say, the most recently arrived cell.

The cell arrival interval monitoring section 33 starts measuring from the time when each cell arrives and monitors the time interval until the next cell arrives. Then, every time a time equal to 8 times the expectation value of the cell arrival interval elapses, a Dummy Cell Insertion Pulse (DCIP) is output to the dummy cell insertion section 34. In addition, after a time equal to M times the 8 times the expectation value of the cell arrival interval elapses, Dummy Cell Insertion Pulses (DCIPs) are no longer output.

The dummy cell insertion section 34 normally returns the Sequence Numbers extracted from the received cells to the ATM cell disassembly section 31, then writes the Received Information (RI, the 47-byte information field SAR-SDU) into the cell FIFO section 22. When a Dummy Cell Insertion Pulse (DCIP) is received from the cell arrival interval monitoring section 33, the dummy cell insertion section 34 transfers the Sequence Number held in the received SN holding section 32 to the ATM cell disassembly section 31, and creates a dummy cells and writes them into the cell FIFO section 22. Here it is assumed that a dummy cell consists of 47 bytes of information, for example, all 0's.

The buffer control system with the configuration described above is incorporated into each connection identified by, for example, a VPI/VCI (Virtual Path Identifier/ Virtual Channel Identifier). The configurations and actions of each block will be explained in detail later.

Next, the basic actions of the buffer control system shown in FIG. 8 will be explained.

A cell that arrives is first transferred to the ATM cell disassembly section 31. The ATM cell disassembly section 31 disassembles each cell into an ATM header, an SAR header and an SAR-PDU. If the VPI/VCI stored in the ATM header is the VPI/VCI that was specified in advance, that cell is taken in; if it is other than the VPI/VCI that was specified in advance then that cell is discarded. In addition, the ATM cell disassembly section 31 transfers the Sequence Number stored in the SAR header of a cell that is taken in to the received SN holding section 32, and transfers the SAR-PDU to the dummy cell insertion section 34.

When no cells are lost, since the cells are being sent at uniform intervals, although there is some fluctuation in the cell arrival intervals they do not become much longer than the expectation value of the cell arrival interval. For this reason, the cell arrival interval monitoring section 33 does not output Dummy Cell Insertion Pulses (DCIPs). While Dummy Cell Insertion Pulses (DCIPS) are not being received, the dummy cell insertion section 34 writes the SAR-PDUs received from the ATM cell disassembly section 31 into the cell FIFO section 22.

In addition, while cell loss is not occurring, the Sequence Numbers extracted from the cells that are arriving one after another are incremented 1 at a time, repeating the values 0 to 7 cyclically. The sequence numbers are temporarily transferred to the dummy cell insertion section 34, but Dummy Cell Insertion Pulses (DCIPs) are not generated, so the dummy cell insertion section 34 returns those Sequence Numbers to the ATM cell disassembly section 31. The Read Clock generation section 26 receives the Sequence Numbers, incremented 1 at a time, from the ATM cell disassembly section 31; when it is confirmed that those values are continuous, a Read Clock (RC) is transferred to the selector section 28.

The selector section 28 reads out the SAR-PDU from the cell FIFO 22 in accordance with the Read Clock (RC). Note that writing into or reading out of the cell FIFO 22 is done in 47-byte units (SAR-PDU units), so that essentially access is in cell units. In the following explanation we assume that writing and reading are done one cell at a time.

Thus, when cell loss is not occurring, cells sent from the sending side are written into the cell FIFO 22 in the order in which they were sent; those cells are read out at a constant bit rate in accordance with the Read Clock (RC) and then output as user Information (UI). The User Information (UI) is transferred to a reproduction device, not shown in the drawings here.

Meanwhile, when a cell is discarded so that no cell arrives even after more than 8 times the expectation value of the interval from the arrival of one cell to the arrival of the next cell elapses, the cell arrival interval monitoring section 33 generates a Dummy Cell Insertion Pulse (DCIP). When a Dummy Cell Insertion Pulse (DCIP) is generated, the system judges that a cell has been lost, and executes processing to compensate for that lost cell.

Methods available for compensating for lost cells are the dummy cell insertion method and the dummy data creation method. In the dummy cell insertion method, when the dummy cell insertion section 34 receives a Dummy Cell Insertion Pulse (DCIP), it creates a dummy cell (47 bytes of information) and writes that dummy cell into the cell FIFO section 22. In this method, if a number of dummy cells equal to the number of cells that were lost are written into the cell FIFO section 22, the number of cells written into the cell FIFO section 22 is the same as when no cells are lost.

In the dummy data creation method, readout of cells from the cell FIFO section 22 is halted, and 47 bytes of dummy data are created to replace the data that were stored in the SAR-PDU of the lost cell, and then output as User Information (UI). In this method, if readout of cells from the cell FIFO section 22 is halted for the time required to read out a number of cells equal to the number of cells that were lost from the cell FIFO section 22, then the number of cells (amount of data) stored in the cell FIFO section 22 when cells are lost will be the same as the number of cells in the cell FIFO section 22 when cells are not lost and when cells are read out according to the Read Clock (RC).

In the buffer control system of this embodiment, the number of cells stored in the cell FIFO section 22 is kept fixed by using the dummy cell insertion method and/or the dummy data creation method. In the following discussion, we will describe several forms of this embodiment, with reference to the drawings.

We describe the forms of the embodiment assuming that in the ATM exchange device, 18 cells in a row (SN=3, 4, 5, 6, 7, 0, 1, 2; SN=3 to 2 again; and SN=3, 4) are lost. The cell immediately preceding the 18 lost cells (SN=2) is called cell A, and the cell immediately after the 18 lost cells (SN=5) is called cell B. Also, we let T be the expectation value of the cell arrival interval.

The expectation value T of the cell arrival interval is found, for example, by the following method. For example, in a service which transfers motion picture data at the rate of 6 Mbps, if those motion picture data are stored in cells, 47 bytes to a cell, to be transferred, then $(6\times10^6)/(47\times8)$ cells are transferred per second. Consequently, on average a cell is transferred every $(47\times8)/(6\times10^6)$ second. This is the expectation value T of the cell arrival time.

Figure 9:
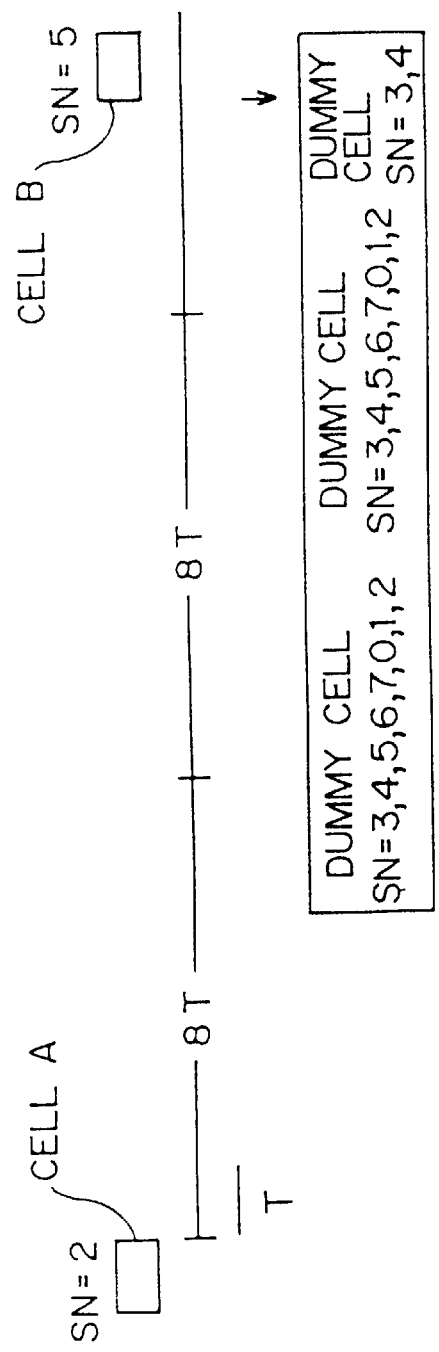
FIG. 9 is a diagram explaining the action concept of the 1st type of buffer control system.

FIG. 9 is a diagram that explains the action concept of the 1st form of this embodiment. In this 1st form of the embodiment, when cell B arrives, the system recognizes that 18 cells have been lost between cell A and cell B, and the dummy cell insertion section 34 creates 18 dummy cells and writes them into the cell FIFO section 22.

The number of cells that were lost between cell A and cell B is determined as follows. The cell arrival interval monitoring section 33 starts measuring time at the instant when cell A arrives, and outputs a Dummy Cell Insertion Pulse (DCIP) every time 8T (8 times the expectation value of the cell arrival interval) elapses. This action continues until cell B arrives. Consequently, 2 Dummy Cell Insertion Pulses (DCIPs) are created by the time cell B arrives. This tells the system that 8×2 cells have been lost. In addition, since the Sequence Number of cell A is 2 and the Sequence Number of cell B is 5, the system recognizes that cells SN=3 and SN=4 were lost. In this way it is determined that 18 cells were lost.

Thus, in the 1st form of this embodiment, 18 dummy cells are created to replace the 18 cells that were lost and written into the cell FIFO section 22, so the number of cells (amount of data) stored in the cell FIFO section 22 is the same as when no cells are lost.

Figure 10:
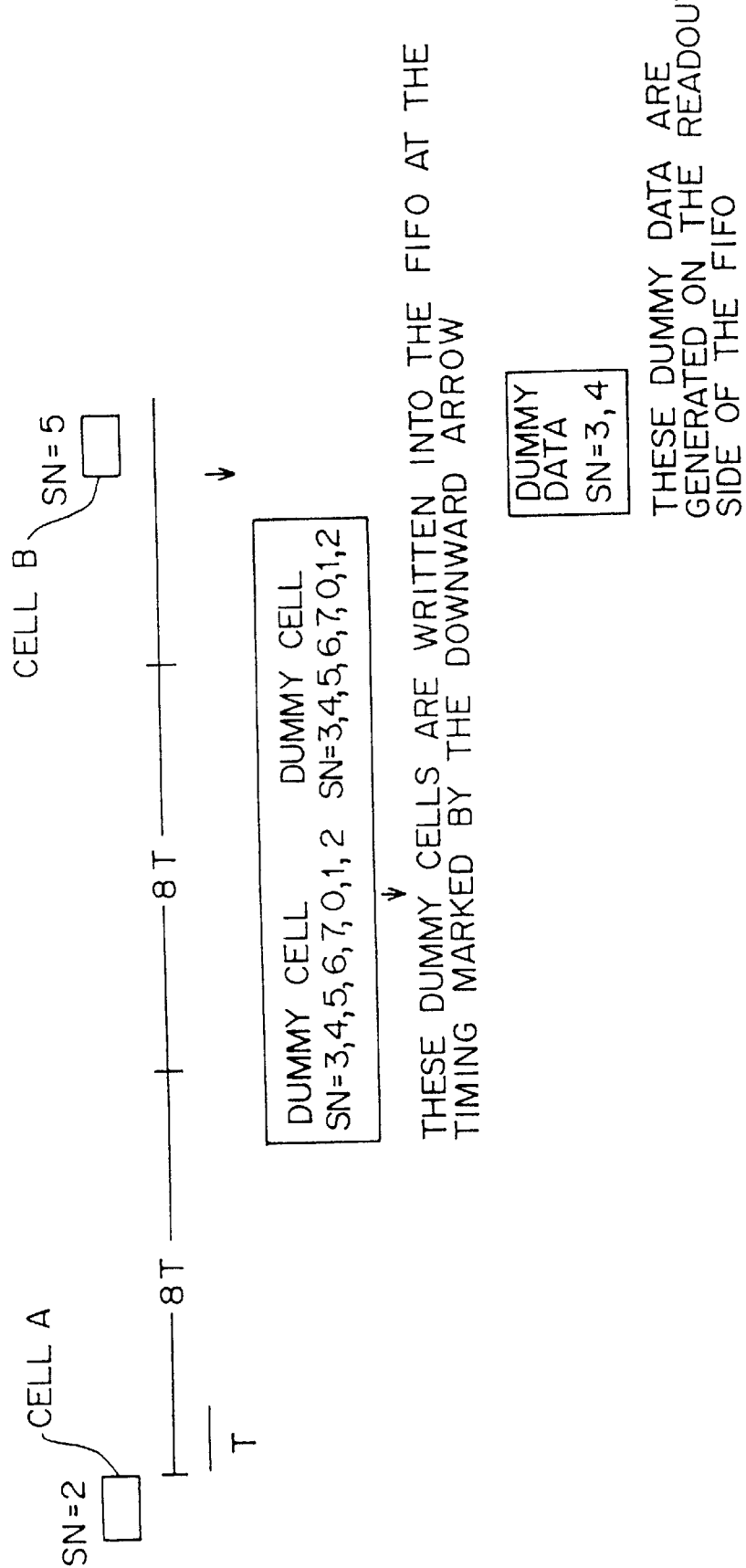
FIG. 10 is a diagram explaining the action concept of the 2nd type of buffer control system.

FIG. 10 is a diagram that explains the action concept of the 2nd form of this embodiment. In the 2nd form of this embodiment, when cell B arrives, the dummy cell insertion section 34 creates 8×2 dummy cells and writes them into the cell FIFO section 22, and, at the same time, in place of reading 2 cells (the cells corresponding to SN=3 and SN=4) out of the cell FIFO section 22, the selector section 28 creates dummy data and outputs them as User Information (UI).

Thus, in the 2nd form of this embodiment, 16 dummy cells are created in partial compensation for the 18 cells that were lost and written into the cell FIFO section 22, and, at the same time, dummy data are created in place of reading 2 cells out of the cell FIFO section 22, so that the number of cells (amount of data) stored in the cell FIFO section 22 is the same as when no cells are lost.

Figure 11:
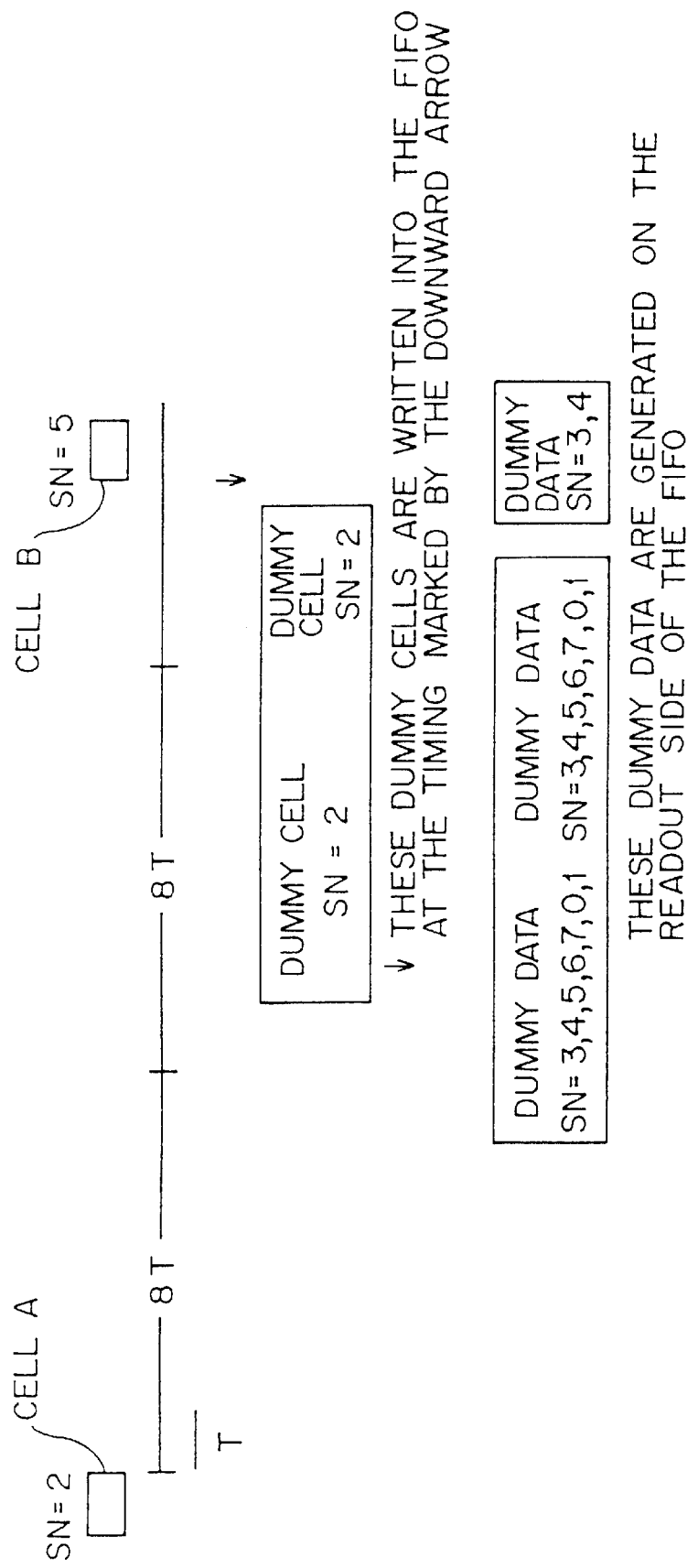
FIG. 11 is a diagram explaining the action concept of the 3rd type of buffer control system.

FIG. 11 is a diagram that explains the action concept of the 3rd form of this embodiment. In the 3rd form of this embodiment, when cell B arrives, first the dummy cell insertion section 34 creates 2 dummy cells and writes them into the cell FIFO section 22. These 2 dummy cells have the same Sequence Number (SN=2) as cell A, and are called the 1st dummy cell and the 2nd dummy cell. Cells are stored in the cell FIFO section 22 in the order cell A (SN=2), the 1st dummy cell (SN=2), the 2nd dummy cell (SN=2), cell B (SN=5). For this reason, it is considered that 7 cells have been lost between cell A and the 1st dummy cell; the selector section 28 creates an amount of data corresponding to 7 cells, and those dummy data are output as User Information (UI) in place of reading 7 cells out of the cell FIFO section 22. Similarly, it is considered that 7 cells were lost between the 1st dummy cell and the 2nd dummy cell, and that 2 cells were lost between the 2nd dummy cell and cell B; an amount of dummy data corresponding to 9 cells are created to compensate for those lost cells and output as User Information (UI).

Thus, in the 3rd form of this embodiment, to compensate for the 18 lost cells 2 dummy cells are created and written into the cell FIFO section 22, and then, dummy data equivalent to 16 cells are created in place of reading 16 cells out of the cell FIFO section 22, so that the number of cells (amount of data) stored in the cell FIFO section 22 is the same as when no cells are lost.

Figure 12:
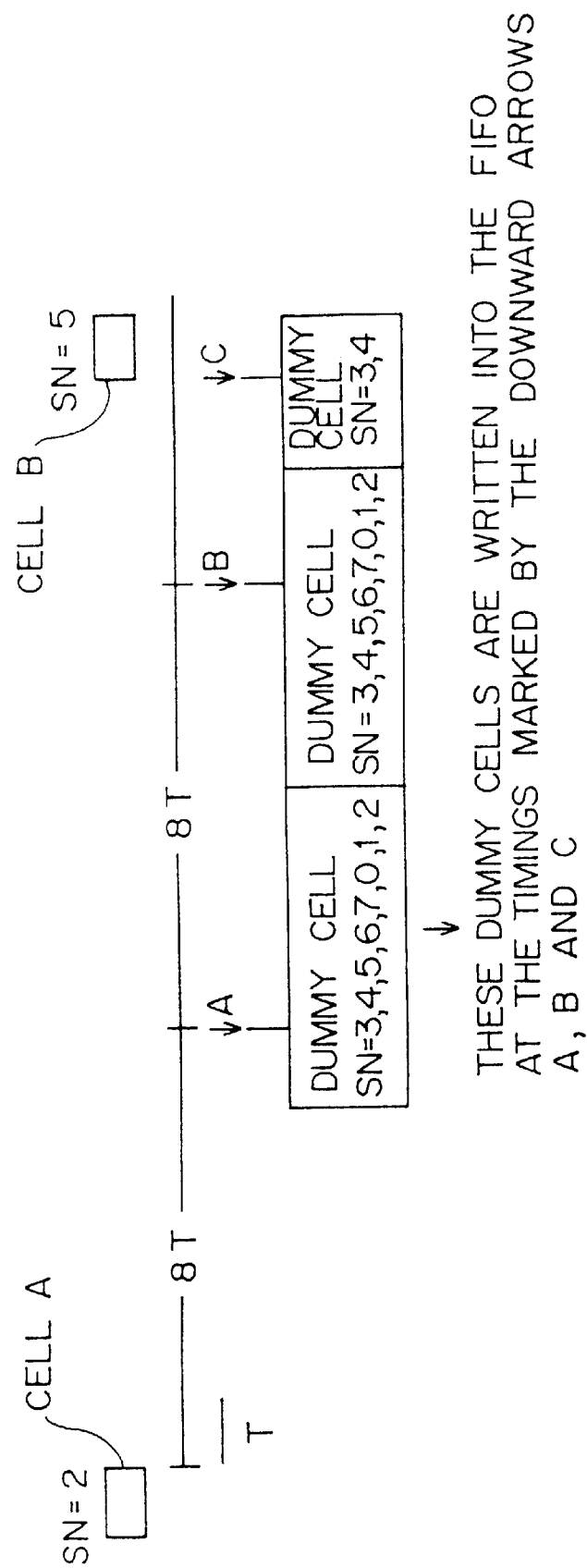
FIG. 12 is a diagram explaining the action concept of the 4th type of buffer control system.

FIG. 12 is a diagram that explains the action concept of the 4th form of this embodiment. In the 4th form of this embodiment, every time a Dummy Cell Insertion Pulse (DCIP) is created (every 8T) 8 dummy cells are created and written into the cell FIFO section 22. In addition, when cell B arrives, since the Sequence Number of cell A is 2 and the Sequence Number of cell B is 5, it is recognized that the cells SN=3 and SN=4 have been lost, so that 2 more dummy cells are created and written into the cell FIFO section 22.

Thus, in the 4th form of this embodiment, 18 dummy cells are created and written into the cell FIFO section 22 to compensate for the 18 cells that were lost, so the number of cells (amount of data) stored in the cell FIFO section 22 is the same as when no cells are lost.

Figure 13:
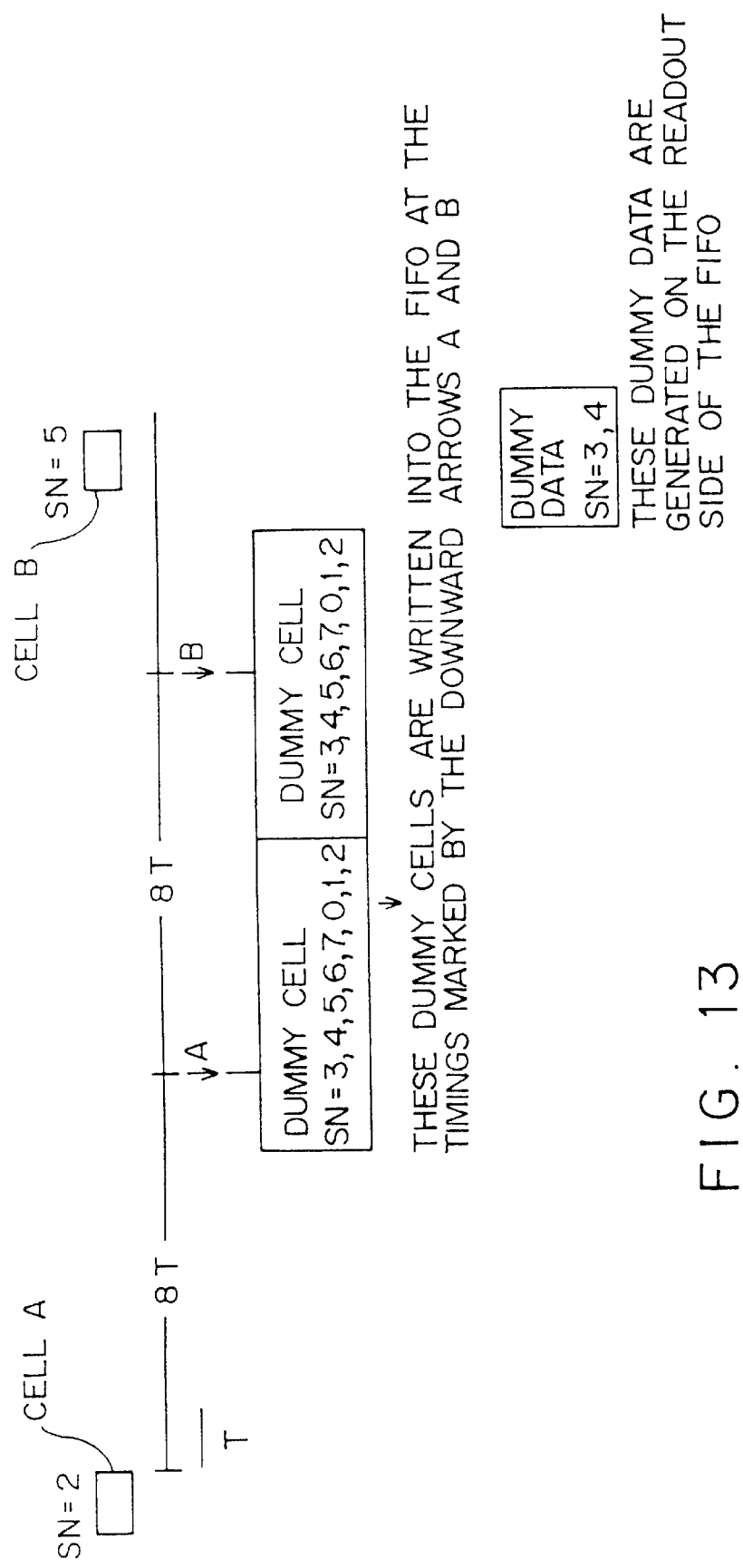
FIG. 13 is a diagram explaining the action concept of the 5th type of buffer control system.

FIG. 13 is a diagram that explains the action concept of the 5th form of this embodiment. In the 5th form of this embodiment, every time a Dummy Cell Insertion Pulse (DCIP) is generated (every 8T), 8 dummy cells are created and written into the cell FIFO section 22. In addition, when cell B arrives, since the Sequence Number of cell A is 2 and the Sequence Number of cell B is 5, it is recognized that cells SN=3 and SN=4 have been lost, and the selector section 28 creates dummy data and outputs them as User Information (UI) in place of reading 2 cells (corresponding to SN=3 and SN=4) out of the cell FIFO section 22.

Thus, in the 5th form of this embodiment, to compensate for the 18 lost cells 16 dummy cells are created and written into the cell FIFO section 22 and, in place of reading 2 cells out of the cell FIFO section 22 dummy data corresponding to those 2 cells are generated, so the number of cells (amount of data) stored in the cell FIFO section is the same as when no cells are lost.

Figure 14:
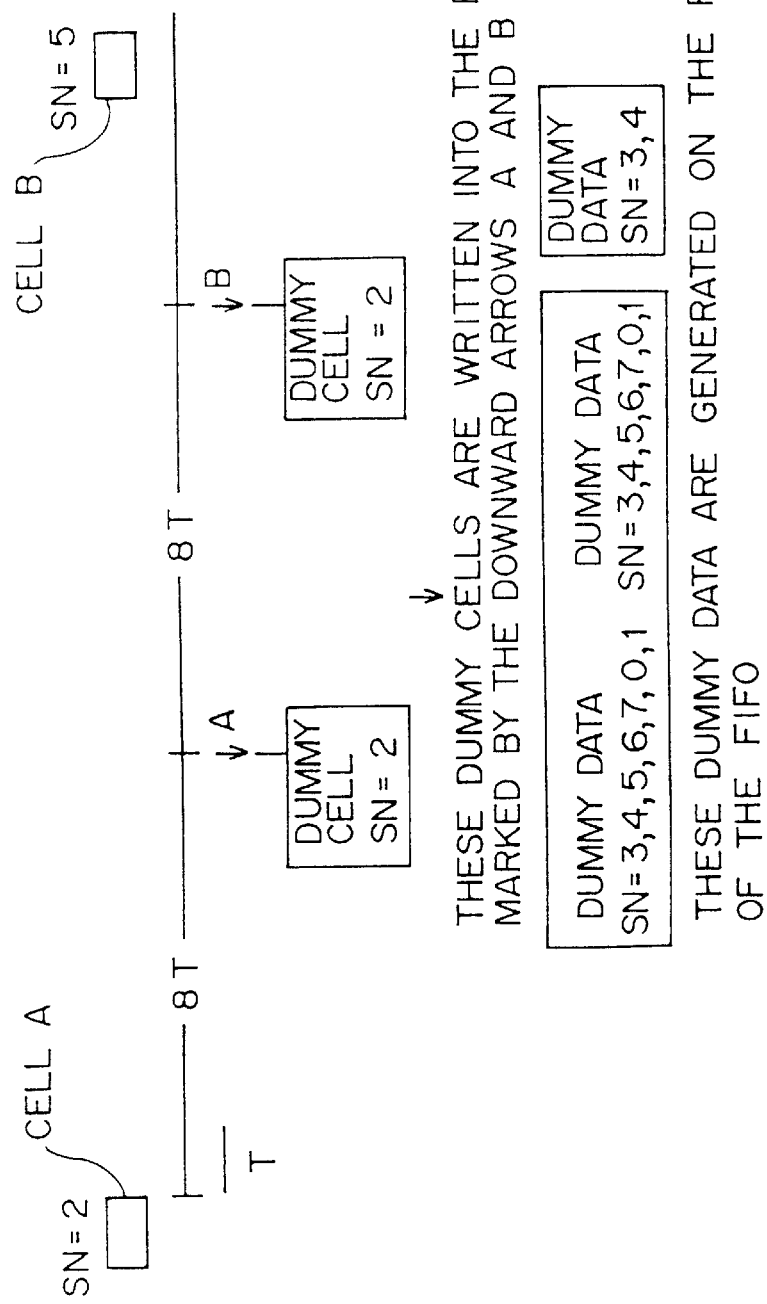
FIG. 14 is a diagram explaining the action concept of the 6th type of buffer control system.

FIG. 14 is a diagram that explains the action concept of the 6th form of this embodiment. In the 6th form of this embodiment, every time a Dummy Cell Insertion Pulse (DCIP) is generated (every 8T), a dummy cell having the same Sequence Number as cell A (SN=2) is created and written into the cell FIFO 22. As in the 3rd form of this embodiment shown in FIG. 11, when this is done an amount of dummy data corresponding to 16 cells are created, and those dummy data are output as User information (UI) in place of reading 16 cells out of the cell FIFO section 22.

Thus, in the 6th form of this embodiment, as in the 3rd form of this embodiment, the number of cells (amount of data) stored in the cell FIFO section 22 is the same as when no cells are lost.

Even aside from the 1st to 6th forms of this embodiment described above, it is sufficient to create dummy data corresponding to 18 cells and output them as User Information (UI) in place of reading 18 cells out of the cell FIFO section 22.

Figure 15:
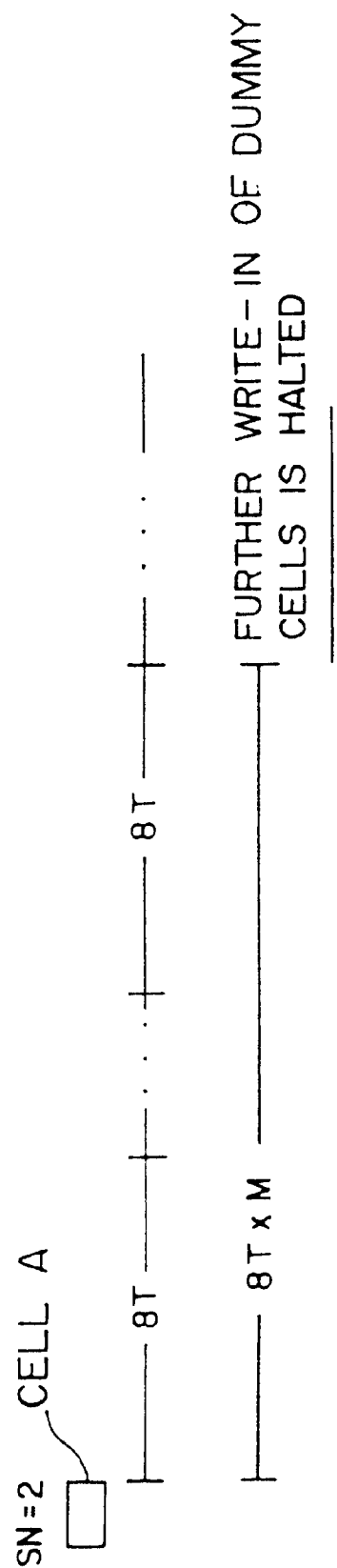
FIG. 15 is a diagram explaining the action concept of the 7th type of buffer control system.

FIG. 15 is a diagram that explains the action concept of the 7th form of this embodiment. In the 7th form of this embodiment, processing to deal with the case in which cell transfer is halted by a breakdown on the sending side is executed; this can be applied to any of the 1st to 6th forms of the embodiment described above.

In the 7th form of this embodiment, if the cell after cell A has not yet arrived after M times 8T has elapsed, the processing that writes dummy cells into the cell FIFO section 22 is halted. The elapsed time is measured by the cell arrival interval monitoring section 33. Then, when that time exceeds M times 8T, by halting the generation of Dummy Cell Insertion Pulses (DCIPs) the writing of dummy cells into the cell FIFO section 22 is halted.

When cell transfer is halted due to (for example) a breakdown on the sending side, if the writing of dummy cells into the cell FIFO section 22 is halted, the cell FIFO section 22 becomes empty, so the system becomes aware of starvation (drying up of cells).

Figure 6:
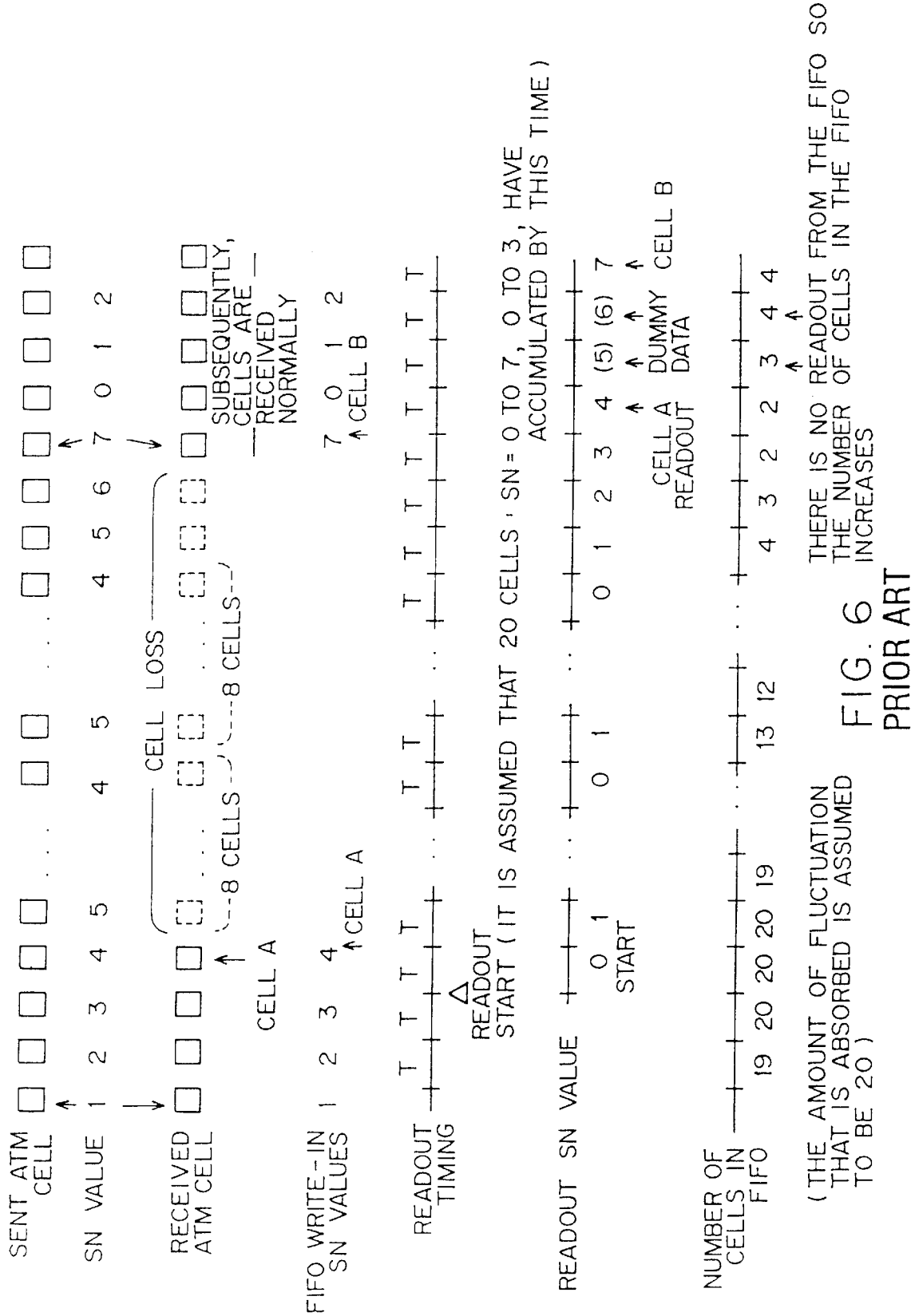
FIG. 6 is a diagram explaining a problem with the existing fluctuation-absorbing device.
Figure 16:
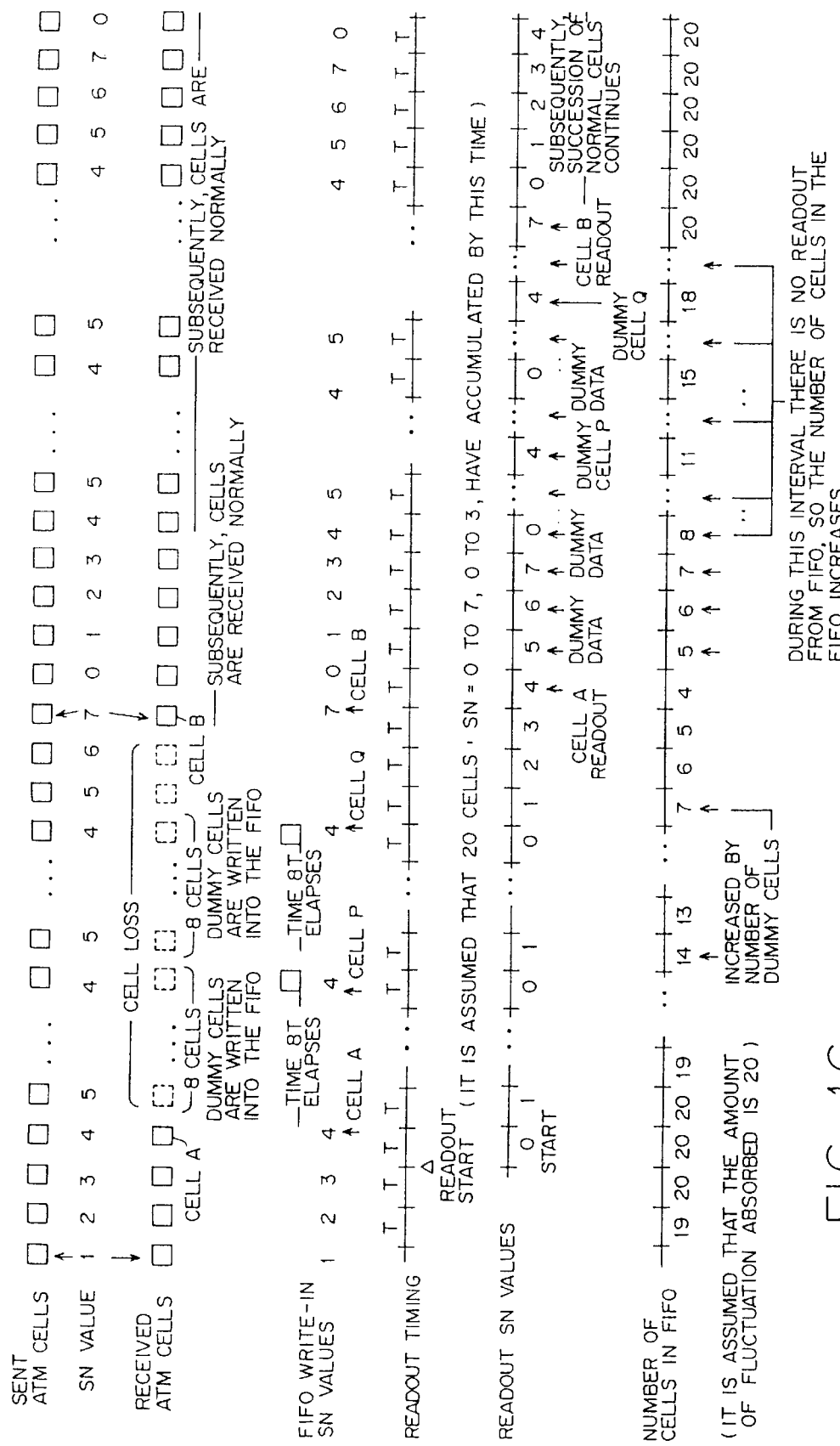
FIG. 16 is a diagram explaining the action of the 6th type of buffer control system.

FIG. 16 is a diagram that explains the action concept of the 6th form of this embodiment. Here we take the fluctuation absorbing capacity of the cell FIFO section to be 20. In addition, in the ATM exchange device, as explained in the example shown in FIG. 6, we assume that 18 cells in a row (SN=5, 6, 7, 0, 1, 2, 3, 4; then SN=5 to 4 again and then SN=5 and 6) are lost. The cell immediately before the 18 lost cells is called cell A (SN=4), and the cell immediately after the 18 lost cells is called cell B (SN=7). After cell B arrives, cells continue to arrive without further loss. It is further assumed that when cell A is received, the number of cells in the cell FIFO section 22 is 20.

After cell A arrives, no cells are written into the cell FIFO section 22 during the time until the next cell arrives, but cell readout from the cell FIFO section 22 continues at a constant bit rate. Consequently, the number of cells in the cell FIFO section 22 decreases.

When a time 8T (8 times the expectation value of the cell arrival interval) elapses, the cell arrival interval monitoring section 33 generates a Dummy Cell Insertion Pulse (DCIP), and the dummy cell insertion section 34 creates 1 dummy cell in accordance with that Dummy Cell Insertion Pulse (DCIP) and writes it into the cell FIFO section 22. The dummy cell written into the cell FIFO section 22 at this time has the same Sequence Number (SN=4) as cell A. This dummy cell is called cell P.

Cells continue not arriving even after the cell P is written into the cell FIFO section 22, so the number of cells in the cell FIFO section 22 continues to decrease. Then, when a time 8T after the cell P is written into the cell FIFO section 22 elapses (when a time 16T after cell A is received elapses), again the cell arrival interval monitoring section 33 generates a Dummy Cell Insertion Pulse (DCIP). The dummy cell insertion section 34 creates a dummy cell in accordance with this Dummy Cell Insertion Pulse (DCIP) and writes it into the cell FIFO section 22. This dummy cell also has the same Sequence Number (SN=4) as cell A. This dummy cell is called cell Q. After this, when cell B arrives, cell B is written into the cell FIFO section 22.

The cell FIFO section 22 stores 20 cells (SN=0 to 7, 0 to 7 and 0 to 3) at the time of arrival of cell A. Following these 20 cells, cell A (SN=4), cell P (SN=4), cell Q (SN=4) and cell B (SN=7) are written in in that order.

The Read Clock generation section 26 monitors the Sequence Number of each cell. For example, if SN=5 follows SN=4, it is judged that cell loss has not occurred, while if SN=4 is followed by SN=7, then it is judged that cells SN=5 and N=6 were lost. Further, if SN=4 is followed by SN=4, then it is judged that cells SN=5, 6, 7, 0, 1, 2 and 3 have been lost. When cell loss is detected, The Read Clock generation section 26 outputs an XRDSTP signal to halt cell readout from the cell FIFO section 22, in order to compensate for the cell loss. When the selector section 28 receives a readout stop signal XRDSTP, cell readout processing from the cell FIFO section 22 is halted, and dummy data are created and output in place of reading cells out of the cell FIFO section 22.

Since the order in which cells are read out of the cell FIFO section 22 is the same as the order in which they were written into the cell FIFO section 22, following the 20 cells, cell A, cell P, cell Q and cell B are read out in that order. At this time, since the Sequence Numbers of cell A and cell P are both 4, it is judged that 7 cells (the cells with SN=5, 6, 7, 0, 1, 2, 3) have been lost. Consequently, the READ CLOCK generation section 26 outputs a Read Stop signal XRDSTP so that cell readout from the cell FIFO section 22 is halted for just the time required for 7 cells to be read out of the cell FIFO section 22. When this Read Stop signal XRDSTP is received, the selector section 28 creates 7 cells of dummy data to replace the missing 7 cells of readout from the cell FIFO section 22.

Similarly, it is judged that 7 cells have been lost between cell P and cell Q, and that another 2 cells have been lost between cell Q and cell B. To compensate for those lost cells, 9 cells of dummy data are created to replace the 9 missing cells from the cell FIFO section 22.

The number of cells (amount of data) in the cell FIFO section 22 changes as follows. First, since no cells arrive during the time 8T after the time of arrival of cell A, no cells are written into the cell FIFO section 22, but a cell is read out every 1T, so the number of cells decreases from 20 to 12. However, cell P (a dummy cell) is written in, so the number of cells becomes 13. The same action is repeated during the next 8T, so the number of cells becomes 6. Then another 2 cells are read out before cell A is read out, so the number of cells becomes 4.

After cell A is read out, as stated above in order to compensate for the loss of cells between cell A and cell P cell readout from the cell FIFO section 22 is halted for the time required to read 7 cells out from the cell FIFO section 22. At this time, cells that arrive starting with cell B are written into the cell FIFO section 22 one after another, so the number of cells increases an average of 1 every 1T. That is to say, the number of cells increases from 4 to 11. Similarly, in order to compensate for the losses of cells between cell P and cell Q and between cell Q and cell B, cell readout from the cell FIFO section 22 is halted for the times required to read 7 and 2 cells, respectively, out of the cell FIFO section 22. Consequently, the number of cells increases from 11 to 20.

Starting with cell B, cells arrive without further loss, so the average rate of cell write-in to the cell FIFO section 22 becomes the same as the rate of cell readout from the cell FIFO section 22, so the number of cells in the cell FIFO section 22 is fixed at 20.

Thus, in the 6th form of this embodiment, even if 8 or more cells in a row are lost, the number of cells in the cell FIFO section 22 (20 in the example given here) returns to its former value, so the amount of fluctuation that is absorbed does not change. That is to say, slight fluctuation does not cause the cell FIFO section 22 to become empty.

In FIG. 16, we have explained the action in the 6th form of this embodiment, lost cells are also compensated for by read-in of dummy cells and/or creation of dummy data in the 1st to 5th forms of this embodiment, so the number of cells in the cell FIFO section 22 can be held fixed.

Next, the configurations and actions of the blocks shown in FIG. 8 will be explained.

Figure 17:
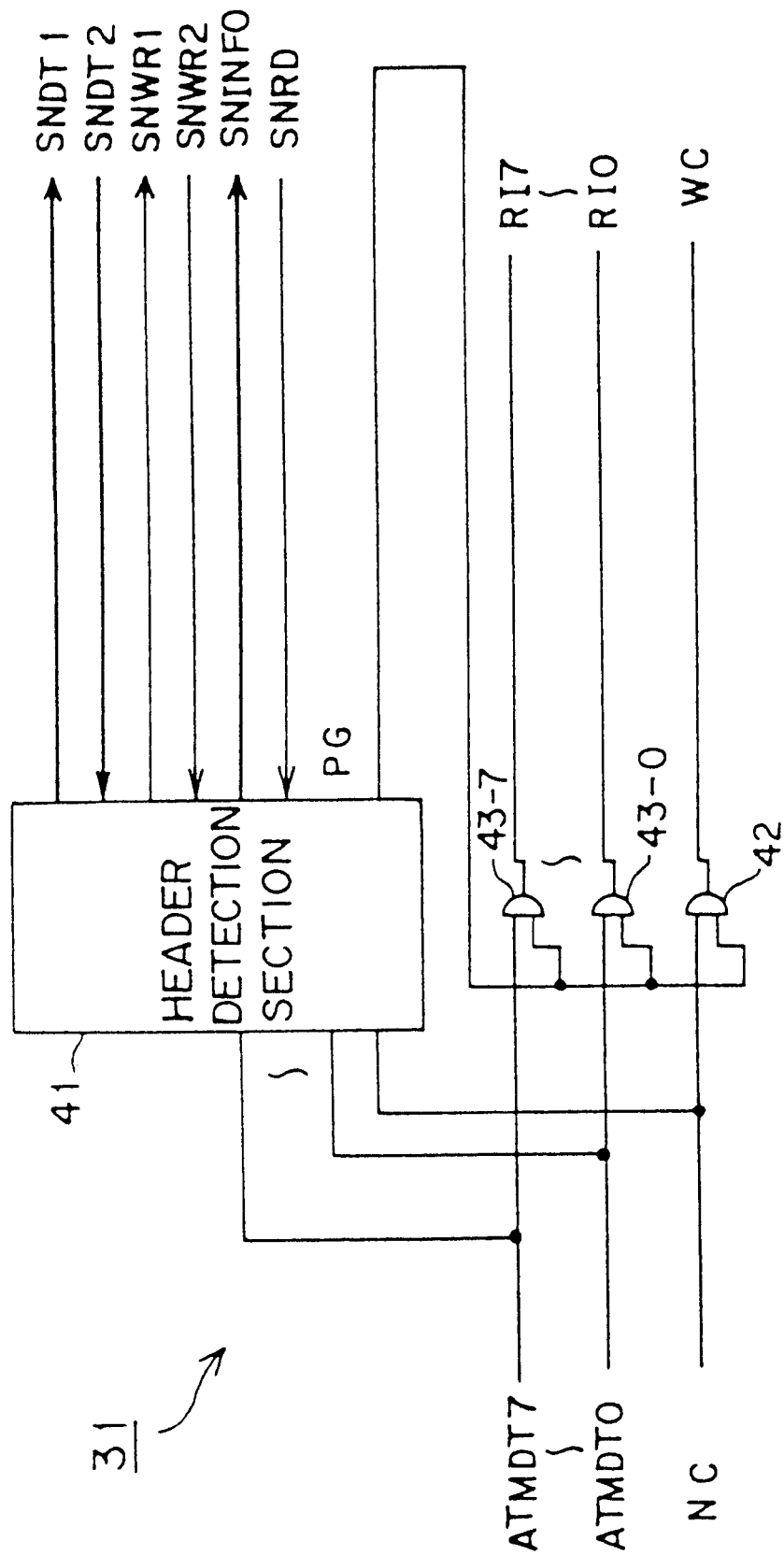
FIG. 17 is a configuration diagram of the ATM cell disassembly section.

FIG. 17 is a configuration diagram of the ATM cell disassembly section 31. The ATM cell disassembly section 31 is a circuit that disassembles a received cell into an ATM header, an SAR header and an SAR-PDU, and then analyzes the ATM header. Each cell is input in 8-bit parallel format. In addition, this section receives the Network Clock NC generated by the ATM exchange device. The Network Clock NC is, for example, 155.52 MHz divided by 8 (19.44 MHz).

The header detection section 41 refers to information (that is to say, VPI/VCI) stored in the ATM header of a received cell and decides whether to take the received cell in or discard it. If the received cell is to be taken in, a Payload Gate signal PG is used to open the AND circuits 42 and 43-0 to 43-7.

The AND circuits 42 and 43-0 to 43-7 pass the Network Clock NC and the cell data ATMDA0 to 7 in accordance with the Payload Gate signal PG. The outputs of the AND circuits 42 and 43-0 to 43-7 are called, respectively, the Write-in Clock WC and the Received Information RI.

Figure 18:
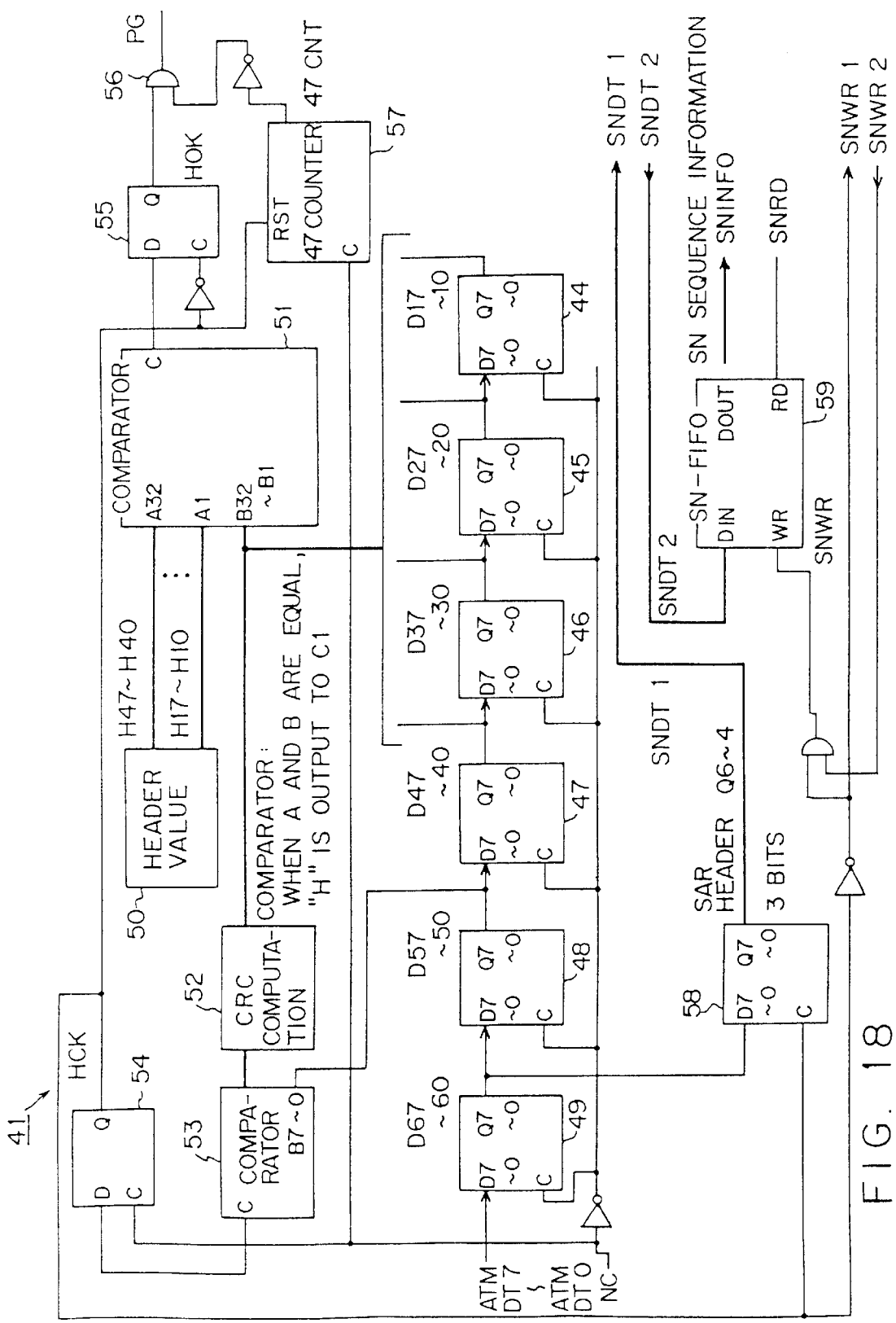
FIG. 18 is a configuration diagram of the header detection section.

FIG. 18 is a configuration diagram of the header detection section 41. Each of the flip-flops 44 to 49 consists of 8 flip-flop circuits connected in parallel. The flip-flops 44 to 49 are connected in shift register format, and shift data in accordance with the Network Clock NC. The flip-flops 44 to 49 latch the 1st to 6th bytes of the received cells, respectively, with the specified timing.

The header value storage circuit 50 stores the preset values of the first 4 bytes of the ATM header. In the figure, H17 to H10, for example, mean the 0th bit to the 7th bit of the 1st byte of the ATM header. The comparator 51 compares the header values latched to the flip-flops 44 to 47 to the header values stored in the header value storage circuit 50, and, when they agree, outputs "H".

The CRC computation circuit 52 executes CRC computations on the data latched to the flip-flops 44 to 47. The comparator 53 compares the results of computation by the CRC computation circuit 52 to the data latched by flip-flop 48, and, when they agree, outputs "H". The flip-flop 54 uses the Network Clock NC to latch the output of the comparator 53. The output of the flip-flop 54 is the Header Check signal HCK.

The flip-flop 55 uses the Header Check signal HCK to latch the output of the comparator 51. The output of the flip-flop 55 is the Header OK signal HOK. When the results of the comparison both by the comparator 51 and the comparator 53 agree, the Header OK signal HOK opens the AND circuit 56. After the counter 57 has been reset by the Header Check signal HCK, the counter 57 sets the 47 counter count signal 47CNT to "H" when it counts 47 clocks of the Network Clock NC. Then the Payload Gate signal PG is converted to units of the Network Clock NC by the Header OK signal HOK and the 47 Count signal 47CNT, and the AND circuits 42 and 43-0 to 43-7 are opened for just 47 clocks.

The flip-flop 58 takes the SAR header latched by the flip-flop 49 using the Header Check signal HCK. Then the flip-flop 58 transfers the Sequence Numbers stored in the 4th to 6th bits of the SAR header to the received SN holding section 32 and the dummy cell insertion section 34 as the Sequence Number Data SNDT1. In addition, the inverted Header Check Signal HCK is output as the Write-in signal SNWR1 for writing the Sequence Number Data SNDT1 into the received SN holding section 32 and the dummy cell insertion section 34.

The SN-FIFO 59 stores the Sequence Number Data SNDT2 transferred from the dummy cell insertion section 34 using the Write-in signal SNWR which is the logical product signal of the Write-in signal SNWR1 and the Write-in signal SNWR2 transferred from the dummy cell insertion section 34. In addition, the Sequence Number (Sequence Number Data SNDT2) is read out in accordance with the Readout signal SNRD transferred from the Read Clock generation section 26, and posted to the Read Clock generation section 26 as the Sequence Number Information SNINFO.

Figure 4:
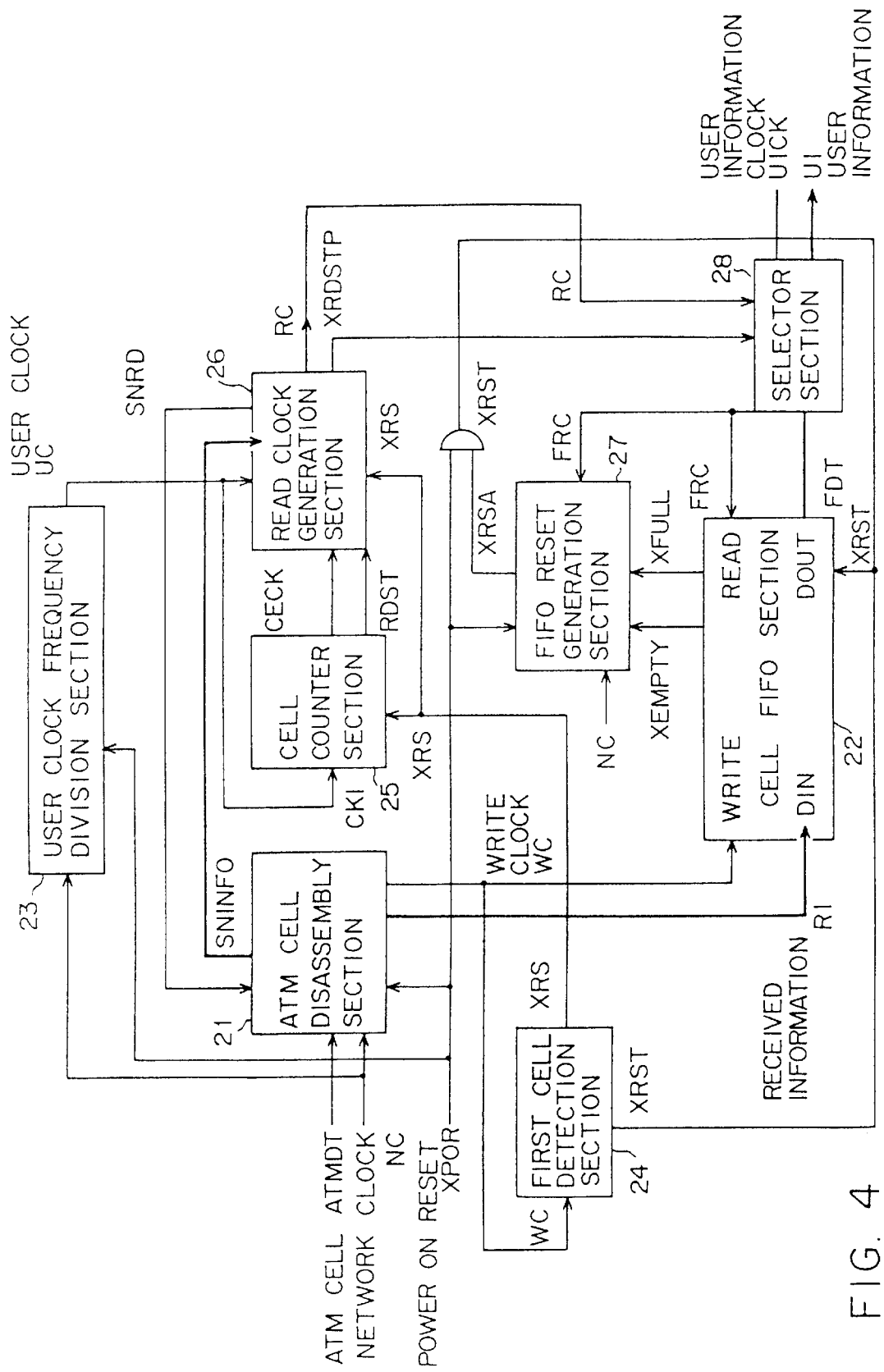
FIG. 4 is a diagram showing the configuration of an existing device which absorbs fluctuations in the intervals between cells.
Figure 5:
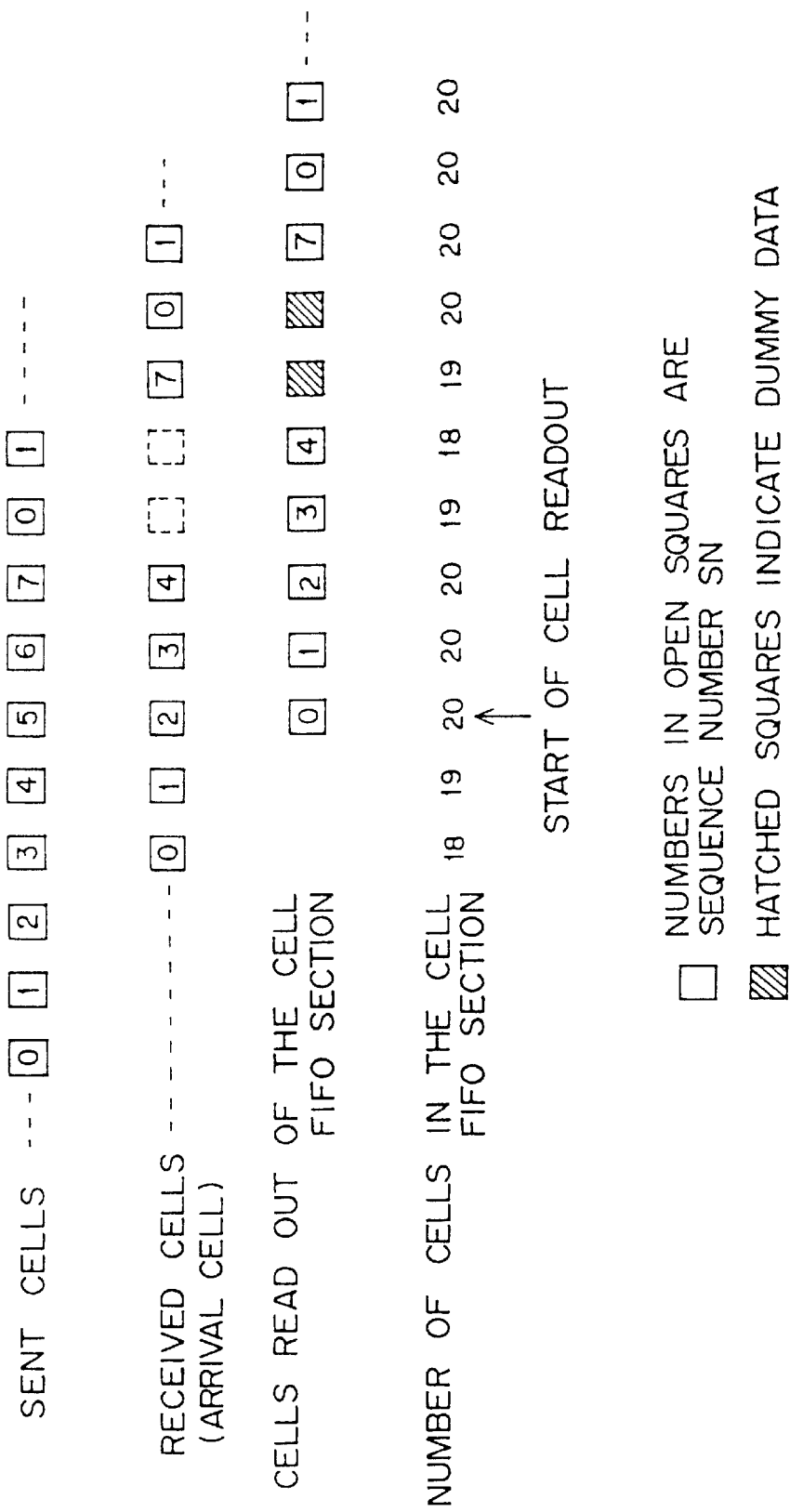
FIG. 5 is a diagram to explain the action of a fluctuation-absorbing device in a case in which cell loss occurs.
Figure 19:
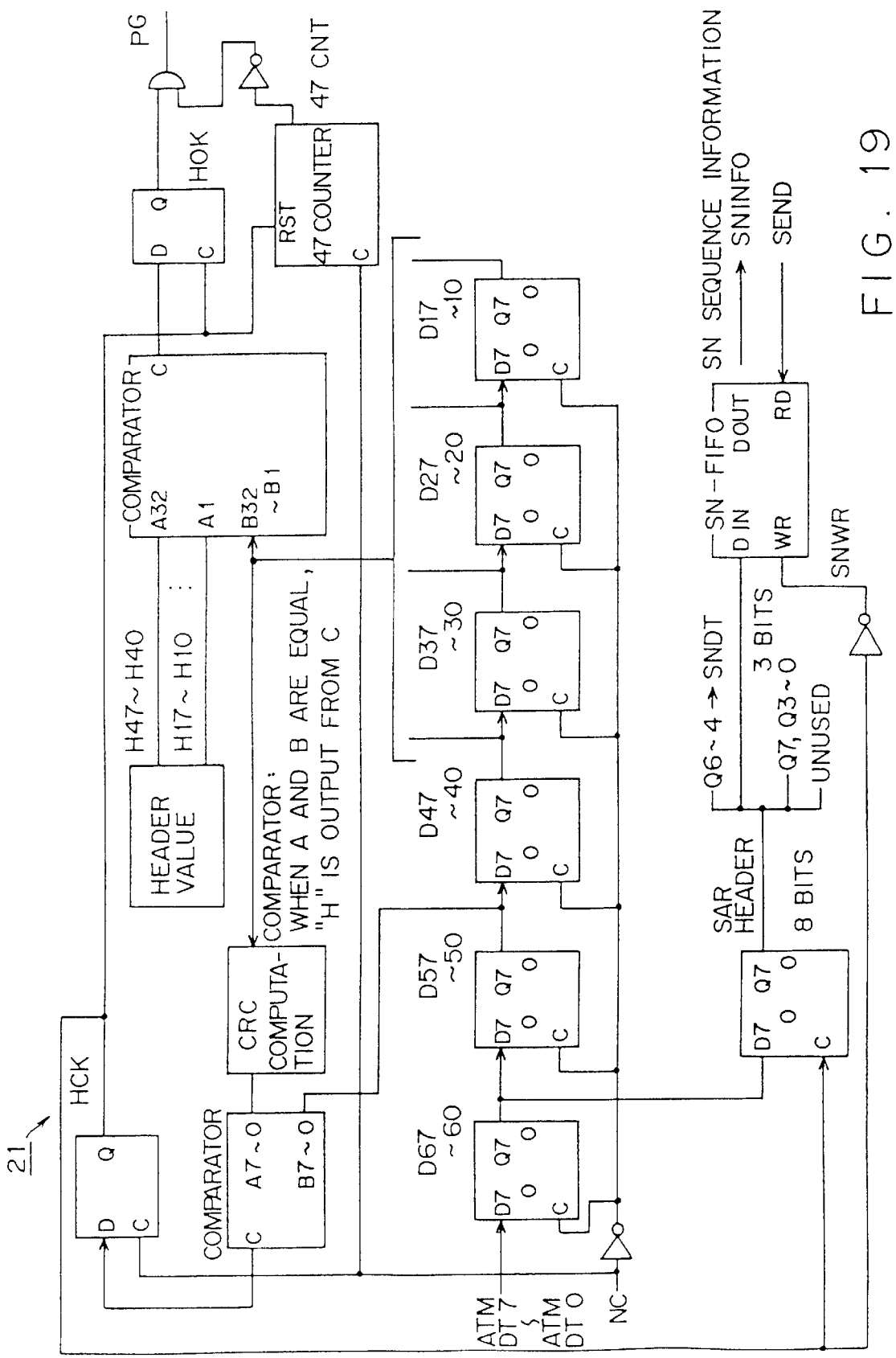
FIG. 19 is a configuration diagram of the ATM cell disassembly section explained in FIG. 4 as an existing technology.

FIG. 19 is a configuration diagram of the ATM cell disassembly section 21 explained in FIG. 4 as existing technology. One of the differences between the ATM cell disassembly section 21 and the ATM cell disassembly section 31 is the handling of the Sequence Number. In the ATM cell disassembly section 21, the Sequence Number extracted from the SAR header was posted as is to the Read Clock generation section 26, but in the ATM cell disassembly section 31, the Sequence Number extracted from the SAR header is transferred to the received SN holding section 32 and the dummy cell insertion section 34, then the Sequence Number transferred from the dummy cell insertion section 34 is posted to the Read Clock generation section 26.

Another difference between the ATM cell disassembly section 21 and the ATM cell disassembly section 31 is the transfer destination of the Received Information RI. Specifically, the ATM cell disassembly section 21 transfers the Received Information RI to the cell FIFO 22, but the ATM cell disassembly section 31 transfers the Received Information RI to the dummy cell insertion section 34.

Figure 20:
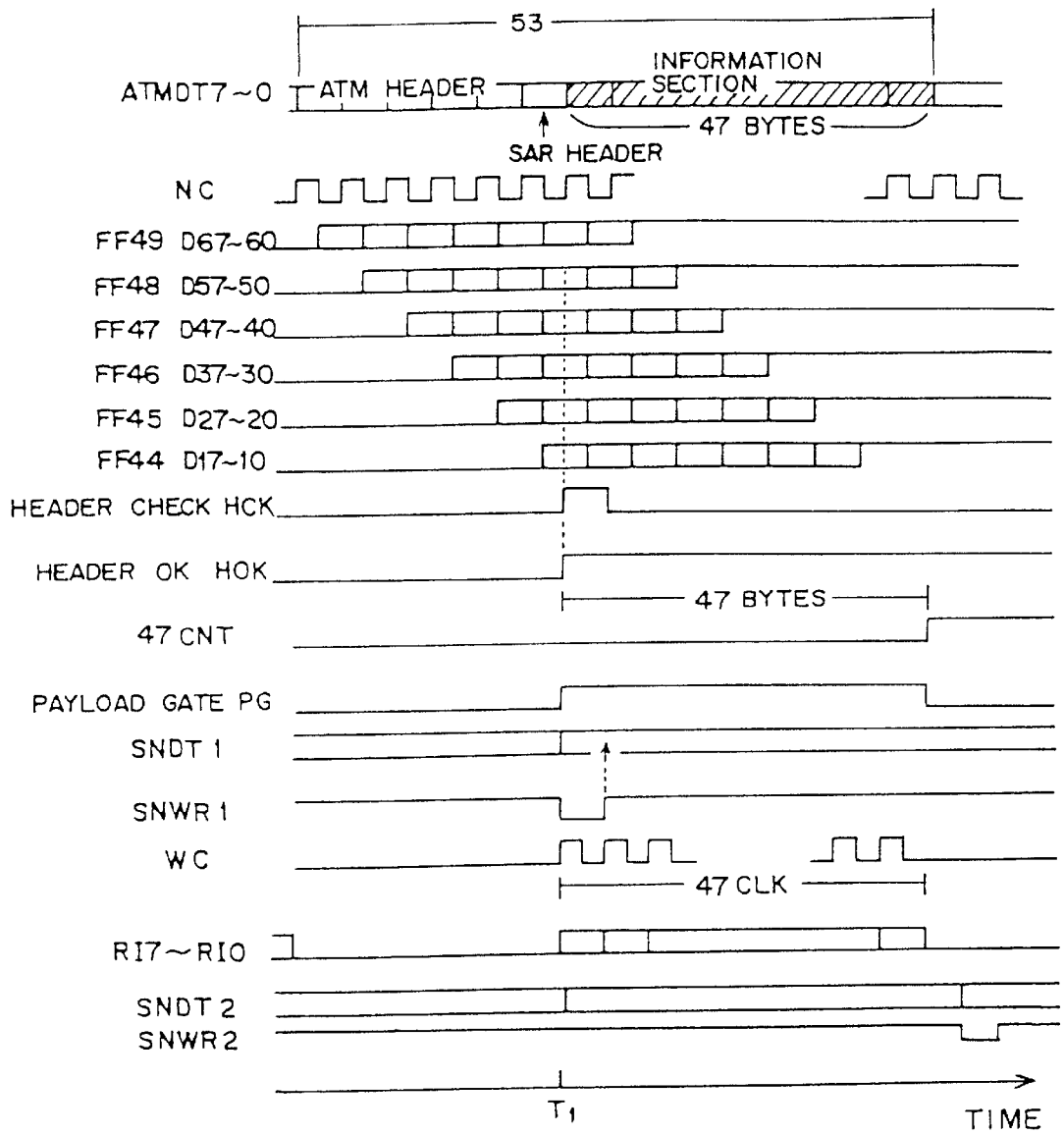
FIG. 20 is a diagram to explain the action of the ATM cell disassembly section.

FIG. 20 is a diagram that explains the action of the ATM cell disassembly section 31. The received cell, that is to say the cell data ATMDA0 to 7, is latched by the Network Clock NC after the first byte is first transferred to the flip-flop 49. When the next pulse of the Network Clock NC arrives, the data that were latched to the flip-flop 49 are shifted to the flip-flop 48, and the flip-flop 49 latches the 2nd byte of the cell data ATMDA0 to 7. Subsequently, the flip-flops 44 to 49 continue to shift the data that they have latched in accordance with the Network Clock NC; at time T1, the flip-flops 44 to 49 latch the 1st to 6th bytes, respectively, of the cell data ATMDA0 to 7.

If the result of the CRC computation on the data latched by the flip-flops 44 to 47 agrees with the HEC of the 5th byte of the cell data ATMDA0 to 7, a pulse is generated as the Header Check signal HCK. At this time, if the data latched by the flip-flops 44 to 47 agree with the values stored in the header value storage circuit 50, the Header OK signal HOK is set to "H" in order to take that received cell in. In addition, since the 47 Count signal 47CNT becomes "H" when the Network Clock NC counts 47 clocks from time T1, the Payload Gate signal PG is converted to the Network Clock NC, and the AND circuits 42 and 43-0 to 43-7 are opened for just 47 clocks.

The 47 bytes of cell data ATMDA0 to 7 (the 7th to 53rd bytes of cell data) are output as the Received Information RI by this Payload Gate signal PG.

The Sequence Number Data SNDT1 extracted from the SAR header of the received cell at time T1 are written into the received SN holding section 32 and the dummy cell insertion section 34 in accordance with the Write-in signal SNWR1 generated by the Header Check signal HCK. In addition, the Sequence Number Data SNDT2 transferred from the dummy cell insertion section 34 are written in to the SN-FIF0 59 in accordance with the Write-in signal SNWR2.

Figure 21:
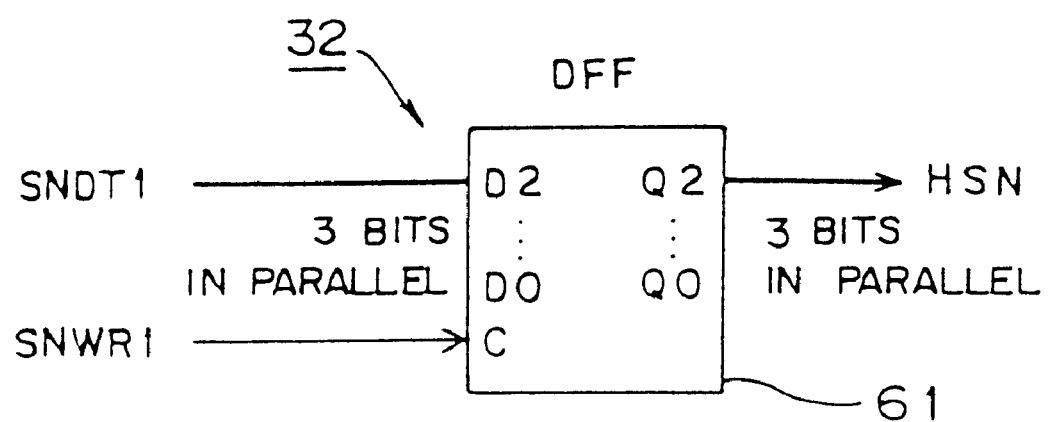
FIG. 21 is a configuration diagram of the received SN holding section.

FIG. 21 is a configuration diagram of the received SN holding section 32. The received SN holding section 32 is a circuit that holds the Sequence Number stored in the SAR header of the most recently received cell.

The received SN holding section 32 consists of the flip-flop 61. The flip-flop 61 latches the Sequence Number Data SNDT1 extracted from the SAR header of the received cell and transferred in 3-bit parallel format in accordance with the Write-in signal SNWR1 that is transferred from the ATM cell disassembly section 31. The output of the flip-flop 61 is transferred to the dummy cell insertion section 34 as the Hold Sequence Number HSN.

Figure 22:
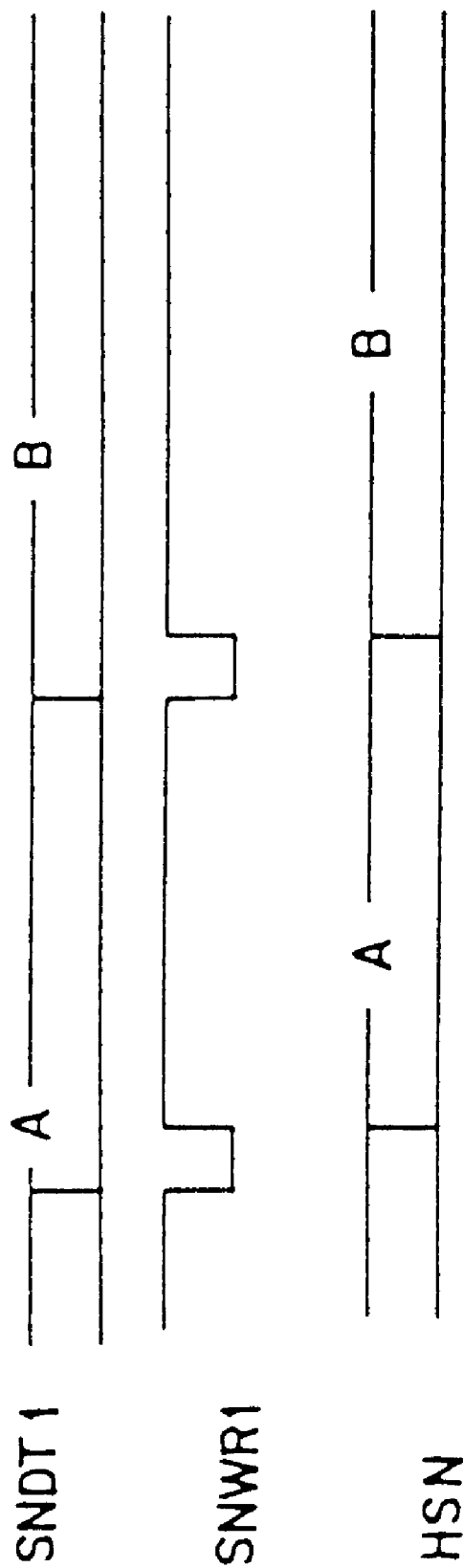
FIG. 22 is a diagram explaining the action of the received SN holding section.

FIG. 22 is a diagram that explains the action of the received SN holding section 32. As shown in FIG. 22, the flip-flop 61 latches the Sequence Number Data SNDT1 on the leading edge of the Write-in signal SNWR1, and outputs that latched datum as the Hold Sequence Number HSN.

Figure 23:
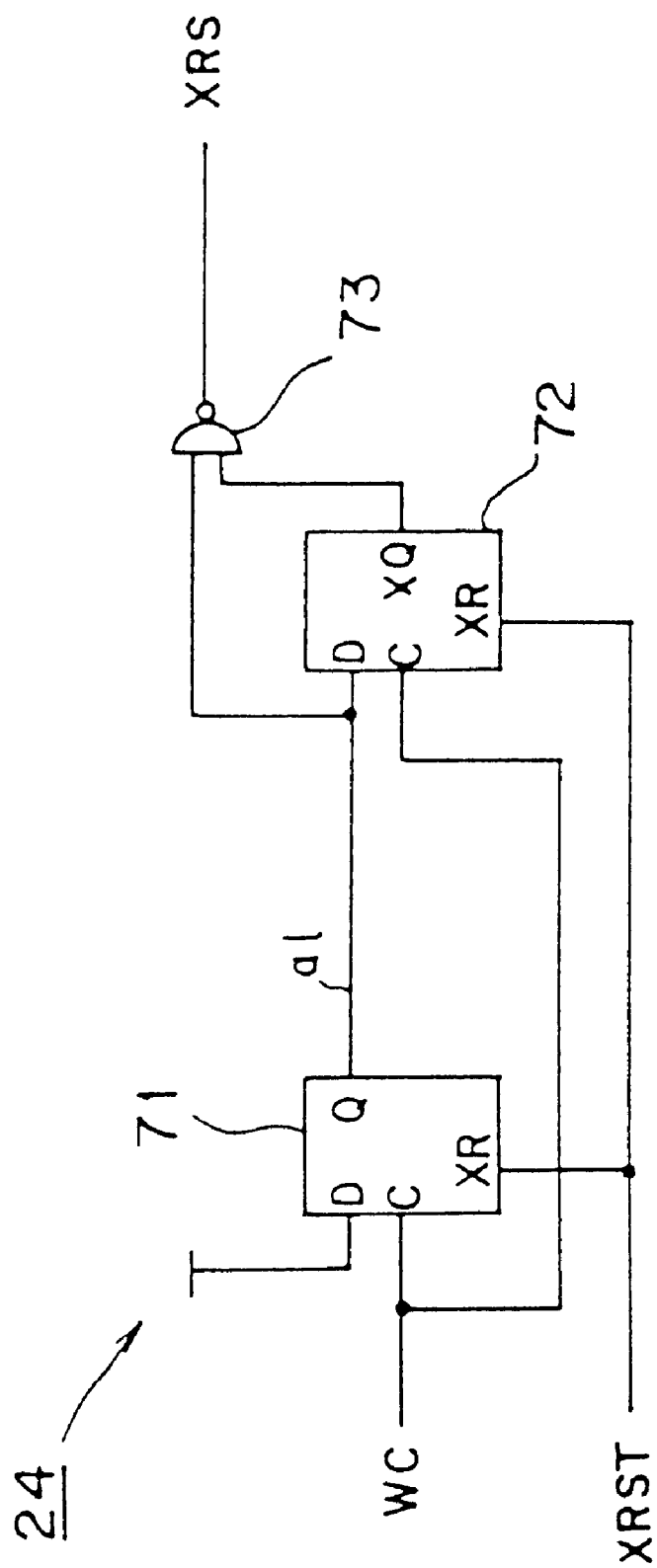
FIG. 23 is a configuration diagram of the first cell detection section.

FIG. 23 is a configuration diagram of the first cell detection section 24. The first cell detection section 24 is a circuit that monitors the arrival of the first cell that becomes the trigger that starts the processing to absorb fluctuations of the cell arrival interval.

The first cell detection section 24 has the flip-flops 71 and 72 and the NAND circuit 73. The flip-flops 71 and 72 are reset by the pulses of the Reset signal XRST. Pulses of the Reset signal XRST are generated when power is turned ON and when the cell FIFO section 22 becomes empty or full. That is to say, the first cell detection section 24 monitors the arrival of the first cell after power is turned ON and after the cell FIFO section 22 becomes empty or full.

When the flip-flop 71 receives the Write-in Clock WC generated by the ATM cell disassembly section 31, that output signal al becomes "H". The output signal al is differentiated by the flip-flop 72 and the NAND circuit 73, and converted to a pulse. The output of the first cell detection section 24 is transferred to the cell counter section 25 and the Read Clock generation section 26 as the Reset signal XRS.

Figure 24:
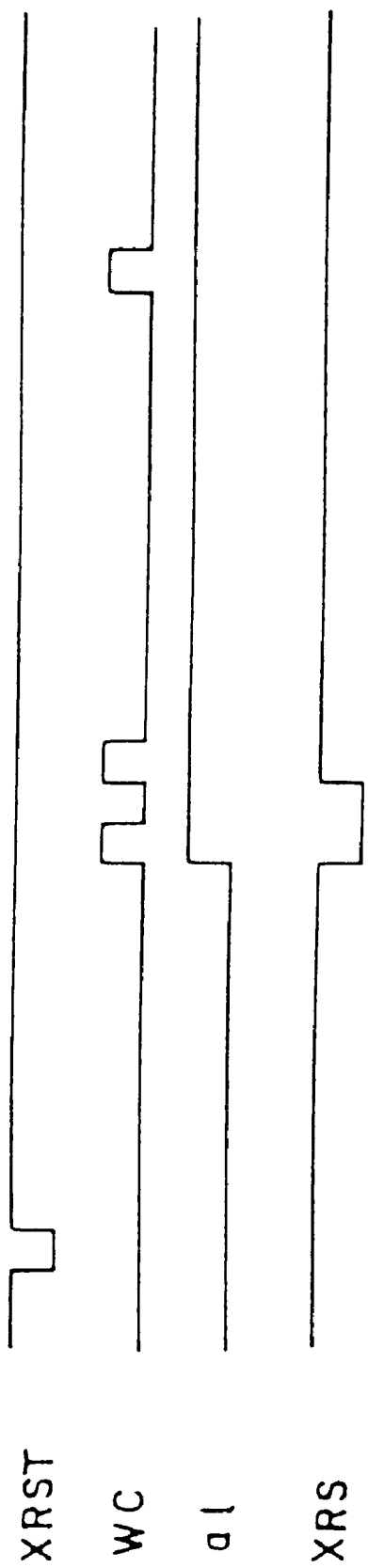
FIG. 24 is a diagram explaining the action of the first cell detection section.

FIG. 24 is a diagram that explains the action of the first cell detection section 24. As shown in FIG. 24, when the first pulse of Write-in clock WC after the first cell detection section 24 is reset by a pulse of the Reset signal XRST is received, the first cell detection section 24 generates a pulse of the Reset signal XRS.

Figure 25:
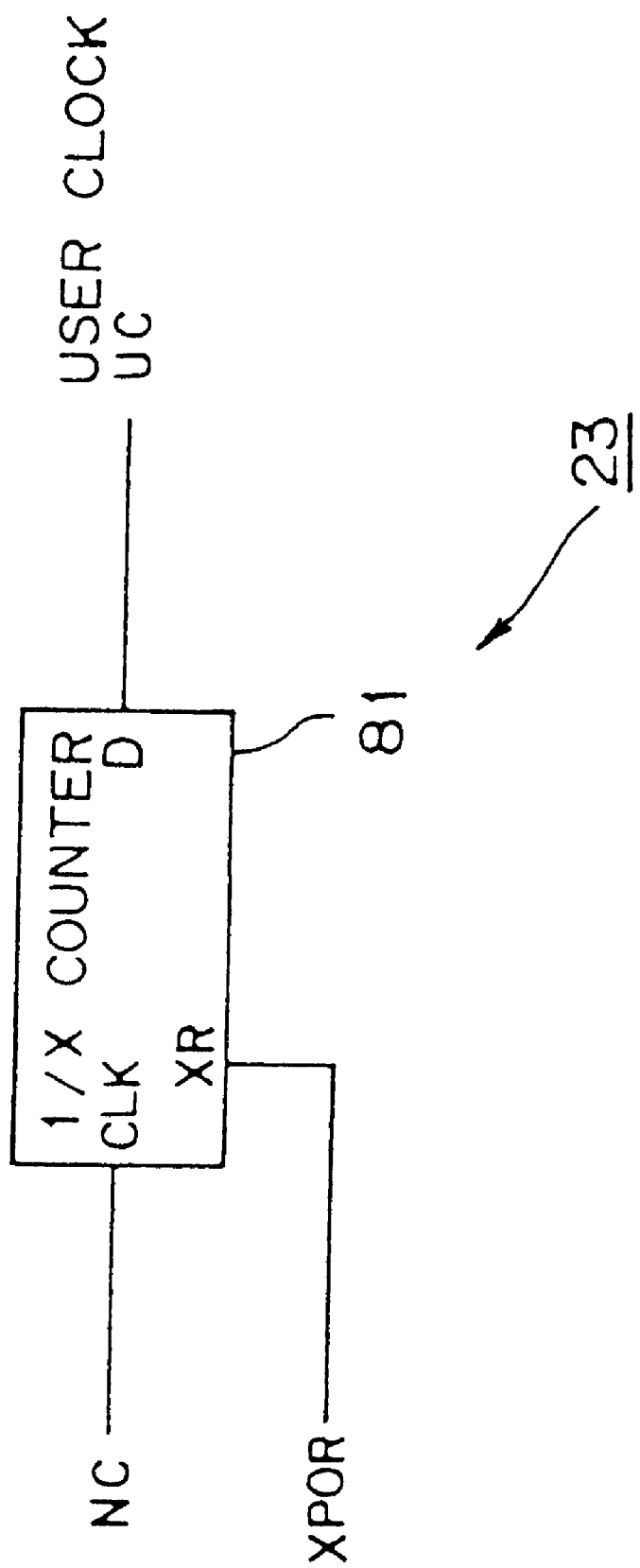
FIG. 25 is a configuration diagram of the User Clock frequency division section.

FIG. 25 is a configuration diagram of the User Clock frequency division section 23. The User Clock frequency division section 23 is a circuit that generates the User Clock UC by frequency division of the Network Clock NC. The frequency of the User Clock UC is set for each service. For example, when the line frequency is 155.52 MHz, since cells are processed in 8-bit parallel format in the ATM, the Network Clock NC is ⅛ of 155.52 MHz (19.44 MHz). At this time, if audio data are transferred at the fixed bit rate of 64 Kbps, the User Clock UC is set to ⅛ of 64 KHz (8 KHz). In this example, the User Clock frequency division section 23 frequency-divides the 19.44 MHz Network Clock NC and generates the 8 KHz User Clock.

The User Clock UC is a clock that is used when reading cells out of the cell FIFO 22 at a constant bit rate; 1 byte of data are read out on each clock. In addition, the 47-clock time of the User Clock UC is the expectation value of the cell arrival interval.

As shown in FIG. 25, the User Clock frequency division section 23 is formed using the counter 81.

Figure 26:
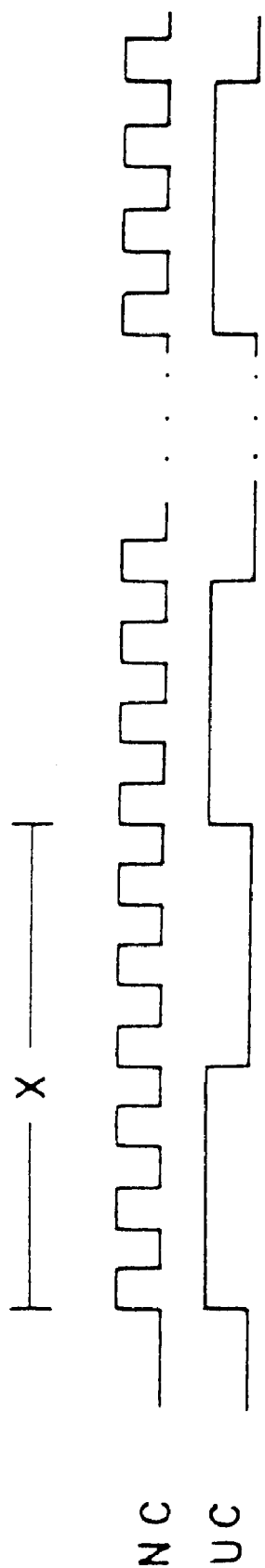
FIG. 26 is a diagram explaining the action of the User Clock frequency division section.

FIG. 26 is a diagram that explains the action of the User Clock frequency division section 23. As shown in FIG. 26, the User Clock frequency division section 23 generates the User Clock UC by X frequency division of the Network Clock NC.

Figure 27:
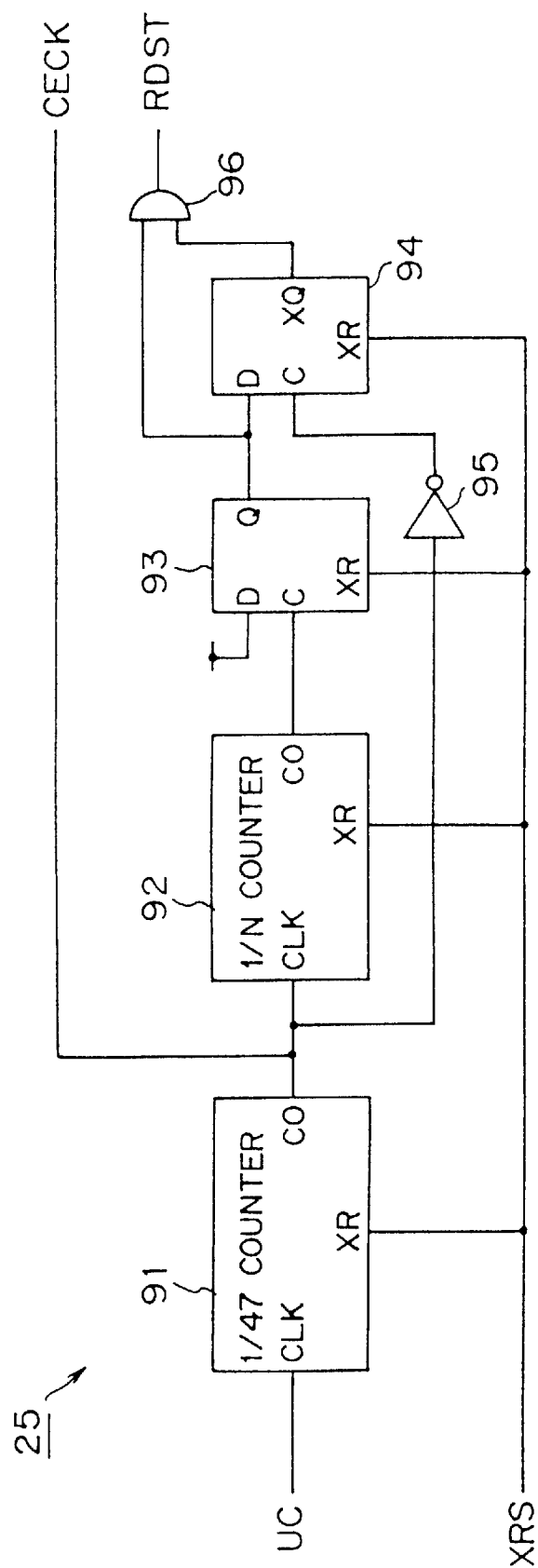
FIG. 27 is a configuration diagram of the cell counter section.

FIG. 27 is a configuration diagram of the cell counter section 25. The cell counter section 25 is a circuit that sets the amount of fluctuation to be absorbed.

The cell counter section 25 has the counters 91 and 92, and the flip-flops 93 and 94, which are respectively reset by the Reset signal XRS. As explained above, the Reset signal XRS is a signal that indicates that the first cell detection section 24 has received the first cell.

The count in the counter 91 is incremented by the User Clock UC, and generates a pulse every 47 counts. The output of the counter 91 is transferred to the Read Clock generation section 26 and the cell arrival interval monitoring section 33 as the Cell Clock CECK. Here, since the User Clock UC is the clock for reading 1 byte of data out of the cell FIFO section 22, the Cell Clock CECK pulse interval corresponds to the time required to read 1 cell out of the cell FIFO section 22 (the expectation value of the cell arrival interval).

The count in the counter 92 is incremented by the Cell Clock CECK. When that count reaches N, that fact is posted to the flip-flop 93. When the counter 92 outputs the notice, the flip-flops 93 and 94, the inverter circuit 95 and the AND circuit 96 generate a pulse. The output of the AND circuit 96 is transferred to the Read Clock generation section 26 as the Read Start signal RDST.

Figure 28:
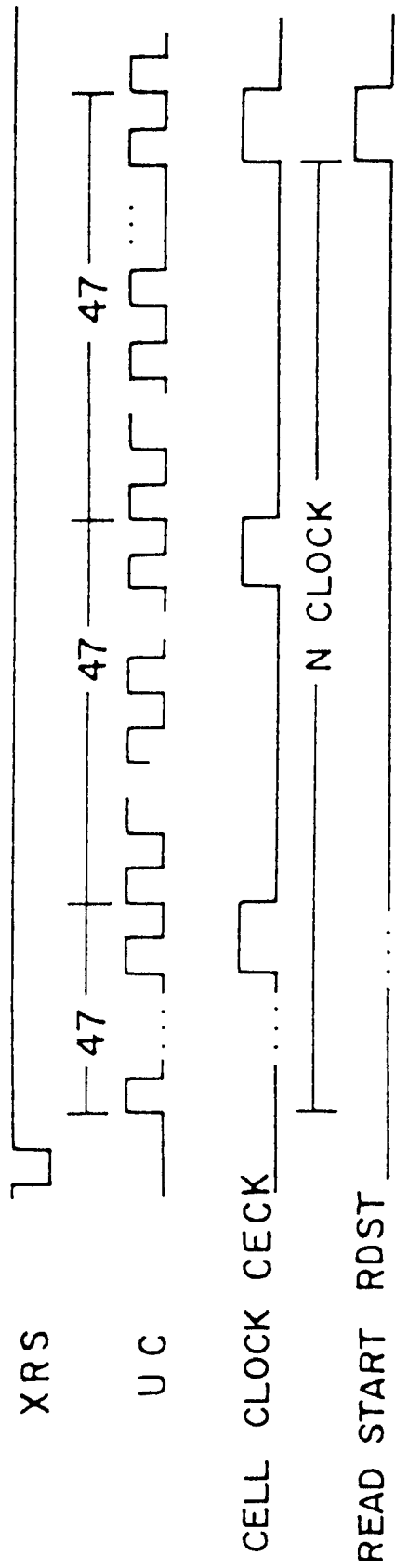
FIG. 28 is a diagram explaining the action of the cell counter section.

FIG. 28 is a diagram that explains the action of the cell counter 25. As shown in FIG. 28, the cell counter 25 counts the User Clocks UC from the time when the Reset signal XRS is received, and generates a Cell Clock CECK pulse every 47 clocks. Then, when N Cell Clock CECK pulses have been generated, a Read Start signal RDST pulse is generated.

The Reset signal XRS is a signal that indicates that the first cell detection section 24 has received the first cell. Consequently, after the Reset signal XRS has been generated cells continue to arrive at uniform intervals and those cells are written into the cell FIFO section 22. Meanwhile, the Read Start signal RDST is a signal that marks the start of cell readout from the cell FIFO section 22. Here, the time from generation of the Reset signal XRS until the Read Start signal RDST is the time required to generate N Cell Clock CECK pulses, N times the expectation value of the cell arrival interval. Consequently, at the time when readout from the cell FIFO section 22 starts, it can be estimated that N cells have been written into the cell FIFO section 22.

After the Read Start signal RDST has been generated, cells are read out of the cell FIFO section 22 at uniform intervals, but cells arrive and are written into the cell FIFO section 22 at the same intervals, the number of cells in the cell FIFO section 22 is held fixed at N. This N corresponds to the amount of fluctuation that is absorbed.

Figure 29:
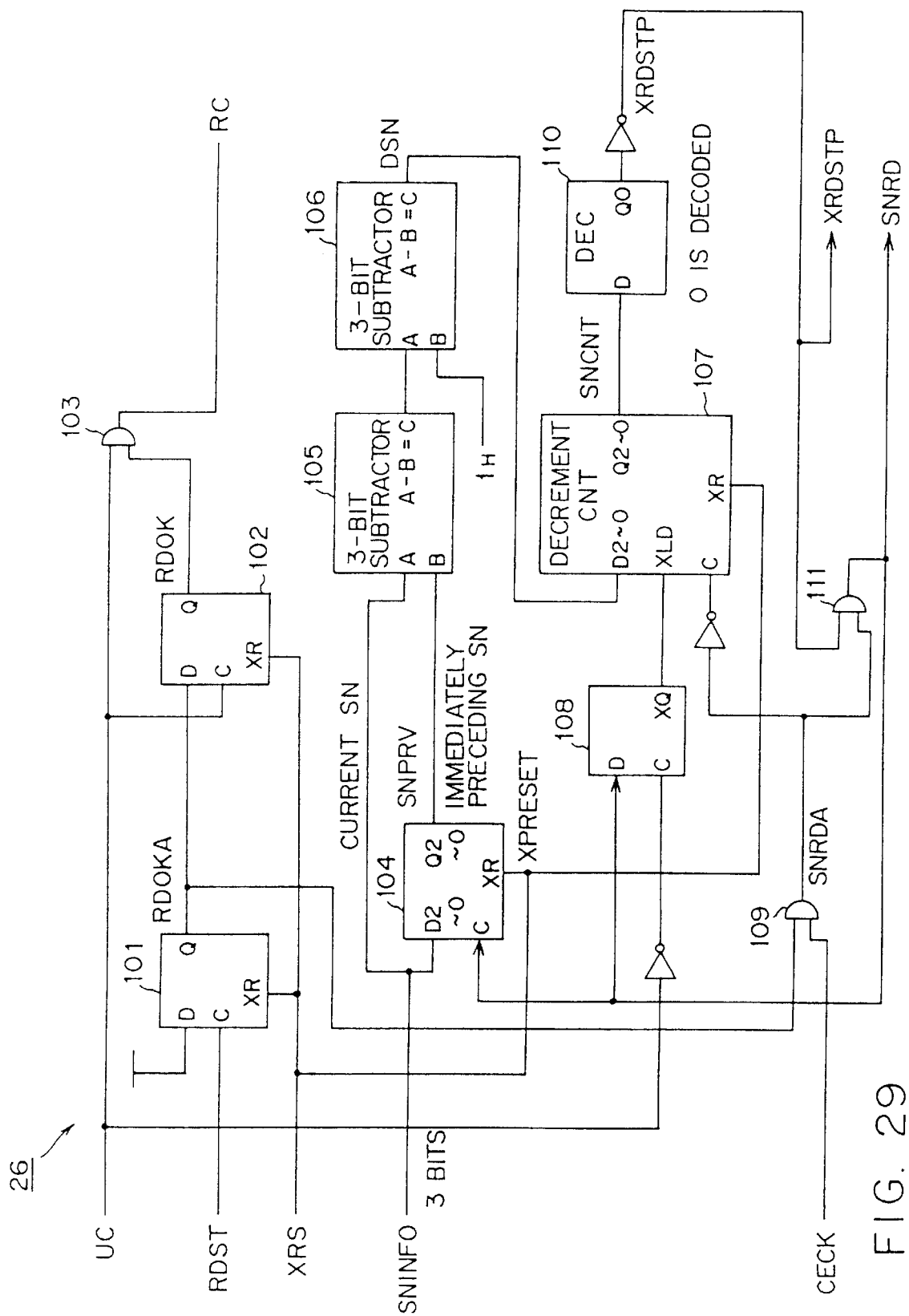
FIG. 29 is a configuration diagram of the Read Clock generation section.

FIG. 29 is a configuration diagram of the Read Clock generation section 26. The Read Clock generation section 26 is a circuit that generates clocks in order to read cells out of the cell FIFO section 22.

When the Read Start signal RDST transferred from the cell counter section 25 is received, the flip-flop 101 sets its output signal RDOKA to "H". The flip-flop 102 uses the User Clock UC to adjust the phase of the signal RDOKA output from the flip-flop 101. The output of the flip-flop 102 acts as a Readout OK signal RDOK to control the AND circuit 103. The User Clock UC is input to the AND circuit 103. In the configuration described above, when the Read Start signal RDST transferred from the cell counter section 25 is received, the User Clock UC passes through the AND circuit 103 and is transferred to the selector section 28 and the FIFO reset generation section 27 as the Readout Clock RC.

The flip-flop 104 holds a 3-bit Sequence Number. That is to say, the flip-flop 104 uses the Readout signal SNRD generated by this Read Clock generation section 26 to hold the Sequence Number Information SNINFO extracted from the SN-FIFO 59 of the ATM cell disassembly section 31. The output of the flip-flop 104 is fed to terminal B of the 3-bit subtractor 105 as the signal SNPRV. Meanwhile, the Sequence Number Information SNINFO is supplied as is to terminal A of the 3-bit subtractor 105. Here, since the signal SNPRV is just the Sequence Number Information SNINFO delayed 1 phase by the flip-flop 104, when the Sequence Number Information SNINFO is taken to be the current Sequence Number, the signal SNPRV is the Sequence Number of the immediately preceding cell.

The 3-bit subtractor 105 subtracts the data input to terminal B from the data input to terminal A, and feeds the difference to terminal A of the 3-bit subtractor 106. "1" is set in terminal B of the 3-bit subtractor 106. The 3-bit subtractor 106 subtracts the data input to terminal B from the data input to terminal A, and posts the difference to the decrement counter 107 as the signal DSN.

In the configuration described above, if the Sequence Number of the current cell immediately follows the Sequence Number of the immediately preceding cell, the difference computed by the 3-bit subtractor 105 becomes "1", and the difference computed by the 3-bit subtractor 106 becomes "0". In addition, if, for example, we assume that the Sequence Number of the immediately preceding cell is 2 and the Sequence Number of the current cell is 5, the result produced by the 3-bit subtractor 105 becomes "3" and the result produced by the 3-bit subtractor 106 becomes "2", so it is judged that 2 cells have been lost. The flip-flop 108 latches the Readout signal SNRD using the User Clock UC, then inverts that latched datum and feeds it to the Load terminal of the decrement counter 107. That is to say, when the Readout signal SNRD is used to extract the Sequence Number Information SNINFO from the SN-FIFO 59 of the ATM cell disassembly section 31, the decrement counter 107 is started up.

The decrement counter 107 decrements the difference produced by the 3-bit subtractor 106 1 at a time every time a pulse of the AND circuit 109 output signal SNRDA is received. Since the signal SNRDA is the logical product signal of the Cell Clock CECK and the signal RDOKA, after the Read Start signal RDST is received, signal SNRDA becomes the same as the Cell Clock CECK. Consequently, every time 1 cell is read out of the cell FIFO section 22, the decrement counter 107 decrements the value computed by the 3-bit subtractor 106 1 at a time. The output of the decrement counter 107 is passed to the decoder 110 as the Sequence Number Count signal SNCNT.

The decoder 110 decodes the Sequence Number Count signal SNCNT, and, if the Sequence Number Count signal is "000", outputs "0 (L level signal)". Then, the inverted output signal from the decoder 110 is transferred to the selector section 28 as the Readout Stop signal XRDSTP. This Readout Stop signal XRDSTP is also fed to the AND circuit 111.

The readout signal SNRD is the logical product of the signal SNRDA and the Readout Stop signal XRDSTP. Consequently, during time intervals except those when the Sequence Number Count signal SNCNT is "000", pulses of the Readout Signal SNRD are not generated, and the Sequence Number Information SNINFO is not read out from the SN-FIFO 59 of the ATM cell disassembly section 31.

As explained above, when the Sequence Numbers are consecutive, the signal DSN, which is the result of computation by the 3-bit subtractor 106, becomes "0", and the Sequence Number Count signal SNCNT becomes "000". In this case, the Readout Stop signal XRDSTP remains at "H", and cell readout from the cell FIFO section 22 does not stop (cells are read out from the cell FIFO section 22). In addition, if, for example, the Sequence Number of the immediately preceding cell is 2 and the Sequence Number of the current cell is 5, the signal DSN, which is the result of computation by the 3-bit subtractor 106, becomes "2". In this case, during the interval until 2 pulses of the Cell Clock CECK are received, the Readout Stop signal XRDSTP becomes "L", and during that time cell readout from the cell FIFO section 22 is stopped.

Figure 30A:
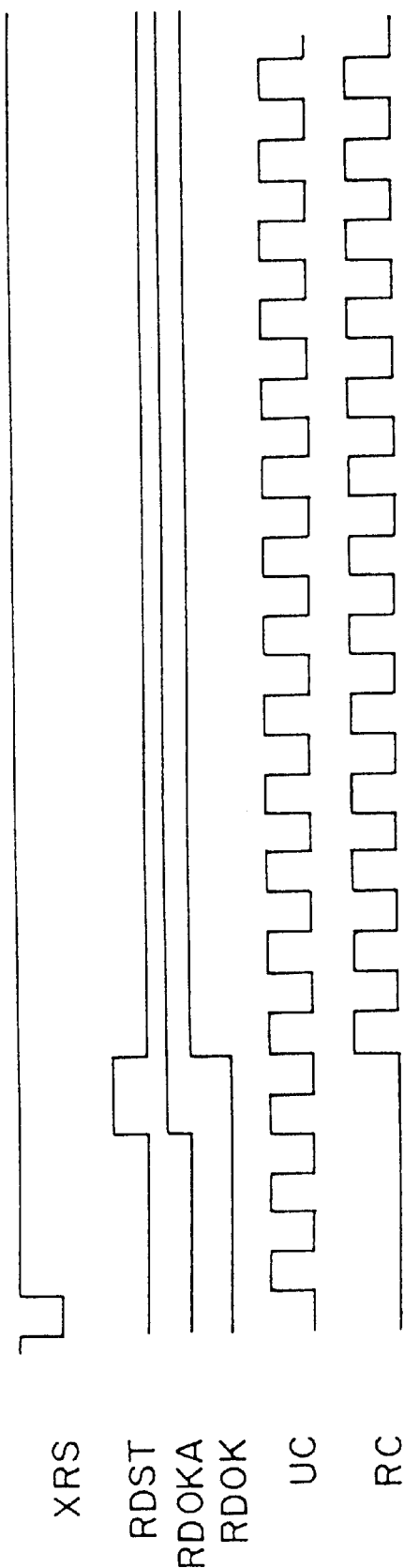
FIG. 30A is a diagram explaining the action of the Read Clock generation circuit (1 of 2).
Figure 30B:
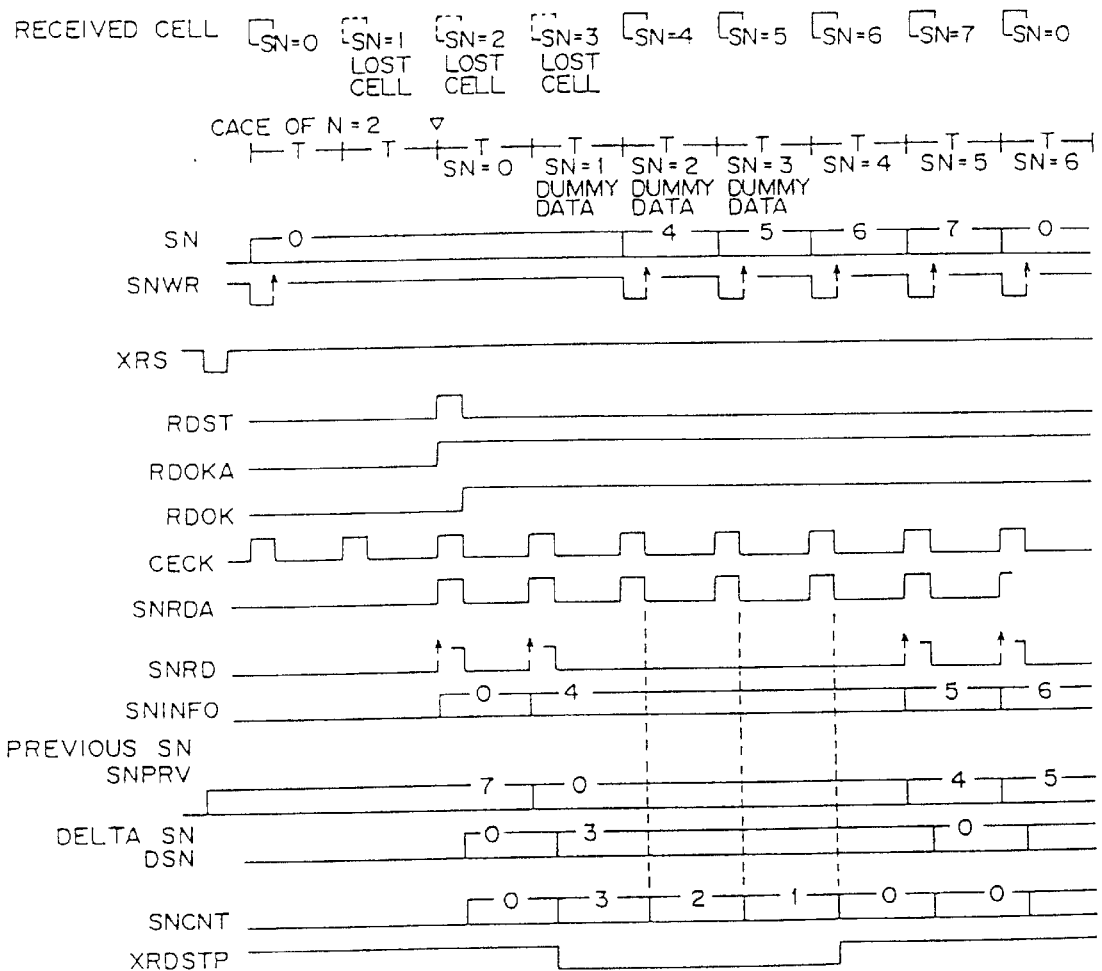
FIG. 30B is a diagram explaining the action of the Read Clock generation circuit (2 of 2).

FIG. 30A and FIG. 30B are diagrams that explain the action of the Read Clock generation section 26.

As shown in FIG. 30A, when a pulse of the Read Start signal RDST is generated, the Readout OK signal RDOK becomes "H", and subsequently the Readout Clock RC is output.

FIG. 30B shows the action of the Read Clock generation section 26 together with the ATM cell disassembly section 31. Here, we explain the case in which 3 cells in a row (SN=1, 2, 3) have been lost.

When a pulse of the Read Start signal RDST is generated and the signal RDOKA becomes "H", the Cell Clock CECK passes through the AND circuits 109 and 111, and a pulse the same as the Cell Clock CECK is output as the Readout signal SNRD. This pulse causes the Sequence Number Information SNINFO to be read out of the ATM cell disassembly section 31 SN-FIFO 59.

If the Sequence Number Information SNINFO read out of the SN-FIFO 59 is "0" and the immediately preceding Sequence Number SNPRV is "7", considering that the Sequence Numbers are counted cyclically from 0 to 7, the result of computation by the 3-bit subtractor 105 becomes "1", so the signal DSN, which is the result of computation by the 3-bit subtractor 106, becomes "0". As a result, the Sequence Number Count signal SNCNT becomes "000" while the Readout Stop signal XRDSTP remains at "H", so cell readout from the cell FIFO 22 does not stop (cells continue to be read out of the cell FIFO section 22 at a constant bit rate).

The next Sequence Number Information SNINFO read out of the SN-FIFO 59 is "4" since the cells SN=1 to 3 have been lost. As a result, the signal DSN, which is the result of computation by the 3-bit subtractor 106, becomes "3". At this time, the Sequence Number Count signal SNCNT is not "000", so the Readout Stop signal XRDSTP becomes "L". After this, the Sequence Number Count signal SNCNT is decremented 1 at a time every time a pulse of the signal SNRDA is received.

Consequently, when 3 pulses of the signal SNRDA are received, the Sequence Number Count signal SNCNT becomes "000", and the Readout Stop signal XRDSTP returns to "H".

During the time that the Readout Stop signal XRDSTP is "L", the selector section 28 creates and outputs dummy data to replace the cells that are not read out of the cell FIFO section 22. The configuration and action of the selector section 28 are explained below.

Figure 31:
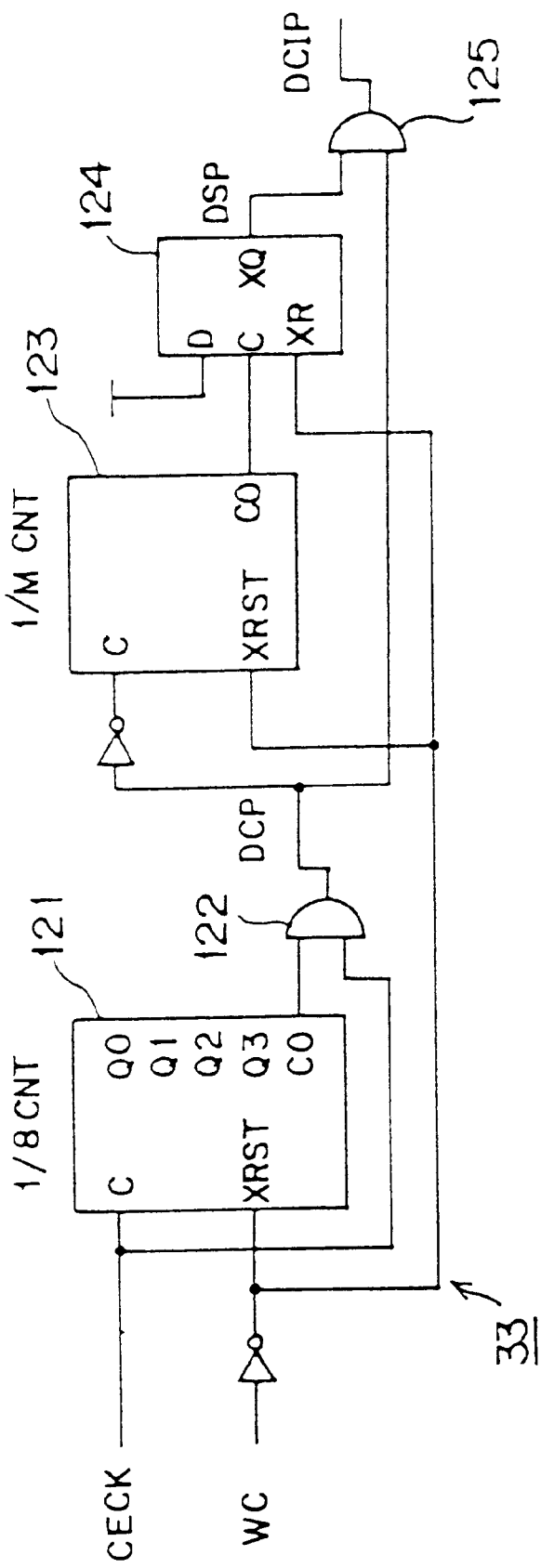
FIG. 31 is a configuration diagram of the cell arrival interval monitoring section.

FIG. 31 is a configuration diagram of the cell arrival interval monitoring section 33. The cell arrival interval monitoring section 33 is a circuit that monitors the cell arrival interval and, as necessary, generates signals to create dummy cells.

The counter 121 frequency-divides the Cell Clock CECK generated by the cell counter section 25 by 8. That is to say, the counter 121 count is increased by the Cell Clock CECK and outputs a carry-out signal every 8 counts. In addition, the counter 121 is reset by the Write-in Clock WC generated by the ATM cell disassembly section 31. Here, the period of the Cell Clock CECK is the expectation value of the cell arrival interval; pulses of the Write-in Clock WC are generated when cells actually arrive.

Consequently, the counter 121 starts counting from the time when a cell arrives, and generates a carry-out signal every time 8 times the expectation value of the cell arrival interval has elapsed.

The AND circuit 122 generates a Dummy Cell Pulse DCP using the carry-out signal output by the counter 121 and the Cell Clock CECK. This Dummy Cell Pulse DCP is fed to the counter 123.

The counter 123 frequency-divides the Dummy Cell false DCP by M. That is to say, the counter 123 generates a carry-out signal every time M Dummy Cell Pulses DCP are received. When the flip-flop 124 receives this carry-out signal, a Dummy Stop signal DSP is fed to the AND circuit 125 as the inverted signal of the datum input to terminal D. The counter 123 and the flip-flop 124 are reset by the Write-in clock WC. The value M is typically set to about 10.

The AND circuit 125 generates a Dummy Cell Insertion Pulse DCIP from the Dummy Cell Pulse DCP and the Dummy Stop signal DSP. The Dummy Cell Insertion Pulse DCIP is fed to the dummy cell insertion section 34.

Figure 32:
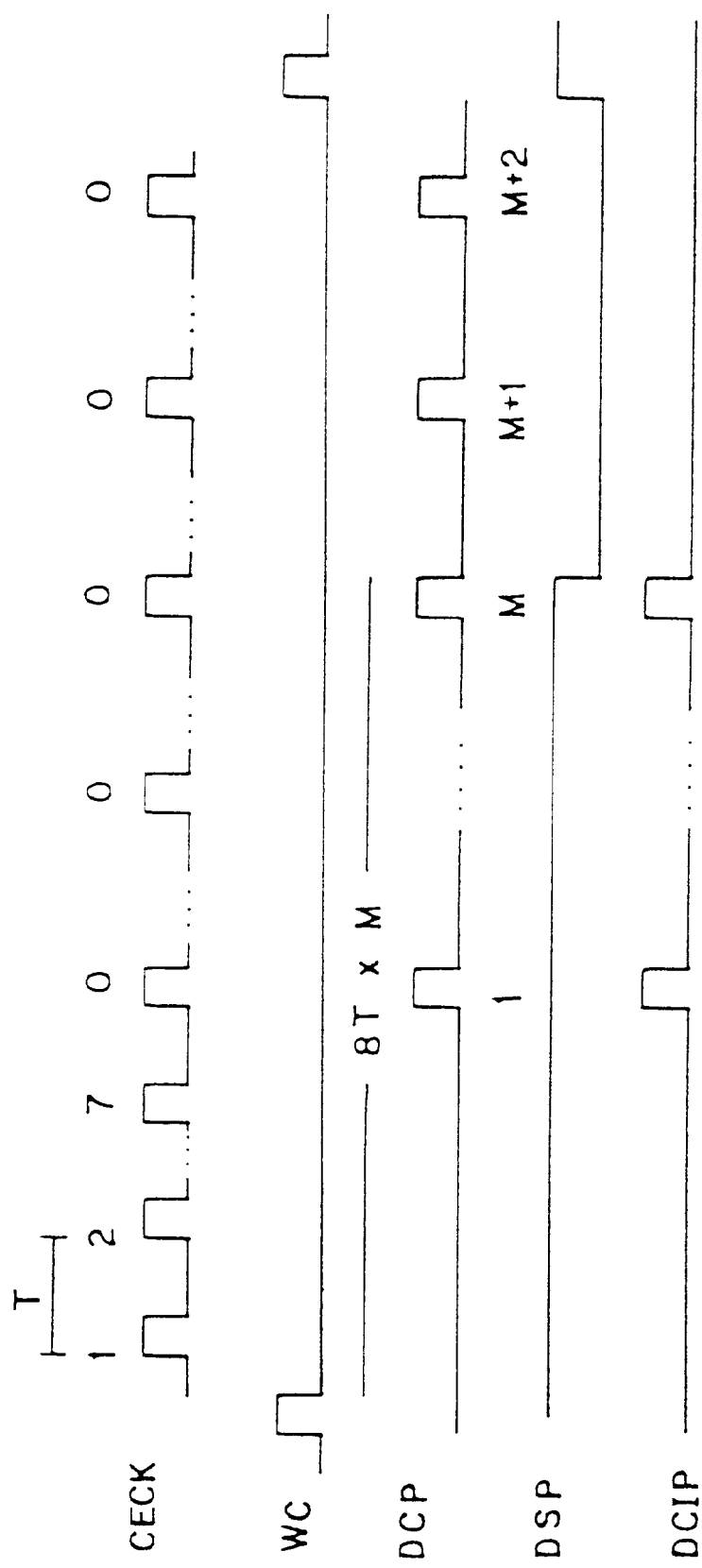
FIG. 32 is a diagram explaining the action of the cell arrival interval monitoring section.

FIG. 32 is a diagram that explains the action of the cell arrival interval monitoring section 33. As shown in FIG. 32, after the cell arrival interval monitoring section 33 is reset by the Write-in Clock WC, it generates a Dummy Cell Pulse DCP after every 8 clocks of the Cell Clock CECK (every time 8 times the expectation value T of the cell arrival interval elapses). The Dummy Cell Pulse DCP is normally output as a Dummy Cell Insertion Pulse.

When M Dummy Cell Pulses DCP in a row are generated without a reset by the Write-in Clock WC, the Dummy Stop signal DSP becomes "L", and a Dummy Cell Insertion Pulse DCIP is not output.

Thus, the cell arrival interval monitoring section 33 starts counting after a cell arrives, and outputs a Dummy Cell Insertion Pulse DCIP every time 8 times the expectation value of the cell arrival interval elapses; when M times 8 times the expectation value of the cell arrival interval elapses, the Dummy Cell Insertion Pulses DCIP stop.

Figure 33:
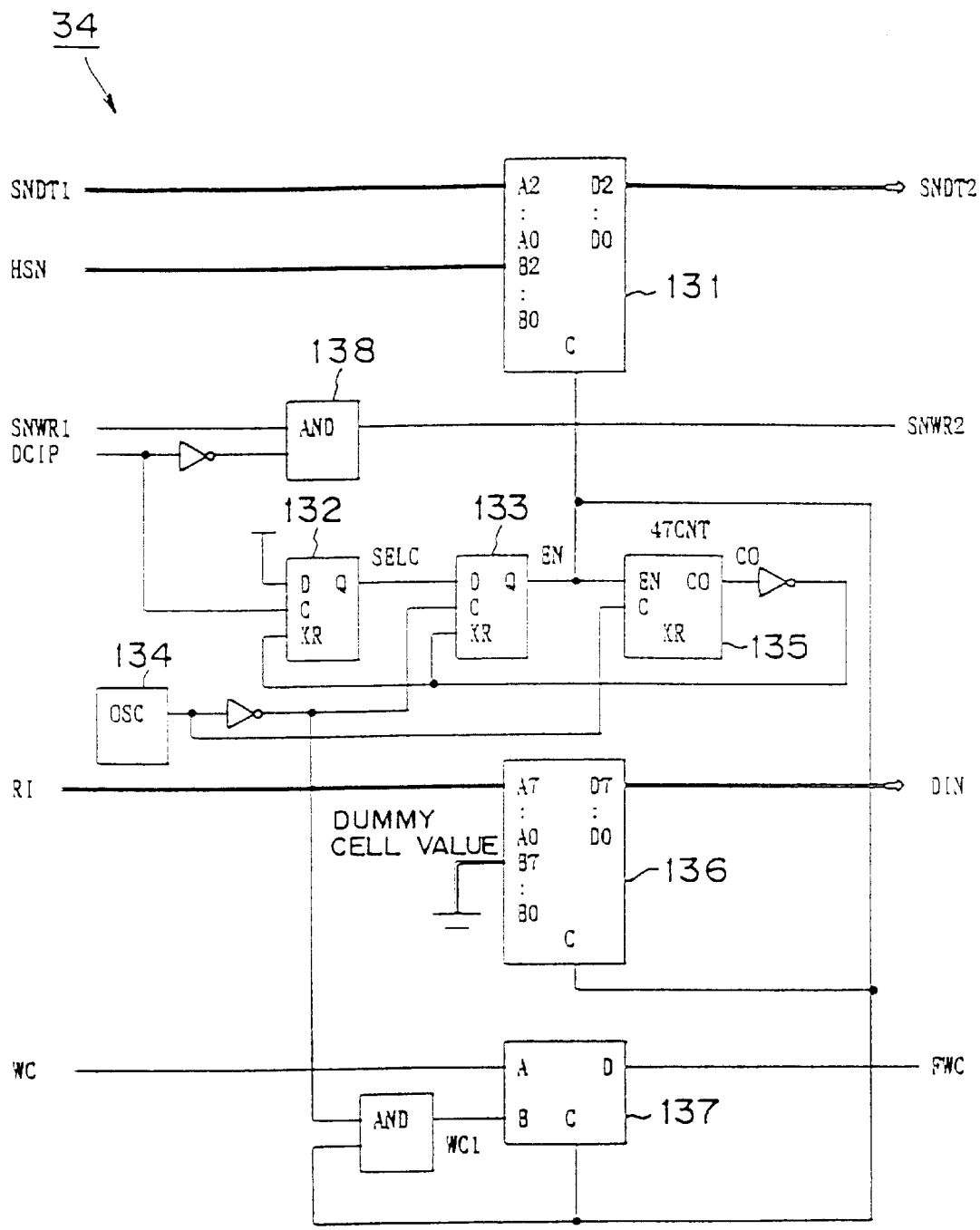
FIG. 33 is a configuration diagram of the dummy cell insertion section in the 6th type of buffer control system.

FIG. 33 is a configuration diagram of the dummy cell insertion section 34. The dummy cell insertion section 34 is a circuit that writes dummy cells into the cell FIFO section 22 in accordance with instructions from the cell arrival interval monitoring section 33.

The configuration shown in FIG. 33 corresponds to the 6th form of this embodiment. The configurations for the 1st to 5th forms of this embodiment will be described below; the buffer control system of this embodiment takes the 1st to 6th forms by changes in the configuration of the dummy cell insertion section 34.

The selector 131 receives the Sequence Number Datum SNDT1 extracted from the SAR header of the received cell via terminals A0 to A2; the Held Sequence Number HSN held by the received SN holding section 32 is received via terminals B0 to B2. Then, if the selection signal EN is "0", terminals A0 to A2 are selected; if the selection signal EN is "1", terminals B0 to B2 are selected. The selected datum is transferred to the ATM cell disassembly section 31 as the Sequence Number Datum SNDT2.

When the flip-flop 132 receives a Dummy Cell Insertion Pulse DCIP, the Selection signal SELC becomes "H". The flip-flop 133 uses the clock signal output from the oscillator 134 to latch the Selection signal SELC and outputs it as the selection signal EN. When the leading edge of the selection signal EN is received, the counter 135 starts counting; when the count reaches 47, the flip-flops 132 and 133 are reset. Here, the frequency of the clock generated by the oscillator 134 is the same as or faster than that of the Write-in Clock WC (that is to say, the Network Clock NC).

The selector 136 receives the Received Information RI extracted from the received cell by the ATM cell disassembly section 31 via terminals A0 to A7. Meanwhile, the terminals B0 to B7 are grounded (all 0). The selector 136 selects terminals A0 to A7 if the selection signal EN is "0", terminals B0 to B7 if the selection signal EN is "1". That is to say, the selector 136 outputs the Received Information RI during intervals when Dummy Cell Insertion Pulses DCIP are not received; when a Dummy Cell Insertion Pulse DCIP is received, all 0 is output as data stored in the dummy cell. The selector 136 output is transferred to the cell FIFO section 22 as the write-in datum DIN.

If the selection signal EN is "0", the selector 137 selects and outputs the Write-in Clock WC; if the selection signal EN is "1", it selects and outputs the clock generated by the oscillator 134. The selector 137 output is fed to the cell FIFO section 22 as the FIFO Write-in Clock FWC.

The AND circuit 138 passes the Dummy Cell Insertion Pulses DCIP when the Write-in signal SNWR1 pulses is "H". The AND circuit 138 output is transferred to the ATM cell disassembly section 31 as the Write-in Clock SNWR2.

Figure 34:
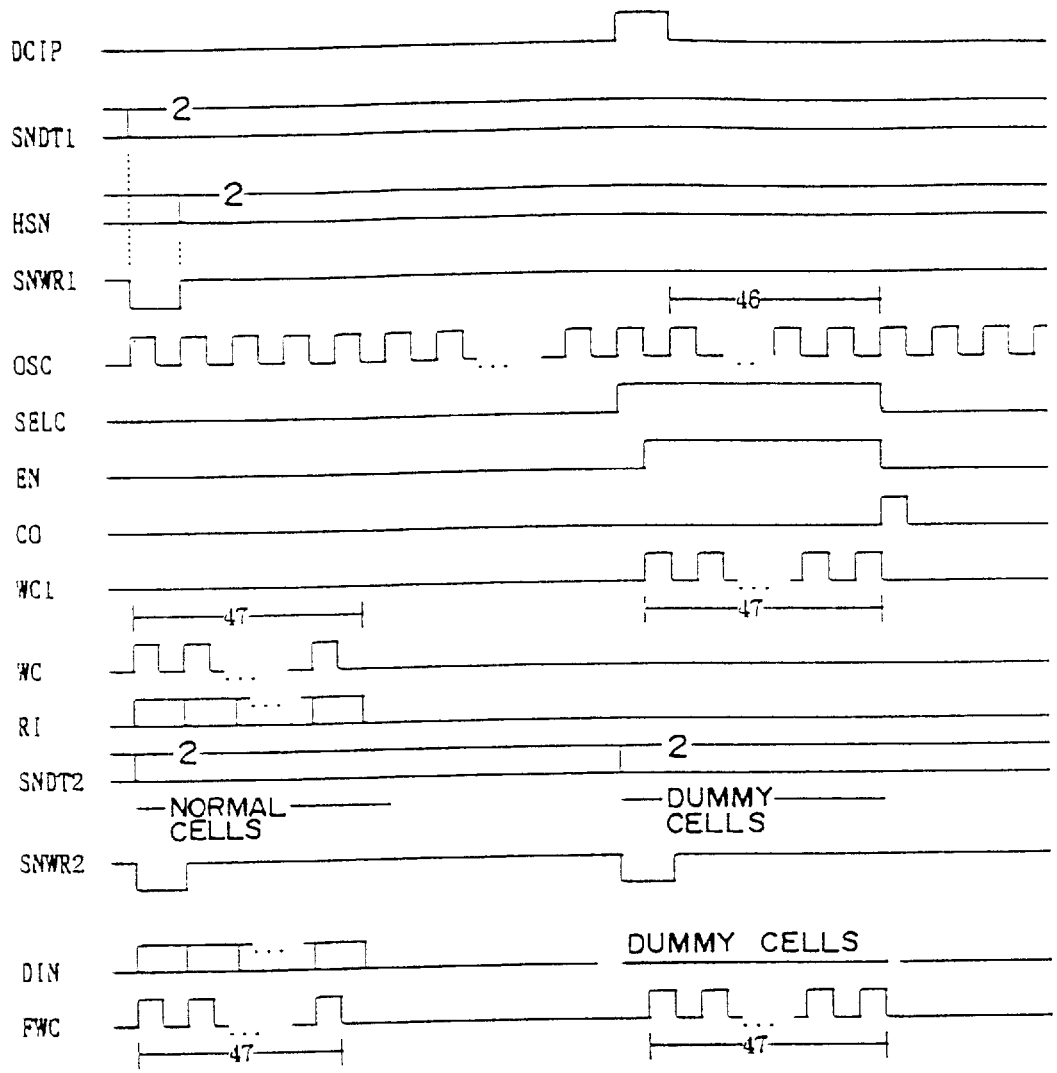
FIG. 34 is a diagram explaining the action of the dummy cell insertion section in the 6th type of buffer control system.

FIG. 34 is a diagram that explains the action of the dummy cell insertion section 34 shown in FIG. 33.

Here, we explain the case in which, after the cell SN=2 (called cell A) arrives, the next cell does not arrive until after 8 times the expectation value of the cell arrival interval or longer.

When cell A arrives, 47 clocks of the Write-in Clock WC are transferred from the ATM cell disassembly section 31. In addition, the Received Information RI extracted from cell A is transferred synchronized with the Write-in Clock WC. At this time, a Dummy Cell Insertion Pulse DCIP is not received, so the Received Information RI is transferred to the cell FIFO section 22 as the write-in datum DIN. That is to say, the cell A SAR-SDU is written into the cell FIFO section 22.

The Sequence Number extracted from cell A (the Sequence Number Datum SNDT1) passes through the selector 131 and is returned to the ATM cell disassembly section 31. In addition, its Sequence Number (SN=2) is held in the received SN holding section 32.

When 8 times the expectation value of the cell arrival interval elapses after cell A arrives, a Dummy Cell Insertion Pulse DCIP is generated. This causes the selection signal EN to become "1", so that the selectors 131, 136 and 137 select and output data from terminal B.

That is to say, the selector 131 outputs the Sequence Number held by the received SN holding section 32 (the Held Sequence Number HSN: SN=2). This output is transferred to the ATM cell disassembly section 31 and then transferred to the Read Clock generation section 26. The selector 136 outputs all 0 as the dummy cell values. At this time, the selector 137 outputs 47 clocks of the FIFO Write-in Clock FWC for the purpose of writing selector 136 output data into the cell FIFO section 22. This causes 1 dummy cell to be written into the cell FIFO section 22.

The action of the Read Clock generation section 26 when a Dummy Cell Insertion Pulse DCIP is generated is as follows. When a Dummy Cell Insertion Pulse DCIP is generated, the Sequence Number held in the received SN holding section 32 (the Held Sequence Number HSN) is posted to the Read Clock generation section 26. That is to say "SN=2" is posted. Here, the last cell that arrived was cell A, and its Sequence Number was 2. Consequently, in FIG. 29, the result of computation by the 3-bit subtractor 105 becomes "0", and the result of computation by the 3-bit subtractor 106 becomes "7". As a result of this, the Read Clock generation section 26 judges that 7 cells have been lost; to compensate for those lost cells, the Readout Stop signal XRDSTP is set to "L" for just the time required to read 7 cells from the cell FIFO section 22, and during this time cell readout from the cell FIFO section 22 stops.

Thus, in the buffer control system of the 6th form of this embodiment, when 1 Dummy Cell Insertion Pulse DCIP is generated, the dummy cell insertion section 34 writes 1 dummy cell into the cell FIFO section 22, and, at the same time, cell readout from the cell FIFO section 22 is halted for just the time required to read 7 cells out of the cell FIFO section 22.

Figure 35:
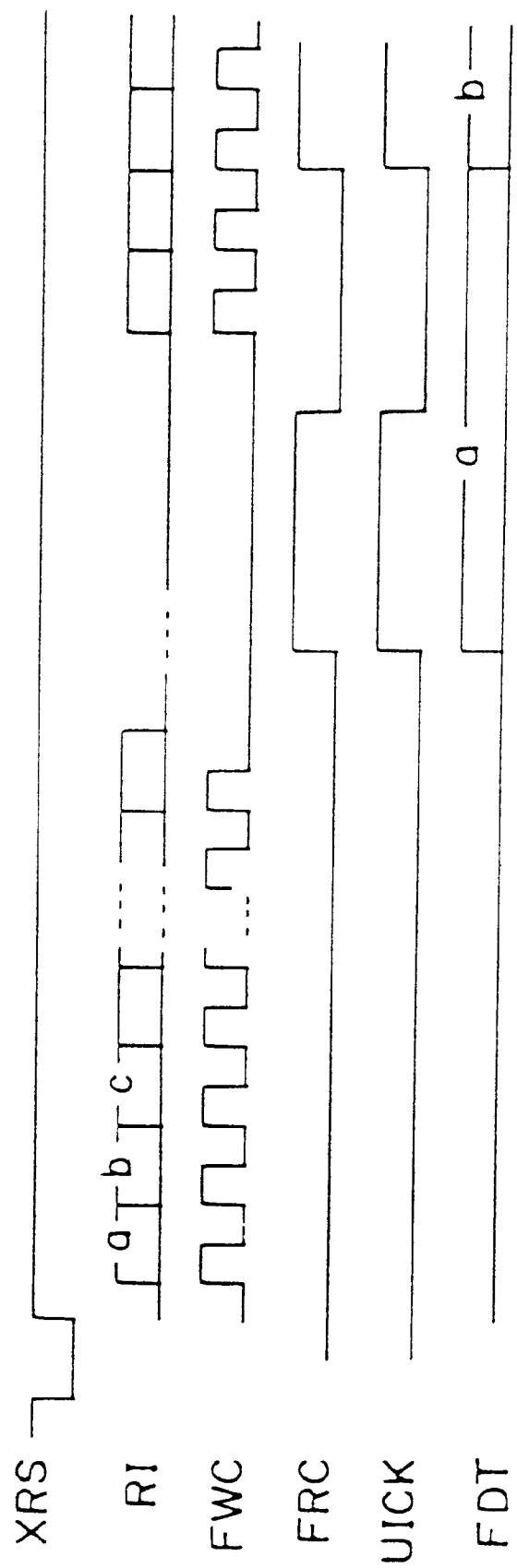
FIG. 35 is a diagram explaining the action of the cell FIFO section.

FIG. 35 is a diagram that explains the action of the cell FIFO section 22. As shown in FIG. 35, the cell FIFO section 22 writes write-in data DIN, transferred from the dummy cell insertion section 34 in accordance with the FIFO Write-in Clock FWC, 1 at a time. In addition, cells written in to the cell FIFO section 22 are read out 1 at a time in accordance with the FIFO Read Clock FRC that is transferred from the selector section 28, and transferred to the selector section 28 as the FIFO Data FDT.

Although not shown in FIG. 35, when the cell FIFO section 22 is empty or full, an XEMPTY signal or an XFULL signal is used to post that fact to the FIFO Reset generation section 27. In addition, when a pulse of the Reset signal XRST is received, the cell FIFO section 22 discards any cells that are stored in the cell FIFO section 22 at that time.

Figure 36:
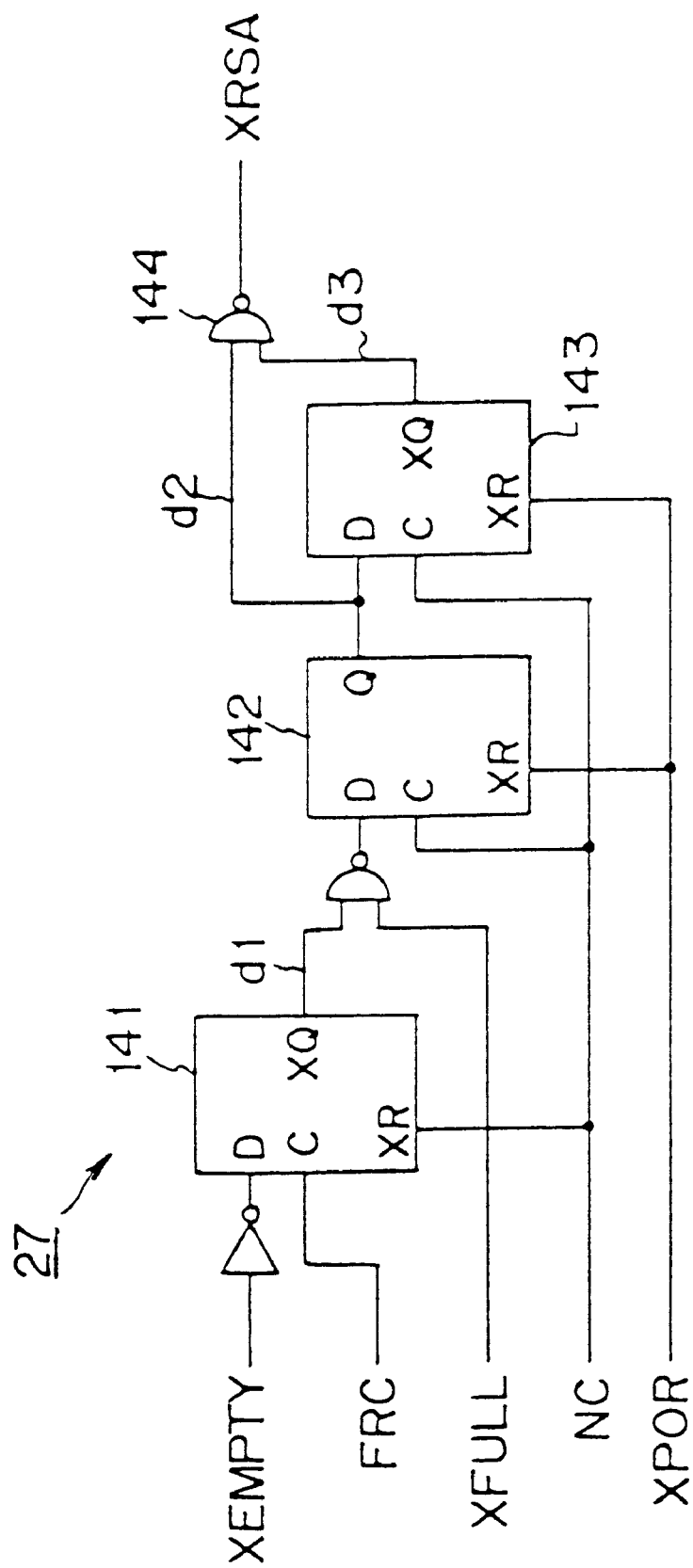
FIG. 36 is a configuration diagram of the FIFO Reset generation section.

FIG. 36 is a configuration diagram of the FIFO Reset generation section 27. The FIFO Reset generation section 27 is a circuit that resets the cell FIFO section 22 and the first cell detection section 24 when the cell FIFO section 22 is empty or full.

The flip-flop 141 uses the FIFO Read Clock FRC to latch the XEMPTY signal. The flip-flop 142 uses the Network Clock NC to latch the result of a NAND operation on the inverted output from the flip-flop 141 and the XFULL signal. The flip-flop 143 uses the Network Clock NC to latch the output from the flip-flop 142. The flip-flops 142 and 143 are reset by the Power-On Reset signal XPOR that is generated when power is turned ON. The NAND circuit 144 generates the reset signal XRSA from the output of the flip-flop 142 and the inverted output of the flip-flop 143.

Figure 37:
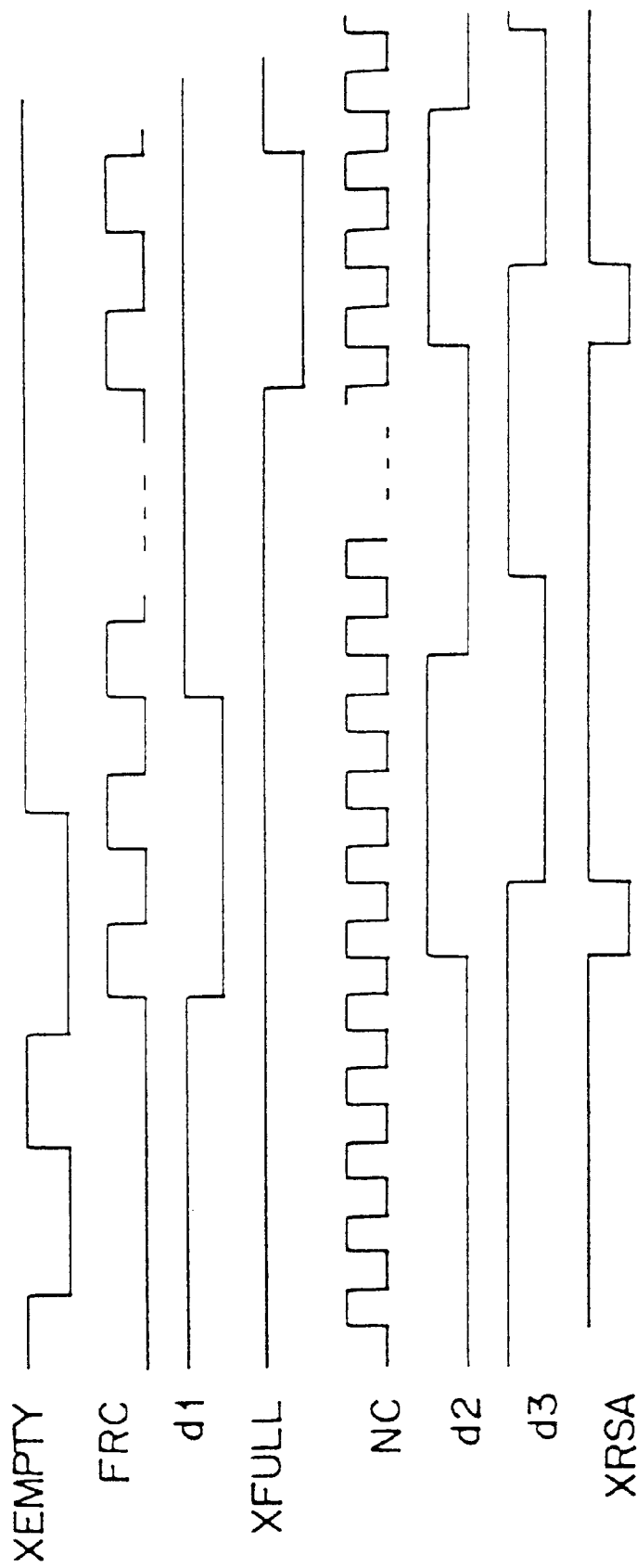
FIG. 37 is a diagram explaining the action of the FIFO Reset generation section.

FIG. 37 is a diagram that explains the action of the FIFO Reset generation section 27. As shown in FIG. 37, when the signal XEMPTY is "L", when an FIFO Read Clock FRC is input, the signal d1 becomes "L", and the FRC Reset generation section 27 generates a pulse of the Reset signal XRSA. That is to say, when an attempt is made to read a cell out while the FIFO Reset generation section 27 is in the empty condition, a pulse of the Reset signal XRSA is generated. In addition, when the signal XFULL becomes "L", a pulse of the Reset signal XRSA is generated immediately.

Figure 38:
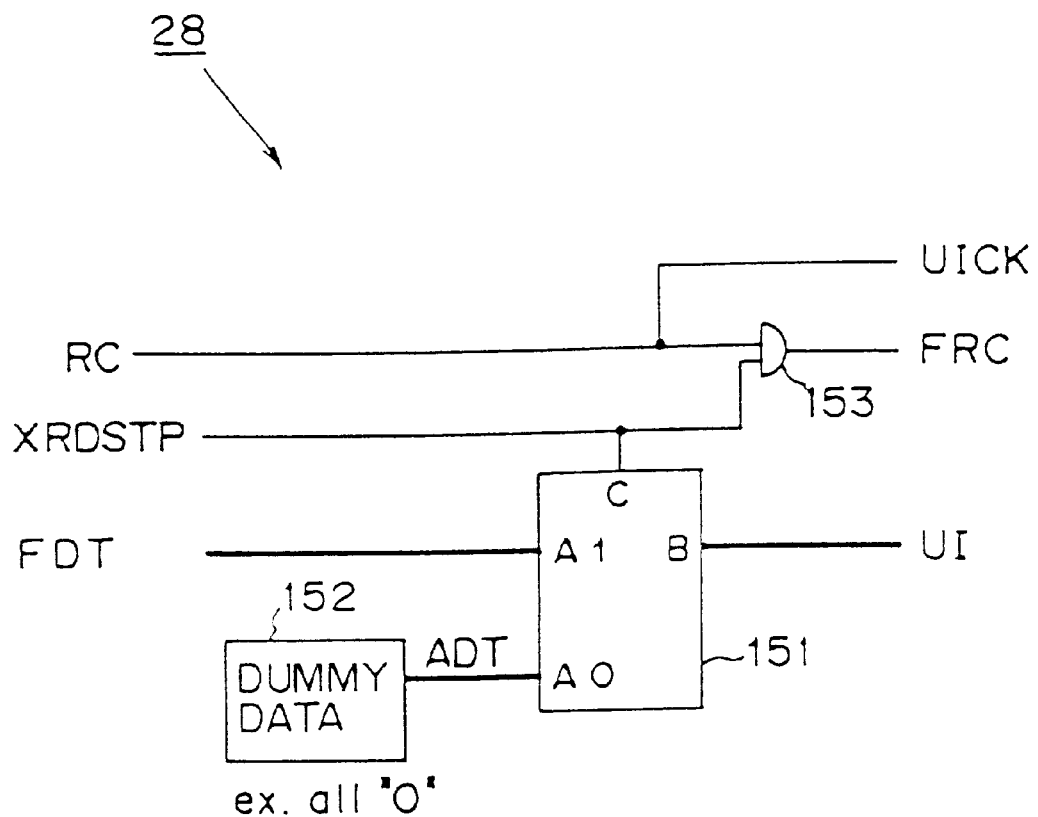
FIG. 38 is a configuration diagram of the selector section.

FIG. 38 is a configuration diagram of the selector section 28. The selector section 28 is a circuit that selects a cell read out from the cell FIFO section 22 or dummy data, and outputs it as the User Information UI.

The selector 151 determines the output in accordance with the Readout Stop signal XRDSTP. The dummy datum ADT generated by the dummy data generation section 152 are input to terminal A0 of the selector 151, and the FIFO datum FDT read out from the cell FIFO section 22 is fed to terminal A1. These data are supplied in 8-bit parallel format. The dummy data generation circuit 152 generates, for example, all 0 as the dummy data ADT.

If the Readout Stop signal XRDSTP is in "halt" status, the selector 151 selects and outputs the dummy data ADT generated by the dummy data generation circuit 152; when it is in any other status, the selector 151 selects and outputs the FIFO datum FDT read out from the cell FIFO section 22. The selector 151 output is the User Information UI. In addition, if the Readout Stop signal XRDSTP is in "halt" status, the Readout Clock RC cannot pass through the AND circuit 153, and the FIFO Read Clock FRC is not fed to the cell FIFO section 22, so cell readout from the cell FIFO section 22 is halted.

Figure 39:
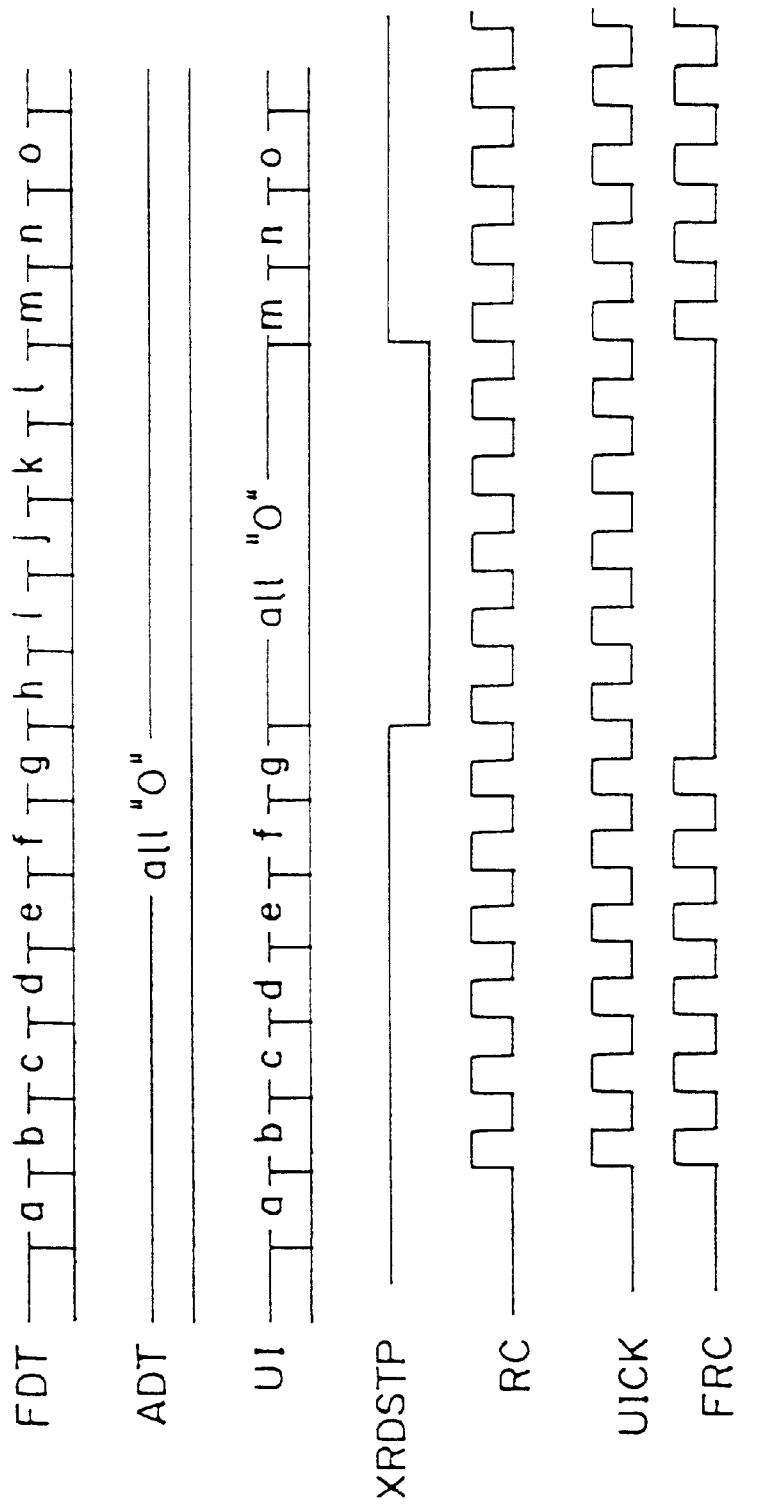
FIG. 39 is a diagram explaining the action of the selector section.

FIG. 39 is a diagram that explains the action of the selector section 28. As shown in FIG. 39, while the Readout Stop signal XRDSTP is "H", the selector section 28 outputs data read out from the cell FIFO section 22; while the Readout Stop signal XRDSTP is "L", the selector section 28 outputs dummy data. In addition, while the Readout Stop signal XRDSTP is "L", the FIFO Read Clock is not fed to the cell FIFO section 22, and cell readout is halted. In FIG. 39, during the time from h to l, cell readout is halted, and all "0" is output as the User Information UI.

Next, we explain the configurations and actions of the dummy cell insertion section 34 that produce the 1st to 5th forms of this embodiment. In the 1st to 5th forms of this embodiment, the dummy cell insertion section still has many circuits that have the same action as in the dummy cell insertion section of the 6th form of this embodiment shown in FIG. 33; only the differences from the 6th form are explained below.

Figure 40:
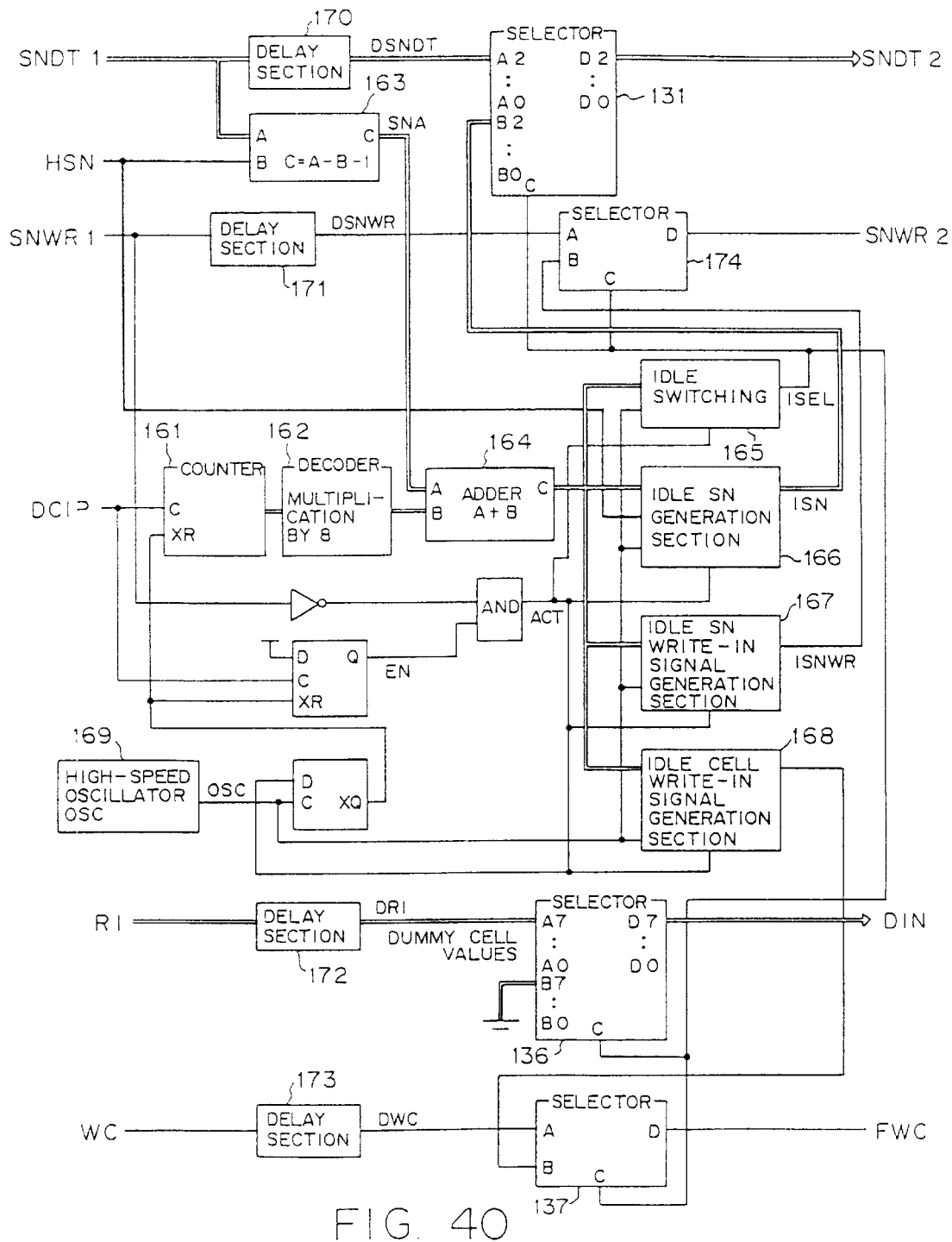
FIG. 40 is a configuration diagram of the dummy cell insertion section in the 1st type of buffer control system.

FIG. 40 is a configuration diagram of the dummy cell insertion section in the 1st form of this embodiment shown in FIG. 9.

The counter 161 counts the number of Dummy Cell Insertion Pulses DCIP generated by the cell arrival interval monitoring section 33. The decoder 162 multiplies the number of Dummy Cell Insertion Pulses DCIP counted by the counter 161 by 8 and posts the result to the adder 164. The subtractor 163 combines the functions of the 3-bit subtractors 105 and 106 shown in FIG. 29; the Sequence Number held in the received SN holding section 32 (the Held Sequence Number HSN) is subtracted from the Sequence Number of the received cell (the Sequence Number Datum SNDT1), then 1 is subtracted from that difference and the result is posted to the adder 164. The adder 164 computes the number of lost cells by adding the values posted from the decoder 162 and the subtractor 163. This number of lost cells is posted to the idle switching section 165, the idle SN generation section 166, the idle SN write-in signal generation section 167 and the idle cell write-in signal generation section 168.

The idle switching section 165, the idle SN generation section 166, the idle SN write-in signal generation section 167 and the idle cell write-in signal generation section 168 act in accordance with the clock OSC generated by the oscillator 169. It is desirable for the frequency of the clock generated by the oscillator 169 to be faster than the frequency of the Network Clock NC. In addition, after a Dummy Cell Insertion Pulse DCIP is received, the idle switching section 165, the idle SN generation section 166, the idle SN write-in signal generation section 167 and the idle cell write-in signal generation section 168, respectively, are activated when pulses of the write-in signal SNWR1 are received. That is to say, when a Dummy Cell Insertion Pulse DCIP is received, the signal EN becomes "H"; when, while it is "H", a pulse of the write-in signal SNWR1 is received, pulses of the Activation signal ACT are generated, and the idle switching section 165, the idle SN generation section 166, the idle SN write-in signal generation section 167 and the idle cell write-in signal generation section 168 are activated. The Sequence Number held in the received SN holding section 32 (the Held Sequence Number HSN) is posted to the idle SN generation section 166.

The Sequence Number Datum SNDT1 input to the selector 131, the write-in signal SNWR1 input to the selector 174, the Received Information RI input to the selector 136 and the Write-in Clock WC input to the selector 137 are delayed by the delay sections 170 to 173, respectively.

The idle switching section 165, the idle SN generation section 166, the idle SN write-in signal generation section 167 and the idle cell write-in signal generation section 168 will be explained referring to FIG. 41. They execute write-in processing of idle Sequence Numbers (the Sequence Numbers corresponding to dummy cells) and idle cells (dummy cells) while data are being delayed by the delay sections 170 to 173.

Figure 41:
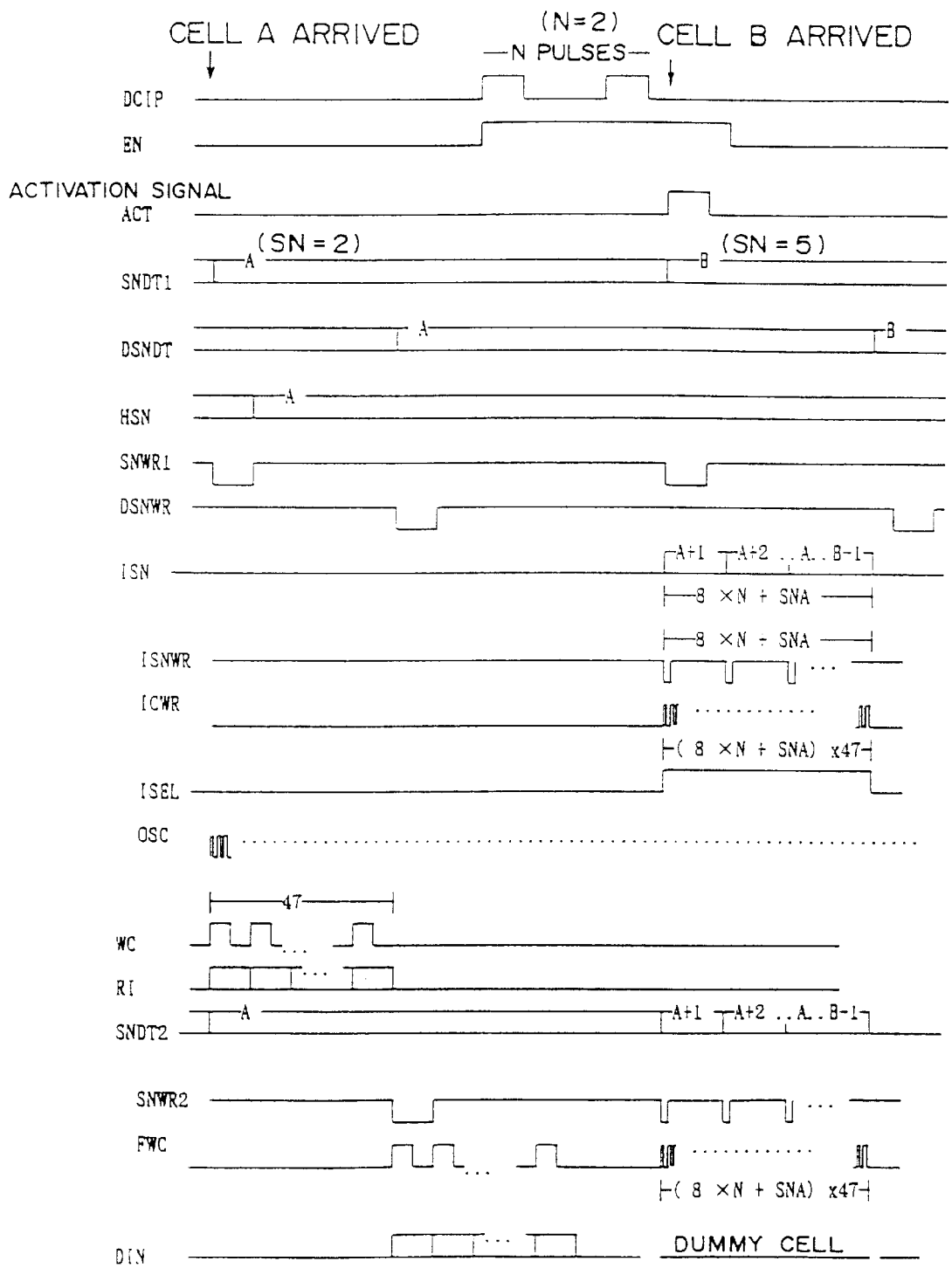
FIG. 41 is a diagram explaining the action of the dummy cell insertion section in the 1st type of buffer control system.

FIG. 41 is a diagram that explains the action of the dummy cell insertion section in the buffer control system of the 1st form of this embodiment. Here, as in the example shown in FIG. 9, we assume that 18 cells in a row (SN=3, 4, 5, 6, 7, 0, 1, 2, SN=3 to 2 again, and SN=3 and 4) have been lost. The cell immediately before the 18 lost cells is called cell A (SN=2); the cell immediately after the 18 lost cells is called cell B (SN=5).

The action when cell A arrives is the same as in the 6th form of this embodiment, explained with reference to FIG. 34. At this time, "SN=2" is held in the received SN holding section 32.

When cell B arrives, a pulse of the write-in signal SNWR1 is generated, and this in turn causes a pulse of the Activation signal ACT to be generated. At this time, the counter 161, the decoder 162, the subtracter 163 and the adder 164 compute the number of cells that were lost. That is to say, "SNA=2" is obtained from the Sequence Numbers of cell A and cell B as output of the subtractor 163. In addition, since 2 Dummy Cell Insertion Pulses DCIP have been received during the time from the arrival of cell A to the arrival of cell B, "16" is obtained as the output of the decoder 162. Consequently, "18" is obtained as the number of cells lost.

The idle switching section 165 outputs "H" only during the time equivalent to 18×47 clocks of the clock OSC generated by the oscillator 169. The output of the idle switching section 165 is the signal ISEL. The idle SN generation section 166 increments the Sequence Number (SN=2) 1 at a time every time 47 clocks of the clock OSC are received, and outputs the result. The idle SN write-in signal generation section 167 generates a pulse of the write-in signal ISNWR every time 47 clocks of the clock OSC are received.

Through this action the Sequence Numbers corresponding to the 18 lost cells (SN=3, 4, 5, 6, 7, 0, 1, 2, SN=3 to 2 again, then DN=3 and 4) are generated, and written into the ATM cell disassembly section SN-FIFO 59. These Sequence Numbers are posted to the Read Clock generation section 26. Consequently, the Sequence Numbers are posted to the Read Clock generation section 26 just as when cells are not lost, so that cell readout from the cell FIFO section 22 is not halted.

The idle cell write-in signal generation section 168 outputs the write-in clock ICWR by passing 18×47 clocks of the clock OSC. This 18×47-clock write-in clock ICWR is fed to the cell FIFO section 22 as the FIFO Write-in Clock FWC. At this time, the selector 136 outputs a dummy cell value as the write-in datum DIN, so 18×47 bytes of dummy cell values are written into the cell FIFO section 22. That is to say, 18 dummy cells are written into the cell FIFO section 22.

Thus, in the 1st form of this embodiment, the time from the arrival of cell A until the arrival of cell B, and, using the Sequence Numbers of cell A and cell B, the number of cells that were lost, are computed, and a number of dummy cells equal to the number of lost cells are written into the cell FIFO section 22.

Figure 42:
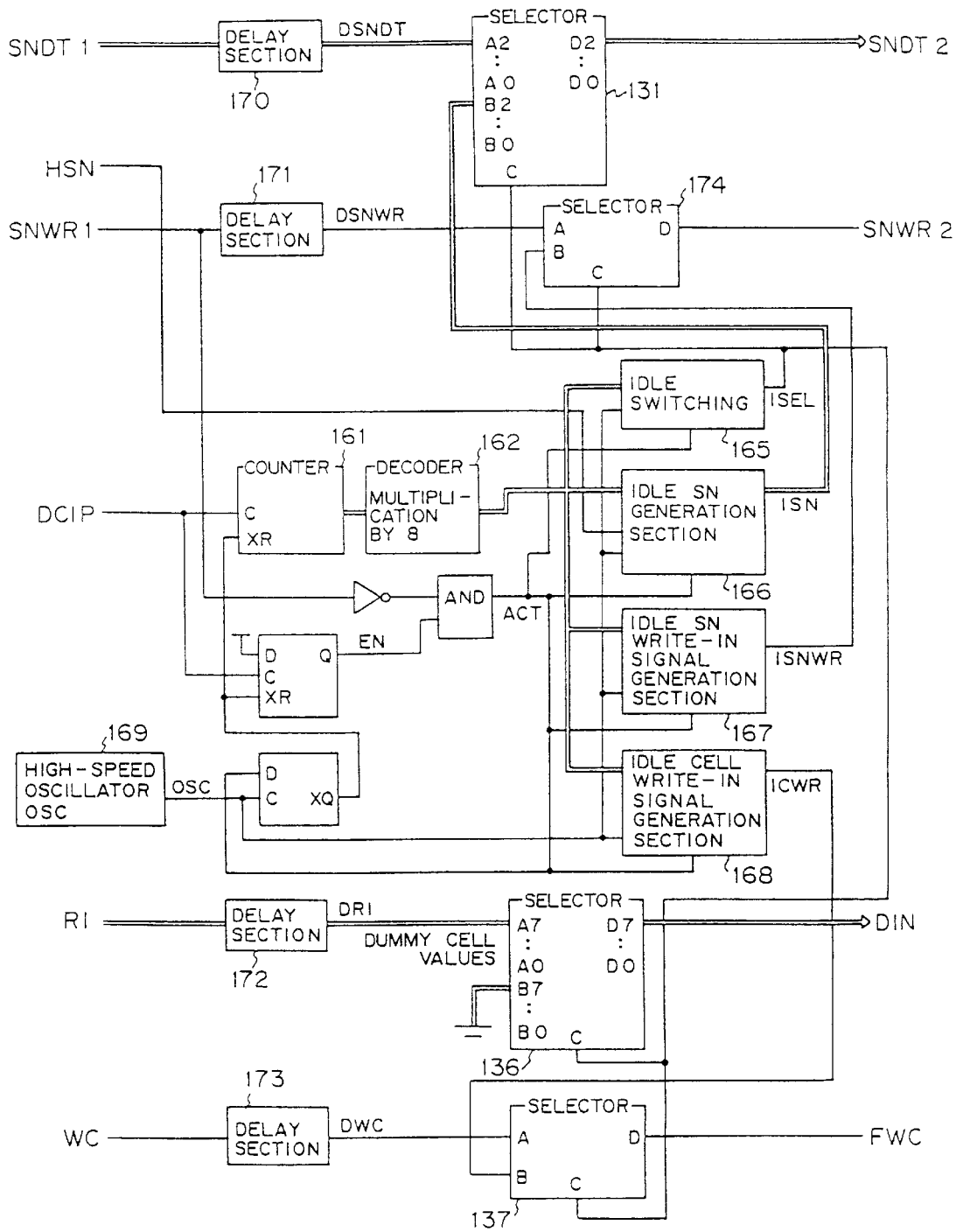
FIG. 42 is a configuration diagram of the dummy cell insertion section in the 2nd type of buffer control system.

FIG. 42 is a configuration diagram of the dummy cell insertion section in the buffer control system of the 2nd form of this embodiment shown in FIG. 10. The symbols used in FIG. 42 indicate the same circuits and blocks as in FIG. 40. In the configuration of the 2nd form of this embodiment, the subtractor 163 and the adder 164 used in the 1st form of this embodiment have been removed.

Figure 43:
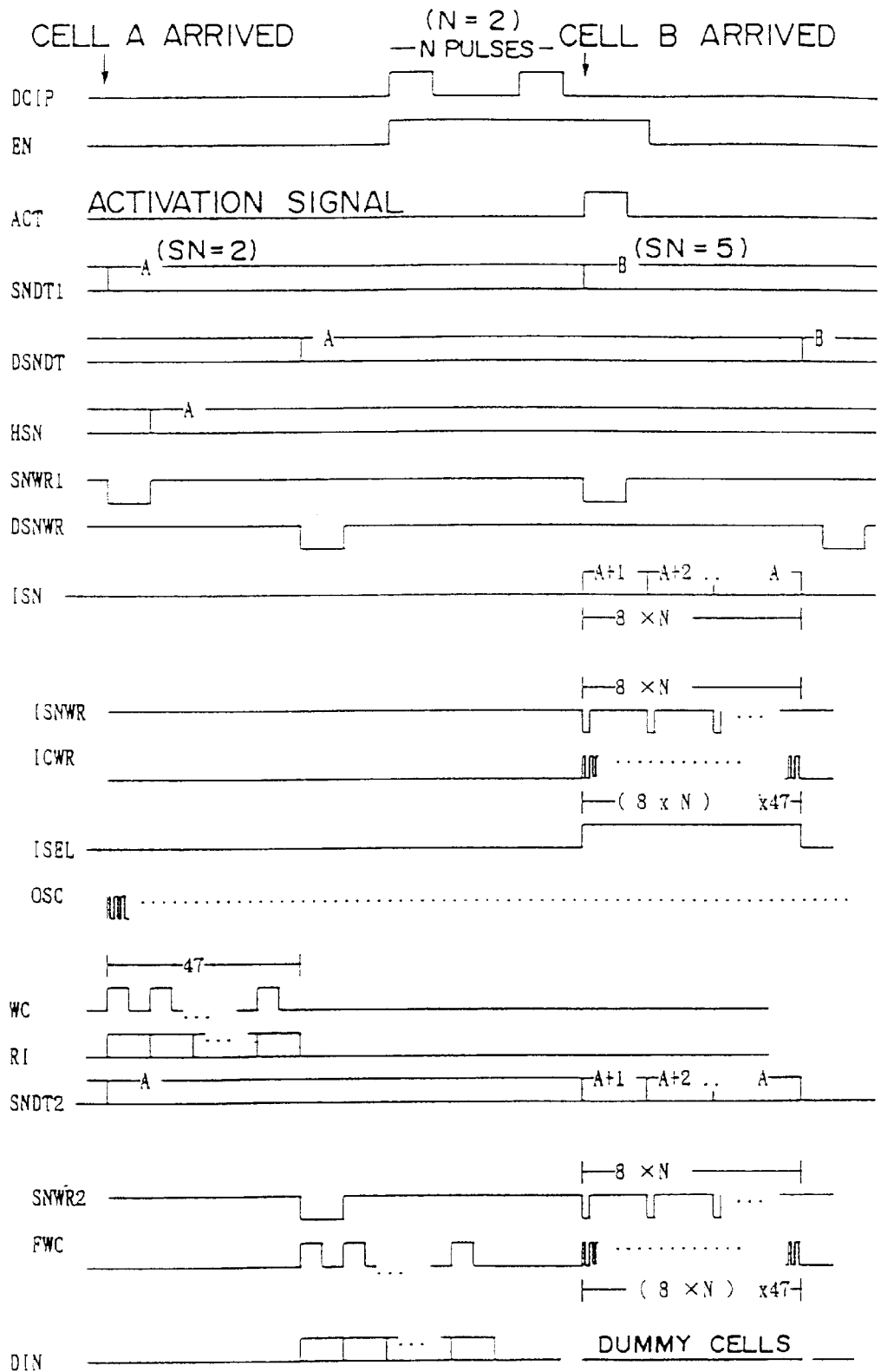
FIG. 43 is a diagram explaining the action of the dummy cell insertion section in the 2nd type of buffer control system.

FIG. 43 is a diagram that explains the action of the dummy cell insertion section in the buffer control system of the 2nd form of this embodiment. The action when cell A arrives is the same as in the 1st form of this embodiment.

When cell B arrives, a pulse of the write-in signal SNWR1 is generated, which in turn causes a pulse of the Activation signal ACT to be generated. At this time, 2 Dummy Cell Insertion Pulses DCIP have been received during the time from the arrival of cell A to the arrival of cell B, so the output of the decoder 162 becomes "16". Consequently, "16" is posted to the idle switching section 165, the idle SN generation section 166, the idle SN write-in signal generation section 167 and the idle cell write-in signal generation section 168.

The output signal ISEL of the idle switching section 165 is set to "H" during the time required for 16×47 clocks of the clock OSC generated by the oscillator 169. The idle SN generation section 166 increments the Sequence Number by 1, starting from the Sequence Number of cell A (SN=2), every time 47 clocks of the clock OSC are received, and outputs the result. The idle SN write-in signal generation section 167 generates a pulse of the write-in signal ISNWR every time 47 clocks of the clock OSC are received.

Through this action Sequence Numbers corresponding to 16 cells (SN=3, 4, 5, 6, 7, 0, 1, 2, then SN=3 to 2 again) are generated, and written in to the ATM cell disassembly section 31 SN-FIFO 59. These Sequence Numbers are posted to the Read Clock generation section 26.

After the cell A Sequence Number (SN=2) has been posted, the 16 cell Sequence Numbers generated by the idle SN generation section 166 (SN=3, 4, 5, 6, 7, 0, 1, 2, then SN=3 to 2 again) are posted to the Read Clock generation section 26. Further, after that the cell B Sequence Number (SN=5) is posted. Here, since the Sequence Number jumps from 2 to 5, the Read Clock generation section 26 sets the Readout Stop signal to "L" for the time required to read 2 cells out of the cell FIFO section 22 in order to compensate for those 2 cells (SN=3,4). At this time, dummy data corresponding to 2 cells are output to replace the 2 cells that are not read out of the cell FIFO section 22.

The idle cell write-in signal generation section 168 passes 16×47 clocks of the clock OSC, and outputs them as the write-in clock ICWR. These 16×47 clocks of the write-in clock ICWR are fed to the cell FIFO section 22 as the FIFO Write-in Clock FWC. At this time, since dummy cell values are output as the write-in data DIN, the selector 136 outputs 16×47 bytes of dummy cell values to the cell FIFO 22. That is to say, 16 dummy cells are written into the cell FIFO section 22.

In the 2nd form of this embodiment, compared to the 1st form of this embodiment, the number of dummy cells written into the cell FIFO section 22 is less, so the action of the dummy cell insertion section 34 can be slowed down, making timing design easier.

Figure 44:
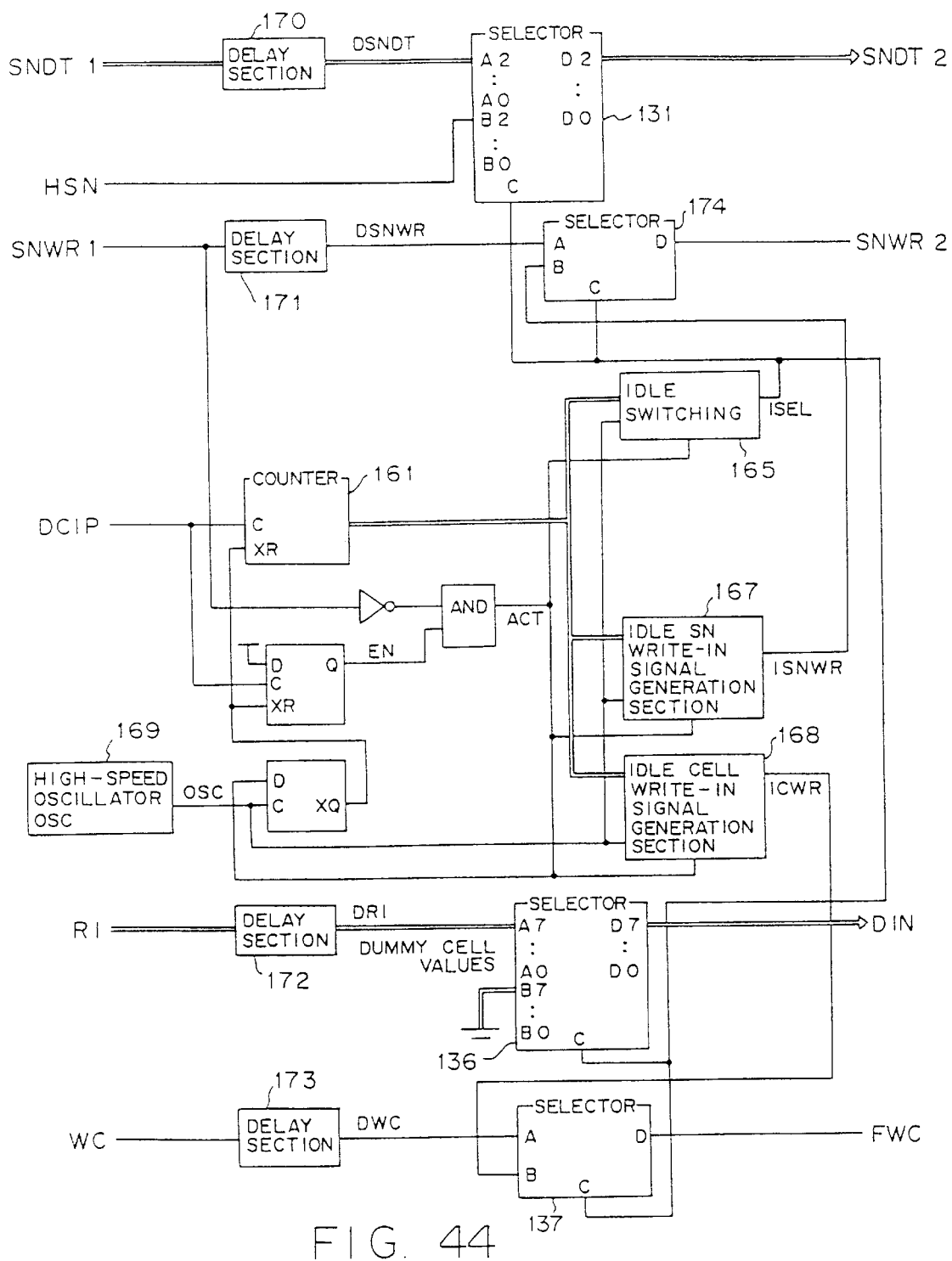
FIG. 44 is a configuration diagram of the dummy cell insertion section in the 3rd type of buffer control system.

FIG. 44 is a configuration diagram of the dummy cell insertion section in the buffer control system of the 3rd form of this embodiment shown in FIG. 11. The symbols used in FIG. 44 indicate the same circuits and blocks as in FIG. 42. In the configuration of the 3rd form of this embodiment, the decoder 162 and the idle SN generation section 166 used in the 2nd form of this embodiment have been removed.

Figure 45:
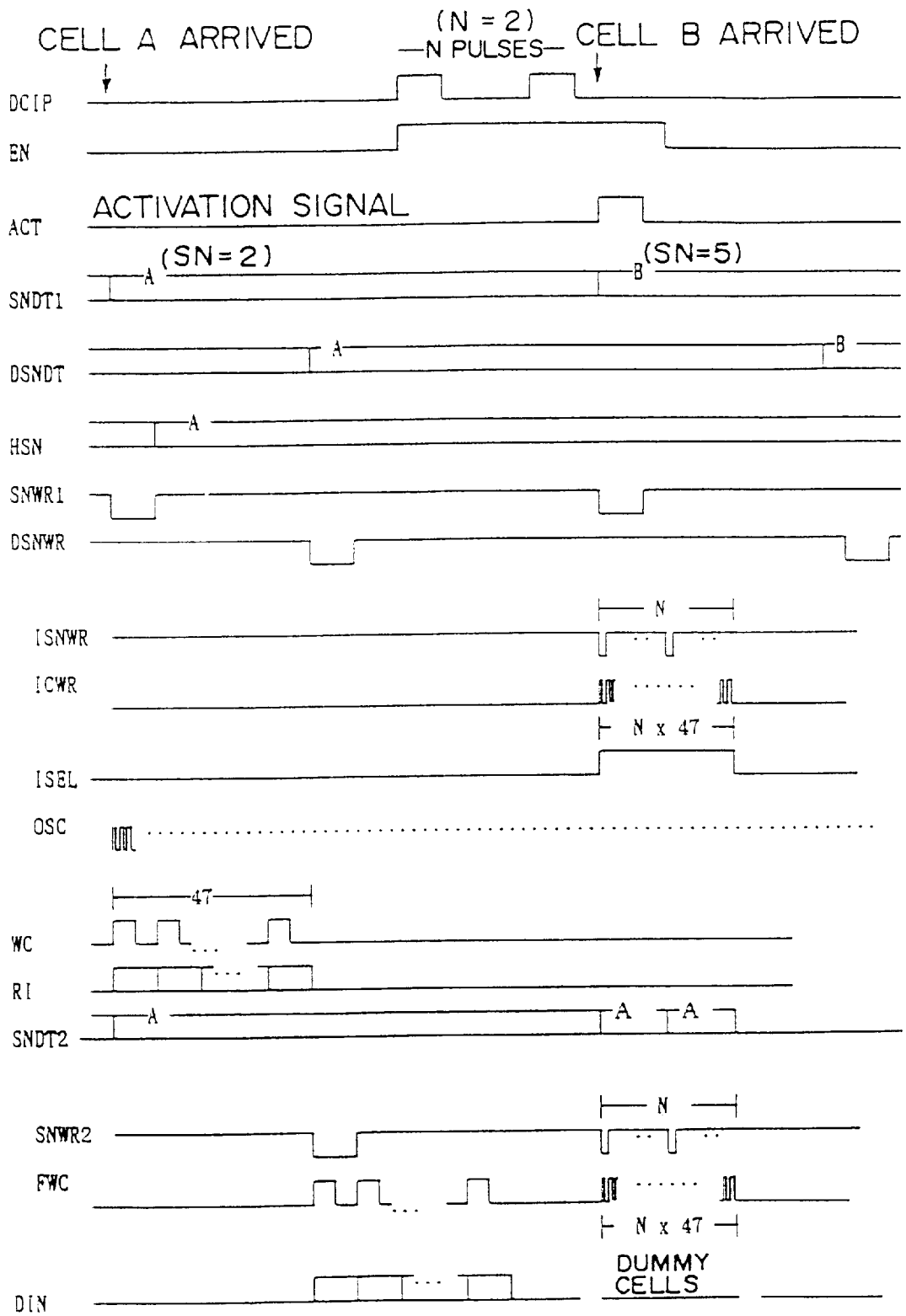
FIG. 45 is a diagram explaining the action of the dummy cell insertion section in the 3rd type of buffer control system.

FIG. 45 is a diagram that explains the action of the dummy cell insertion section in the buffer control system of the 2nd form of this embodiment. The action when cell A arrives is the same as in the 2nd form of this embodiment.

Since 2 Dummy Cell Insertion Pulses DCIP are received during the time between the arrival of cell A and the arrival of cell B, when cell B is received the counter 161 outputs "2". Consequently, "2" is posted to the idle switching section 165, the idle SN write-in signal generation section 167 and the idle cell write-in signal generation section 168, respectively.

When the idle SN write-in signal generation section 167 receives "2", it generates 2 pulses of the write-in signal ISNWR. At this time, the selector 131 outputs the Sequence Number held in the received SN holding section 32 (the Held Sequence Number HSN). Here, the received SN holding section 32 holds the Sequence Number of cell A (SN=2). Consequently, the selector 131 outputs "2" twice in a row following the Sequence Number extracted from cell A (SN=2). After that, the selector 131 outputs the Sequence Number (SN=5) extracted from cell B.

Through the above action, the Sequence Number Information SNINFO posted to the Read Clock generation section 26 is in the order SN=2, 2, 2, 5. When the Sequence Number Information SNINFO posted to the Read Clock generation section 26 is in the order SN=2, 2, 2, 5, the action through which dummy data corresponding to 16 cells are created is as was explained with reference to FIG. 11.

When the idle cell write-in signal generation section 168 receives "2" from the counter 161, the action through which 2 dummy cells are written into the cell FIFO 22 is the same as the action in the 1st and 2nd forms of this embodiment.

In the 3rd form of this embodiment, the number of dummy cells written into the cell FIFO section 22 is less than in the 2nd form of this embodiment, so the action of the dummy cell insertion section 34 can be made slower, making timing design easier. In addition, a function that increments or generates Sequence Numbers is not needed in the dummy cell insertion section 34, so the circuit configuration is simplified.

Figure 46:
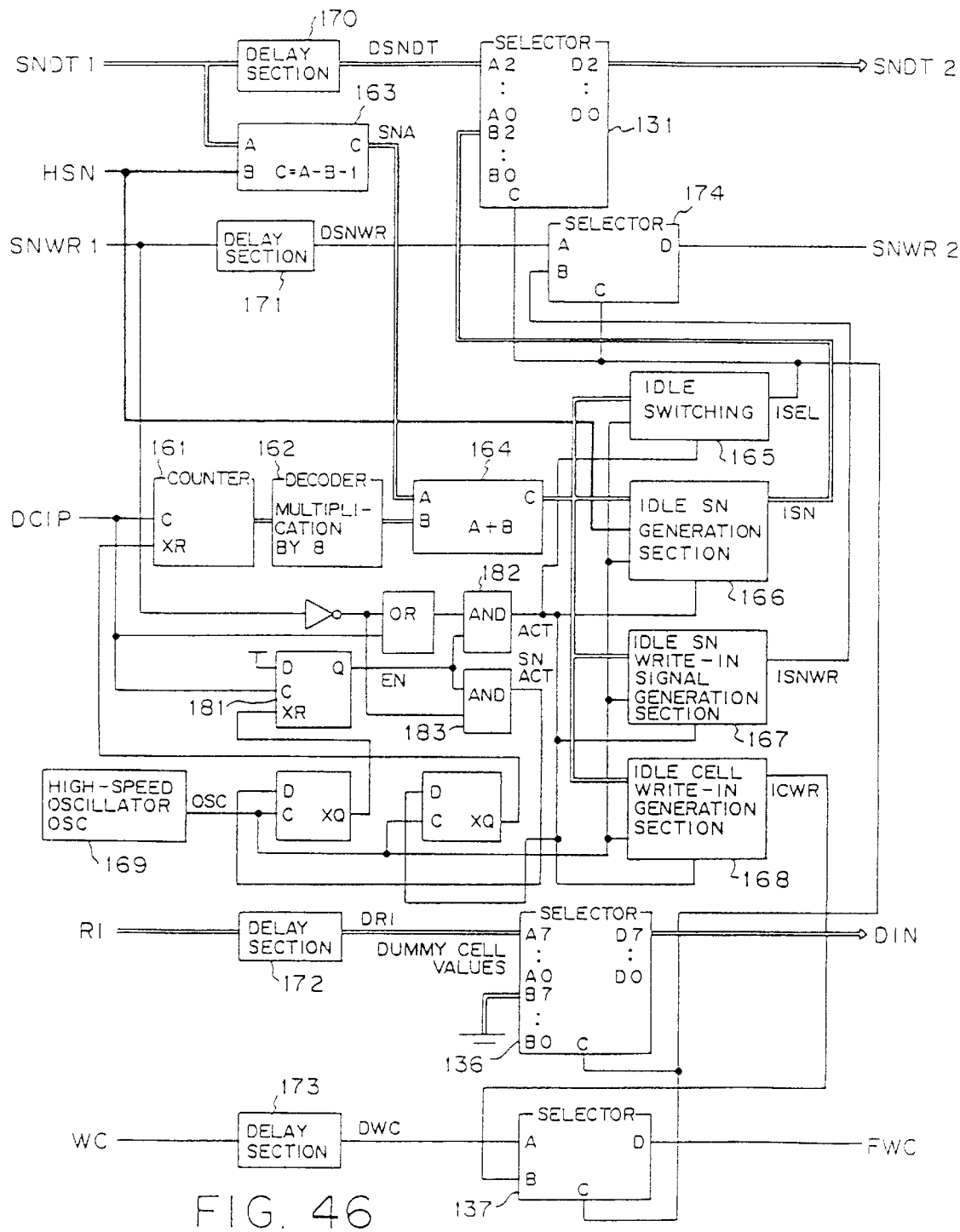
FIG. 46 is a configuration diagram of the dummy cell insertion section in the 4th type of buffer control system.

FIG. 46 is a configuration diagram of the dummy cell insertion section in the buffer control system of the 4th form of this embodiment shown in FIG. 12. The symbols used in FIG. 46 indicate the same circuits and blocks as in FIG. 40. the 4th form of this embodiment is based on the 1st form of this embodiment, but the timing with which cell loss is detected and dummy cells are generated is different.

In the 4th form of this embodiment, every time a Dummy Cell Insertion Pulse DCIP is received, the flip-flop 181 output signal EN is immediately set to "H"; this in turn causes the AND circuit 182 to output a pulse. The AND circuit 182 output is an Activation signal ACT, which activates the idle switching section 165, the idle SN generation section 166, the idle SN write-in signal generation section 167 and the idle cell write-in signal generation section 168.

With this timing, that is to say, the timing with which Dummy Cell Insertion Pulses DCIP are received, the counter 161 outputs "1", and the decoder 162 outputs "8". The adder 164 ignores the output of the subtractor 163 input into terminal A. Consequently, the adder 164 outputs "8", which is the output of the decoder 162, as it is, and that value is posted to the idle switching section 165, the idle SN generation section 166, the idle SN write-in signal generation section 167 and the idle cell write-in signal generation section 168. This in turn causes 8 dummy cells to be generated and written into the cell FIFO section 22.

The counter 161 is reset by the output of the AND circuit 183. That is to say, when the counter 161 receives a Dummy Cell Insertion Pulse DCIP, it outputs "1" and then is immediately reset.

When cell B is received, a pulse of the write-in signal SNWR1 is generated, and this in turn causes a pulse of the Activation signal ACT to be generated. That is to say, when cell B is received, the idle switching section 165, the idle SN generation section 166, the idle SN write-in signal generation section 167 and the idle cell write-in signal generation section 168 are activated.

At this time, if we assume that cell A and cell B have the Sequence Numbers 2 and 5 respectively, the output of the subtractor 163 becomes "2". In addition, the counter 161 is reset every time a Dummy Cell Insertion Pulse DCIP is received, so the outputs of the counter 161 and the decoder 162 are "0". Consequently, the adder 164 outputs "2", which is the output of the subtractor 163, as it is, and that value is posted to the idle switching section 165, the idle SN generation section 166, the idle SN write-in signal generation section 167 and the idle cell write-in signal generation section 168. This in turn causes 2 dummy cells to be generated and written into the cell FIFO section 22.

Figure 47:
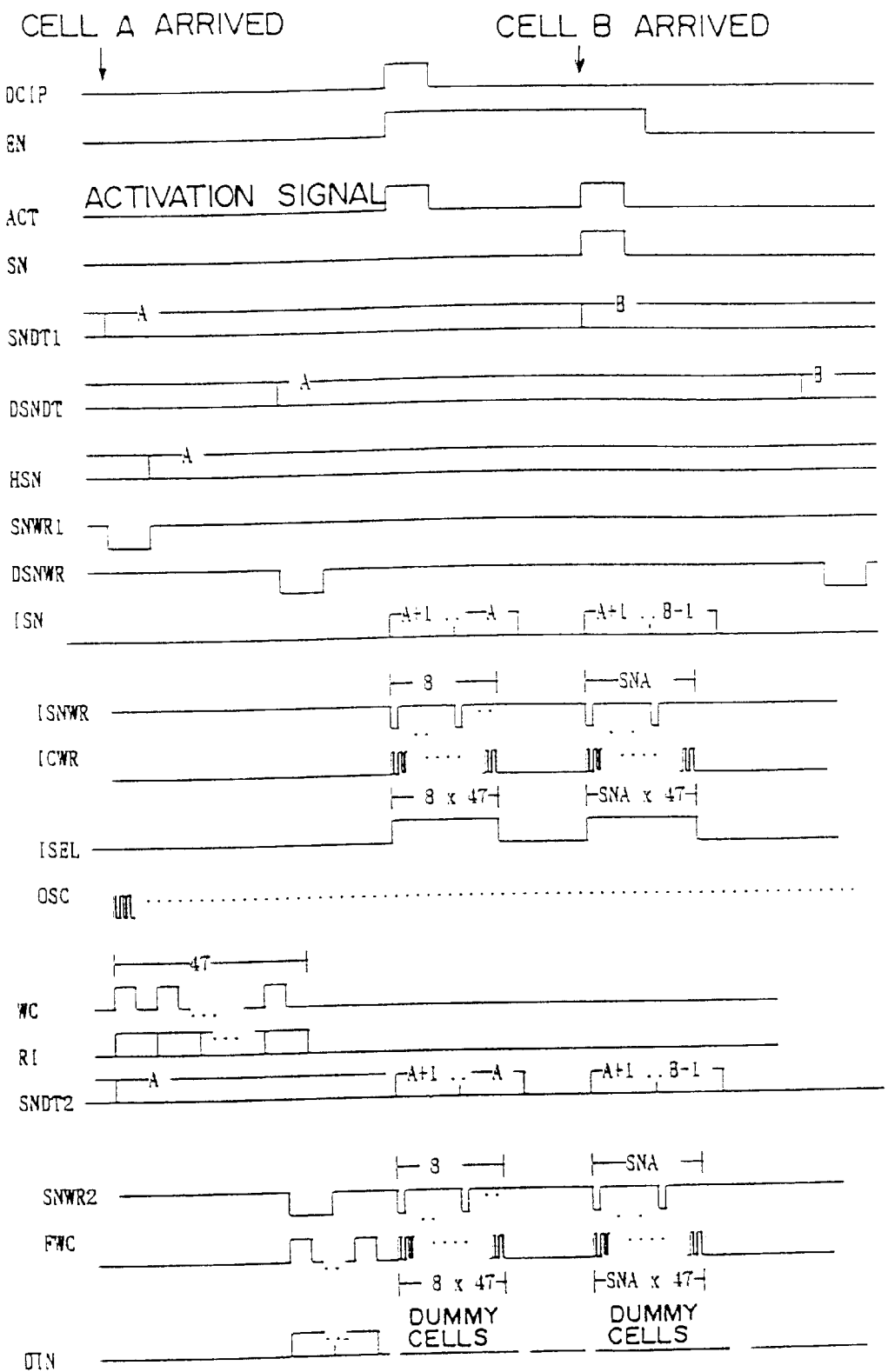
FIG. 47 is a diagram explaining the action of the dummy cell insertion section in the 4th type of buffer control system.

FIG. 47 is a diagram that explains the action of the dummy cell insertion section in the buffer control system of the 4th form of this embodiment. The action of the 4th form of this embodiment is similar to that of the 1st form of this embodiment shown in FIG. 41, so it is not explained here.

In the 4th form of this embodiment, the number of dummy cells written into the cell FIFO section 22 is the same as in the 1st form of this embodiment, but the write-in is divided every 8 dummy cells, so the processing speed can be made slower, making the timing design easier.

Figure 48:
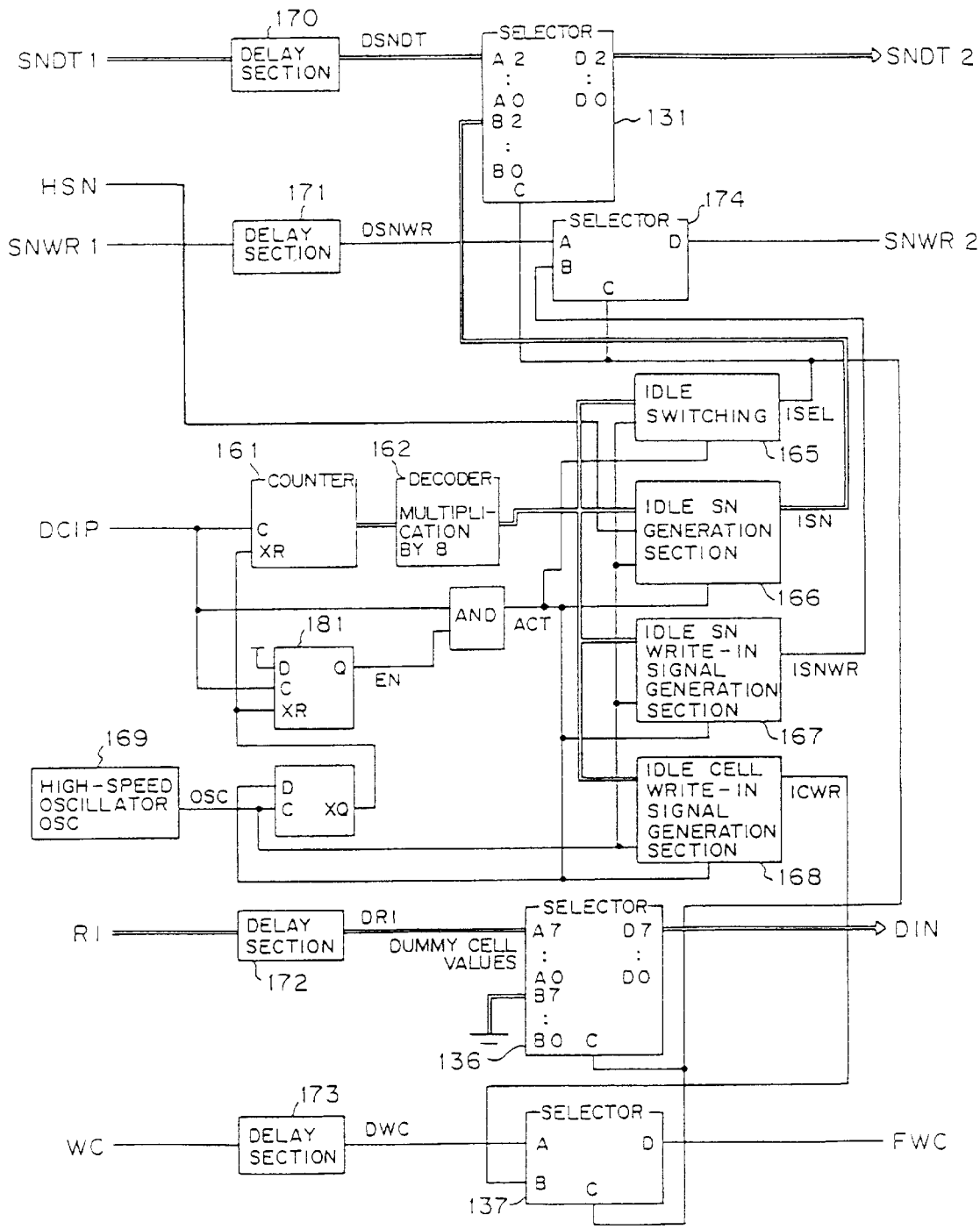
FIG. 48 is a configuration diagram of the dummy cell insertion section in the 5th type of buffer control system.

FIG. 48 is a configuration diagram of the dummy cell insertion section in the buffer control system of the 5th form of this embodiment shown in FIG. 13. The symbols used in FIG. 48 indicate the same circuits and blocks as in FIG. 42. The 5th form of this embodiment is based on the 2nd form of this embodiment, but the timing with which cell loss is detected and dummy cells are generated is different. That is to say, in the 5th form of this embodiment, as in the 4th form of this embodiment, every time a Dummy Cell Insertion Pulse DCIP is received 8 dummy cells are generated and written into the cell FIFO 22.

Figure 49:
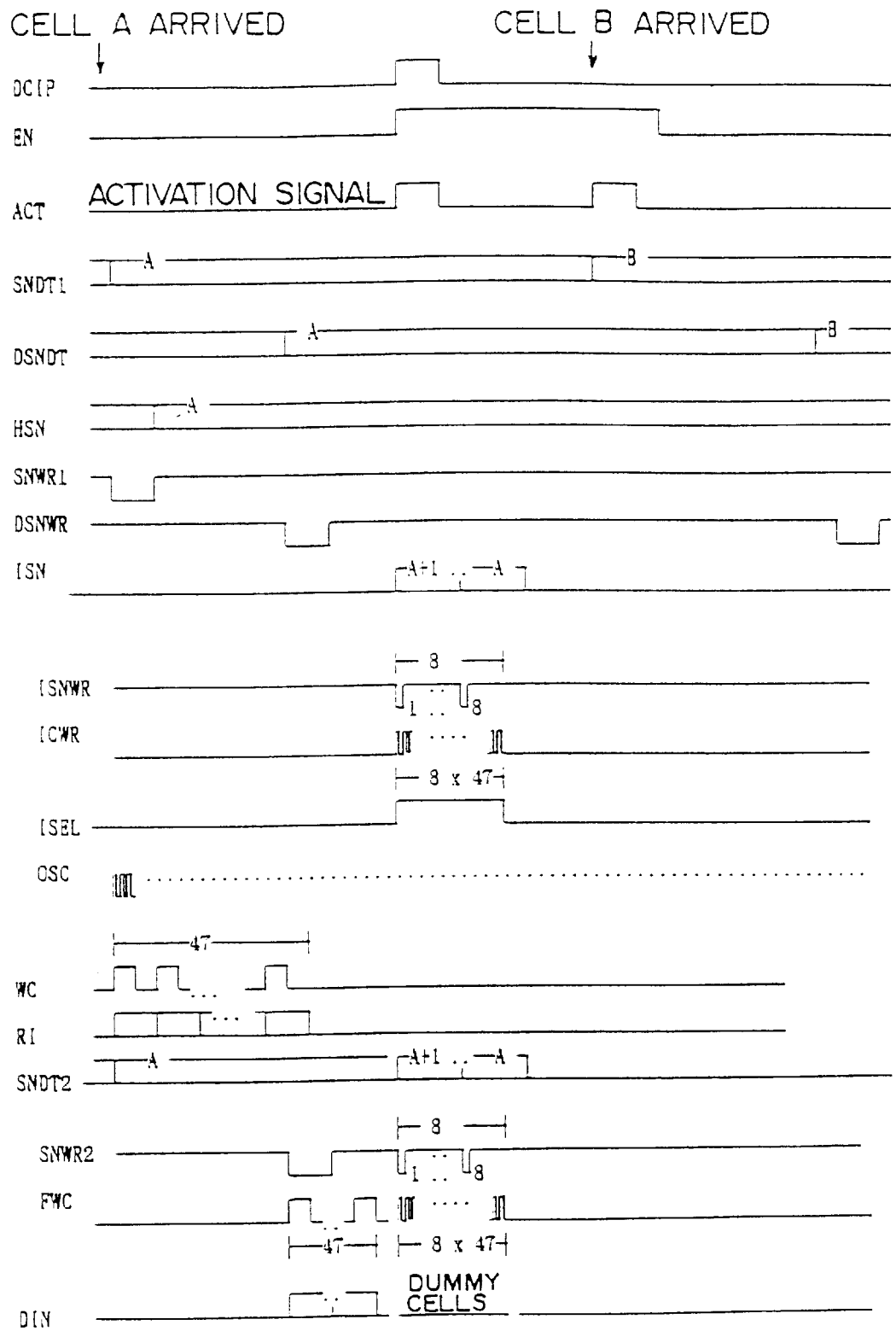
FIG. 49 is a diagram explaining the action of the dummy cell insertion section in the 5th type of buffer control system.

FIG. 49 is a diagram that explains the action of the dummy cell insertion section in the buffer control system of the 5th form of this embodiment. The action of the 5th form of this embodiment is similar to that of the 2nd form of this embodiment shown in FIG. 43, so it is not explained here.

In the 5th form of this embodiment, the number of dummy cells written into the cell FIFO section is the same as in the 2nd form of this embodiment, but the writing in is divided every 8 dummy cells, so the processing speed can be made slower, making the timing design easier.

In the embodiment of this invention described above, it is assumed that the ATM network provides service in accordance with ATM Adaptation Layer Type 1, but this embodiment can be applied to any service in which the data to be transferred are stored in fixed-length packets, a number that indicates the order of sending is assigned to each fixed-length packet, and the packets are sent at uniform intervals.

As explained above, according to this invention, in a buffer control system in which fixed-length packets that are received are temporarily stored in a buffer and then read out of that buffer at uniform intervals, the sequence numbers assigned to the fixed-length packets and the fixed-length packet arrival interval are used to estimate the number of fixed-length packets that were lost, then the number of fixed-length packets stored in that buffer is controlled to compensate for the number that were lost, so that even in a case in which a large number of fixed-length packets are lost consecutively, the number of fixed-length packets stored in the buffer is held fixed.

In a case in which a fixed-length packet fails to arrive within a specified time due to, for example, a breakdown in the sending side device or the transmission path, the buffer becomes empty, making it possible to detect the breakdown.

What is claimed is:

1. A buffer control system comprising:
   a buffer for temporarily storing received fixed-length packets having assigned sequence numbers,
   means for reading said fixed-length packets out of the buffer at a constant bit rate;
   means for computing a number of fixed-length packets that are lost using intervals between arrivals of said fixed-length packets and said assigned sequence numbers; and
   means for indicating an order in which the fixed-length packets are sent, and for increasing the number of fixed-length packets stored in the buffer by the number that were lost.

2. The buffer control system according to claim 1, wherein a number of dummy packets equal to the computed number of packets that were lost are written into the buffer.

3. The buffer control system as described un claim 1, wherein
   readout of the fixed-length packets from the buffer is halted for the time required to read a number of fixed-length packets equal to the computed number that were lost out of the buffer.

4. The buffer control system according to claim 3, wherein dummy data are generated to replace said number of fixed-length packets, equal to the computed number of packets that were lost, and the dummy data are output in place of reading out the fixed-length packets from the buffer.

5. The buffer control system according to claim 1, wherein a specified number of dummy packets are written into the buffer, and readout from the buffer is halted for the time required to read out the number of fixed-length packets equal to the computed number of fixed-length packets that were lost minus the specified number.

6. The buffer control system according to claim 2, wherein write-in of dummy packets to the buffer is halted;
   if the waiting time from the time when one cell arrives until the time when the next cell arrives exceeds a fixed threshold value.

7. A buffer control system controlling a buffer for storing fixed-length packets, each being assigned a sequence number indicating an order in which the fixed-length packets are sent using one of S integers and incremented cyclically, comprising:
   said buffer storing arrived fixed-length packets;
   sequence number computing means for extracting sequence numbers from the fixed-length packets, and computing the difference between each sequence number and the sequence number of the immediately preceding arrived fixed-length packet;
   arrival interval detecting means for detecting a time interval from the time when the immediately preceding fixed-length packet arrived until the time when the present fixed-length packet arrives; and
   control means for computing the number of fixed-length packets that have been lost according to the difference of sequence number and the time interval, and controlling the number of fixed-length packets stored in said buffer to compensate for the computed number of fixed-length packets that were lost.

8. The buffer control system according to claim 7, wherein the sequence number is incremented cyclically using the S integer,
said control means computes the number of fixed-length packets that were lost using the difference of sequence number and the time interval, if the time interval is longer than S times the expectation time of the fixed-length packet arrival interval.

9. The buffer control system according to claim 7, wherein
said control means writes a number of dummy packets equal to the computed number of packets that were lost into said buffer.

10. The buffer control system according to claim 7, wherein
said control means halts readout from said buffer for the time required to read a number of fixed-length packets equal to said computed number of lost packets from said buffer.

11. The buffer control system according to claim 10, wherein
said control means generates dummy data to replace said number of fixed-length packets equal to the computed number of lost fixed-length packets and outputs the dummy data in place of reading out the fixed-length packets from said buffer.

12. The buffer control system according to claim 7, wherein
said control means writes a specified number of dummy packets into said buffer, and halts readout from said buffer for the time required to read said number of fixed-length packets equal to the computed number of lost packets minus the specified number.

13. The buffer control system according to claim 9, wherein,
said control means halts the write-in of dummy packs into said buffer, if the waiting time from the arrival of one fixed-length packet until the arrival of the next fixed-length packet exceeds a predetermined threshold value.

14. A buffer control system that controls a buffer incorporated into a receiving device that receives cells in an ATM network that provides service in accordance with ATM Adaptation Layer Type 1, comprising:
said buffer storing arrived cells;
computing means for extracting the sequence number from each arrived cell and computing the difference $\alpha$ from the sequence number of the immediately preceding arrived cell; and
control means for judging that $8N+\alpha-1$ cells have been lost, when the relation between the time interval t from the time when the immediately preceding cell arrived until the time when the present cell arrives is expressed by $8T \times N + \alpha \times T \leq t < 8T \times N + (\alpha+1) \times T$, where N is a positive number, and controlling the number of cells stored in said buffer to compensate for the lost cells.

15. The buffer control system according to claim 14, wherein
said control means writes $8N+\alpha-1$ dummy cells into said buffer.

16. The buffer control system according to claim 14, wherein
said control means writes 8N dummy cells into said buffer, and generates dummy data to replace the $\alpha-1$ cells that are not read out from said buffer.

17. The buffer control system according to claim 14, wherein
said control means generates N dummy cells having the same sequence number as the sequence number of the immediately preceding arrived cell and writes the N dummy cells into said buffer, and generates dummy data to replace $\beta-1$ cells that are not read out of the buffer, when the sequence numbers of the cells and dummy cells written into said buffer are extracted in the order in which they are written in, if the difference between one sequence number and the next sequence number is $\beta$.

18. The buffer control system according to claim 14,
further comprising cell arrival interval monitoring means for dividing the expectation time T of the arrival interval of the cells by 8.

19. The buffer control system according to claim 18, wherein
said cell arrival interval monitoring means is reset every time a cell arrives from the ATM network.

20. The buffer control system according to claim 14, wherein
said control means writes 8 dummy cells into said buffer every time the time 8T has elapsed from the arrival of the immediately preceding cell, and writes $\alpha-1$ cells into said buffer when the present cell arrives.

21. The buffer control system according to claim 14, wherein
said control means writes 8 dummy cells into said buffer every time the time 8T has elapsed from the arrival of the immediately preceding cell, and creates dummy data to replace $\alpha-1$ cells that were not read out of said buffer.

22. The buffer control system according to claim 14, wherein
said control means writes 1 dummy cell into said buffer every time the time 8T has elapsed from the arrival of the immediately preceding cell, and creates dummy data to replace $7N+\alpha-1$ cells that were not read out of said buffer.

23. The buffer control system according to claim 14, further comprising:
sequence number holding means for holding a sequence number extracted from an arrived cell, and updating the sequence number of the immediately preceding arrived cell by said sequence number of the present cell when said cell arrives.

24. The buffer control system according to claim 15, wherein,
said control means halts the write-in of dummy cells to said buffer, when the waiting time from the arrival of one cell until the arrival of the next cell exceeds a threshold time that is longer than 8 times the expectation time T.

25. A buffer control method that temporarily stores received fixed-length packets in a buffer and reads fixed-length packets out of the buffer at a constant bit rate, comprising the steps of:
computing the number of fixed-length packets that have been lost using the fixed-length packet arrival interval and sequence numbers that are assigned to each fixed-length packet and indicate the order in which the fixed-length packets are sent; and
increasing the number of fixed-length packets stored in the buffer by the number of fixed-length packets that were lost.

26. A buffer control method controlling a buffer for storing fixed-length packets, each being assigned a sequence number indicating an order in which the fixed-length packets and incremented cyclically, comprising the steps of:

storing arrived fixed-length packets in the buffer;

extracting sequence numbers from the fixed-length packets;

computing the difference between each sequence number and the sequence number of the immediately preceding arrived fixed-length packet;

detecting a time interval from the when the immediately preceding fixed-length packet arrived until the time when the present fixed-length packet arrives;

computing the number of fixed-length packets that have been lost according to the difference of sequence number and the time interval; and controlling the number of fixed-length packets stored in the buffer to compensate for the computed number of fixed-length packets that were lost.

27. A buffer control method that controls a buffer incorporated into a receiving device that receives cells in an ATM network that provides service in accordance with ATM Adaptation Layer Type 1, comprising the steps of:

storing arrived cells in said buffer;

extracting the sequence number from each arrived cells;

computing the difference $\alpha$ from sequence number of the immediately preceding arrived cell;

judging that $8N+\alpha-1$ cells have been lost, when the relation the time interval t from the time when the immediately preceding cell arrived until the time when the present cell arrives is expressed by $8T \times N + \alpha \times T \leq t < 8T \times N + (\alpha+1) \times T$, where N is a positive number;

controlling the number of cells stored in the buffer to compensate for the lost cells.

28. A lost packet detecting method detecting a number of lost fixed-length packets, each being assigned a sequence indicating an order in which the fixed-length packets and incremented cyclically, comprising the steps of:

extracting sequence numbers from arrived fixed-length packets;

computing the difference between each sequence number and the sequence number of the immediately preceding arrived fixed-length packet;

detecting a time interval from the time when the immediately preceding fixed-length packet arrived until the time when the present fixed-length packet arrives; and computing the number of fixed-length packets that have been lost according to the difference of sequence number and the time interval.

29. A buffer control system comprising:

a buffer for temporarily storing received fixed-length packets having assigned sequence numbers means for reading fixed-length packets out of the buffer at a constant bit rate;

means for computing a number of fixed-length packets that are lost using intervals between arrivals of said fixed-length packets and the sequence numbers that are assigned to each fixed-length packet; and means for indicating an order in which the fixed-length packets are sent, and for controlling the number of fixed-length packets stored in the buffer based on the number that were lost.

30. A buffer control system comprising:

a buffer for temporarily storing received fixed-length packets having assigned sequence numbers means for reading fixed-length packets out of the buffer at a constant bit rate;

means for computing a number of fixed-length packets that are lost using intervals between arrivals of said fixed-length packets and the sequence numbers that are assigned to each fixed-length packet; and means for indicating an order in which the fixed-length packets are sent, and for controlling the number of fixed-length packets read out of the buffer based on the number that were lost.

31. A method of controlling packets in a buffer control system, comprising the steps:

temporarily storing received fixed-length packets in a buffer;

reading fixed-length packets out of the buffer at a constant bit rate;

computing a number of fixed-length packets that are lost using intervals between arrival of fixed-length packets and sequence numbers that are assigned to each fixed-length packet, indicating the order in which the fixed-length packets are sent; and increasing the number of fixed-length packets stored in the buffer by the number that were lost.

32. The method according to claim 31, wherein a number of dummy packets equal to the computed number of packets that were lost are written into the buffer.

33. The method as described in claim 31, further comprising the step halting read of the fixed-length packets from the buffer for the time required to read said number of fixed-length packets equal to the computed number that were lost out of the buffer.

34. The method according to claim 33, further comprising:

generating dummy data to replace said number of fixed-length packets, equal to the computed number of packets that were lost, and outputting the dummy data in place of reading out the fixed-length packets from the buffer.

35. The method according to claim 31, wherein a specified number of dummy packets are written into the buffer, and readout from the buffer is halted for the time required to read out the number of fixed-length packets equal to the computed number of fixed-length packets that were lost minus the specified number.

36. The method according to claim 32, wherein write-in of dummy packets to the buffer is halted when a waiting time from a cell arrival to the next cell arrival exceeds a predetermined threshold value.

* * * * *